(12) United States Patent
Yamada et al.

(10) Patent No.: US 7,779,434 B2
(45) Date of Patent: Aug. 17, 2010

(54) DISK DRIVE APPARATUS, AND DISK RECORDING AND/OR REPRODUCING APPARATUS

(75) Inventors: Takashi Yamada, Tokyo (JP); Hideaki Kumagai, Kanagawa (JP); Katsuhiko Yamada, Tokyo (JP); Kazuyuki Yamamoto, Kanagawa (JP); Hidetoshi Kabasawa, Saitama (JP); Toshio Mamiya, Tokyo (JP)

(73) Assignee: Sony Corporation, Tokyo (JP)

( * ) Notice: Subject to any disclaimer, the term of this patent is extended or adjusted under 35 U.S.C. 154(b) by 726 days.

(21) Appl. No.: 11/803,379

(22) Filed: May 14, 2007

(65) Prior Publication Data
US 2007/0277186 A1 Nov. 29, 2007

(30) Foreign Application Priority Data
May 16, 2006 (JP) .............................. 2006-136920

(51) Int. Cl.
*G11B 17/04* (2006.01)
(52) U.S. Cl. ..................................... 720/691
(58) Field of Classification Search ....................... None
See application file for complete search history.

(56) References Cited

U.S. PATENT DOCUMENTS 6,181,669 B1 * 1/2001 Park ........................... 720/697
6,483,798 B1 * 11/2002 Wu ............................. 720/676
6,704,270 B2 * 3/2004 Moriyama ................... 720/675
6,813,772 B2 * 11/2004 Ariyoshi ...................... 720/600
6,813,773 B2 * 11/2004 Liao et al. .................... 720/675
6,922,314 B2 * 7/2005 Maeda ....................... 360/267.2

FOREIGN PATENT DOCUMENTS

| JP | 2002-117604 A | 4/2002 |
|---|---|---|
| JP | 2005-190645 A | 7/2005 |
| JP | 2006-018995 A | 1/2006 |
| JP | 2007-220176 A | 8/2007 |

* cited by examiner

*Primary Examiner*—Mark Blouin
(74) *Attorney, Agent, or Firm*—Wolf, Greenfield & Sacks, P.C.

(57) ABSTRACT

Disclosed is a disk drive apparatus including a chassis having a disk insertion slot through which a disk-type recording medium is inserted and/or ejected; a disk transfer mechanism by which the disk-type recording medium is transferred between a disk ejection position and a disk loading position. The apparatus further includes a rotational drive mechanism including a disk loading portion; an optical pickup configured to record and/or reproduce an information signal on the disk-type recording medium; a pickup movement mechanism by which the optical pickup is moved along an information recording surface of the disk-type recording medium. The apparatus still further includes a base member with the rotational drive mechanism, the optical pickup and the pickup movement mechanism; and a base movement mechanism; and an attitude adjustment mechanism.

8 Claims, 29 Drawing Sheets

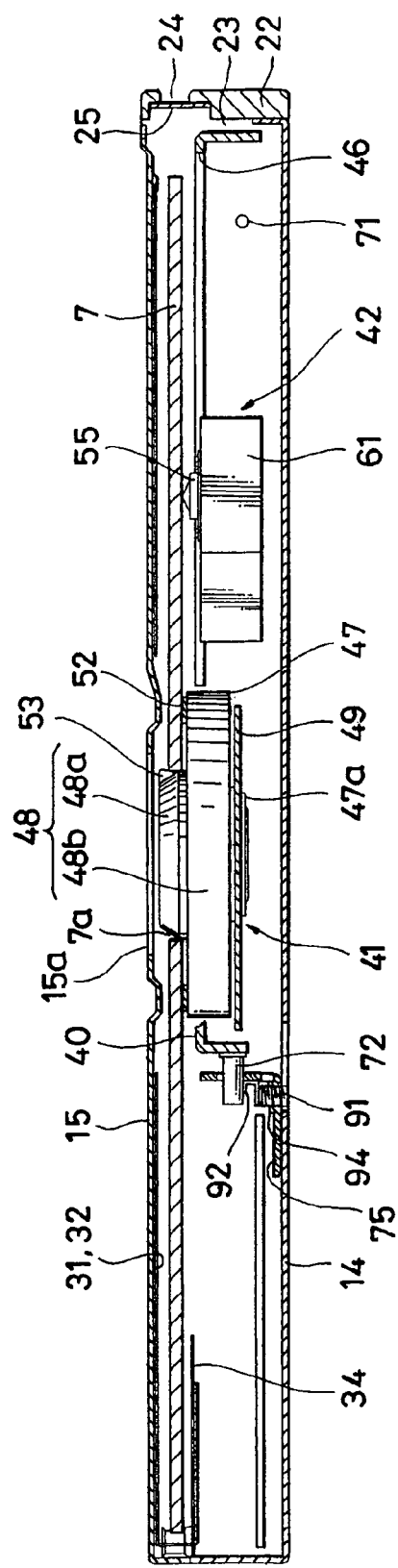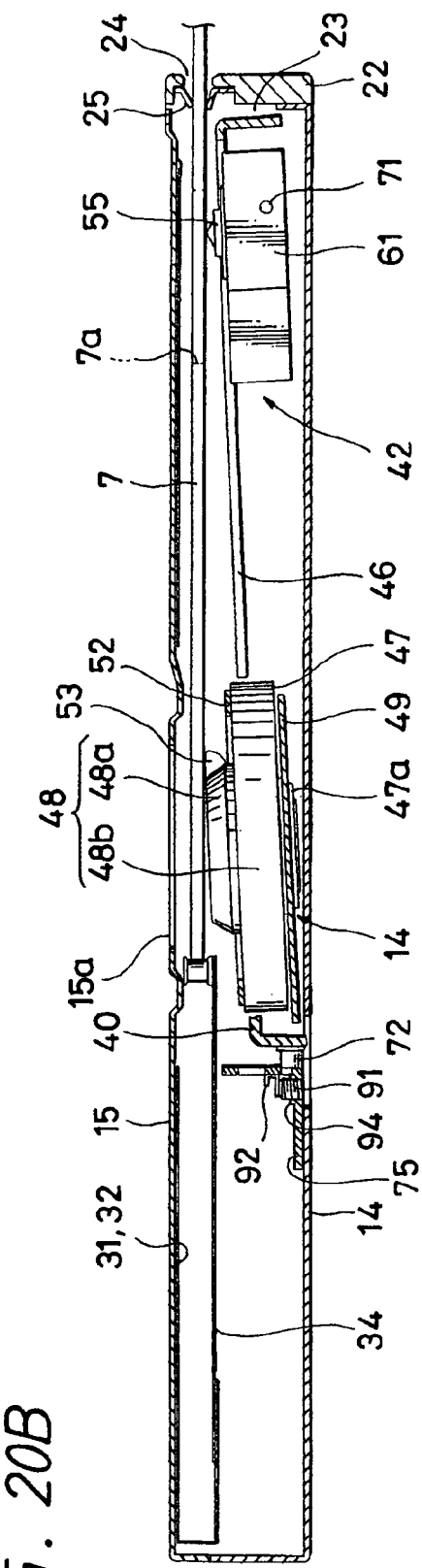
FIG. 20A
FIG. 20B

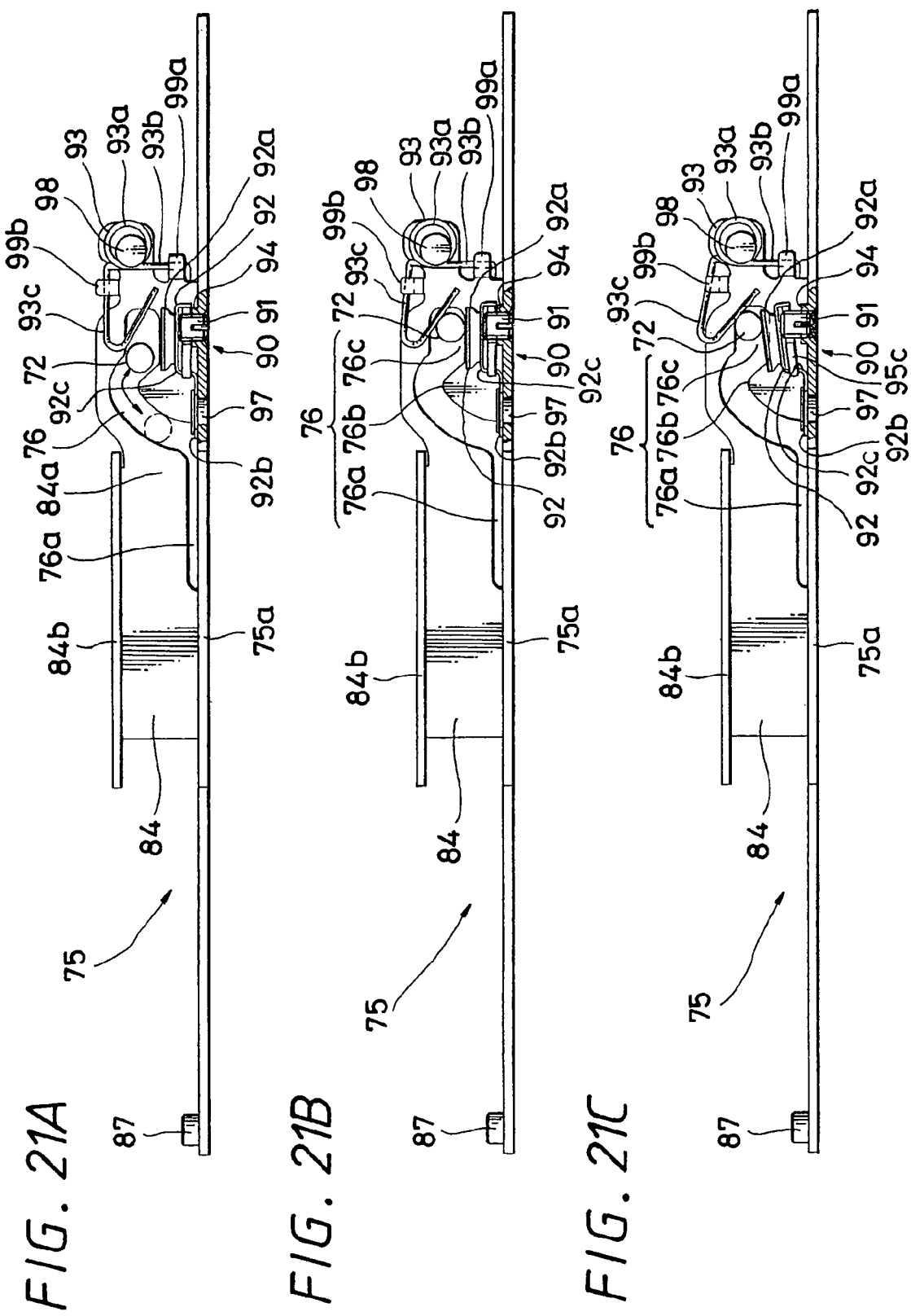

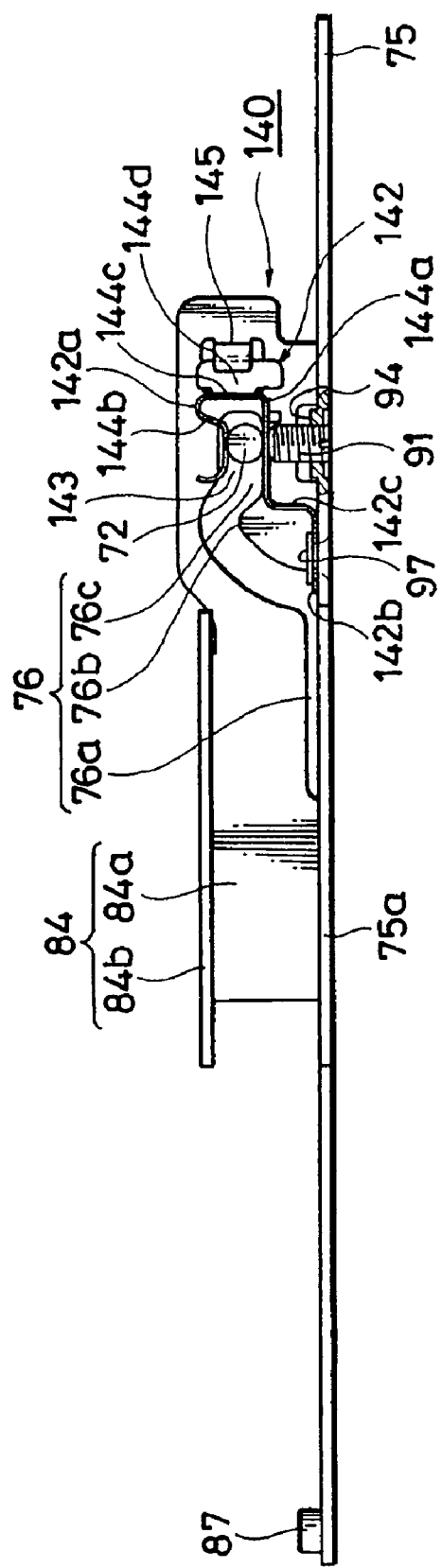

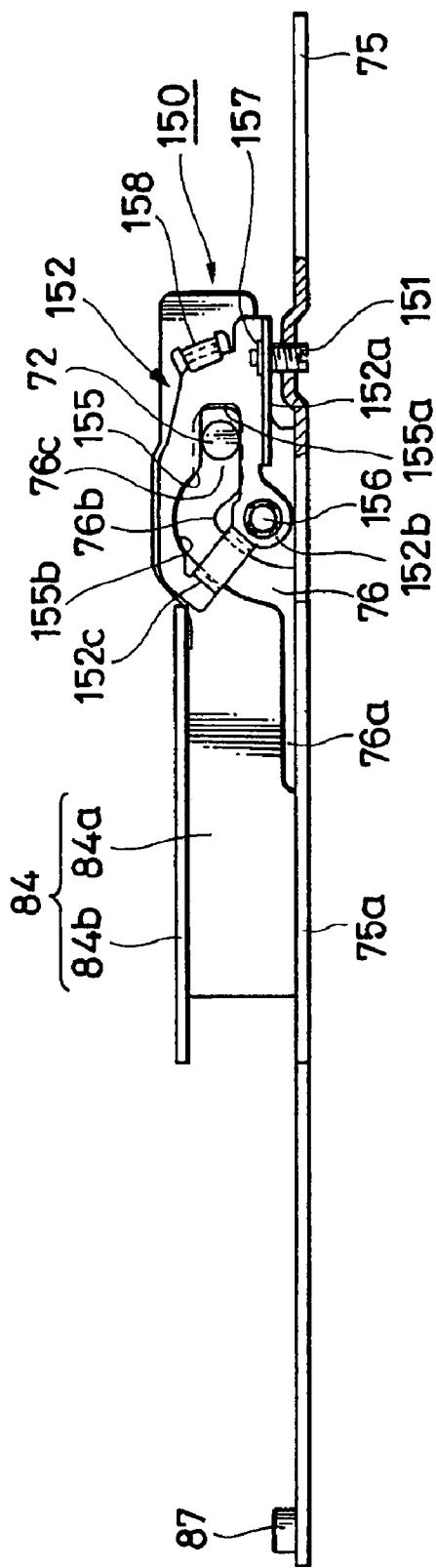
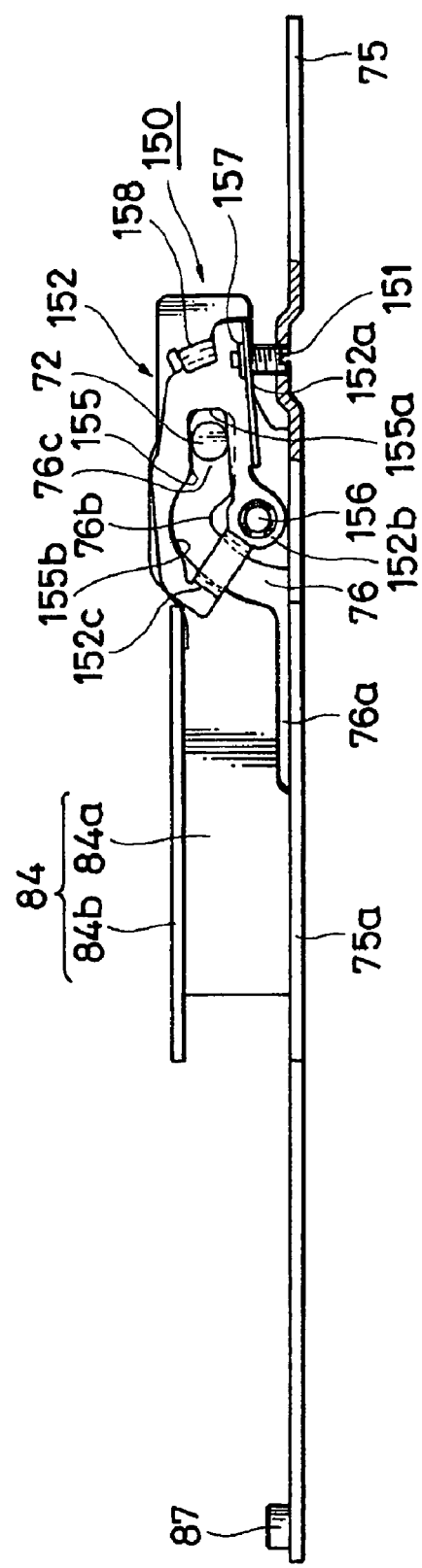
FIG. 28A
FIG. 28B

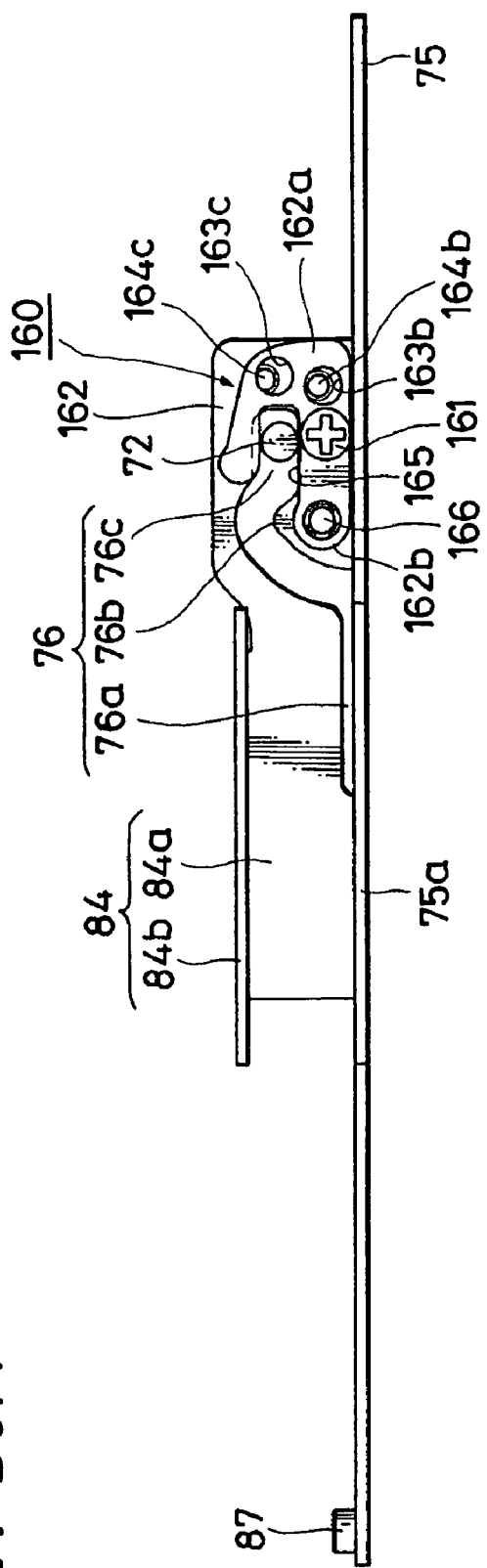
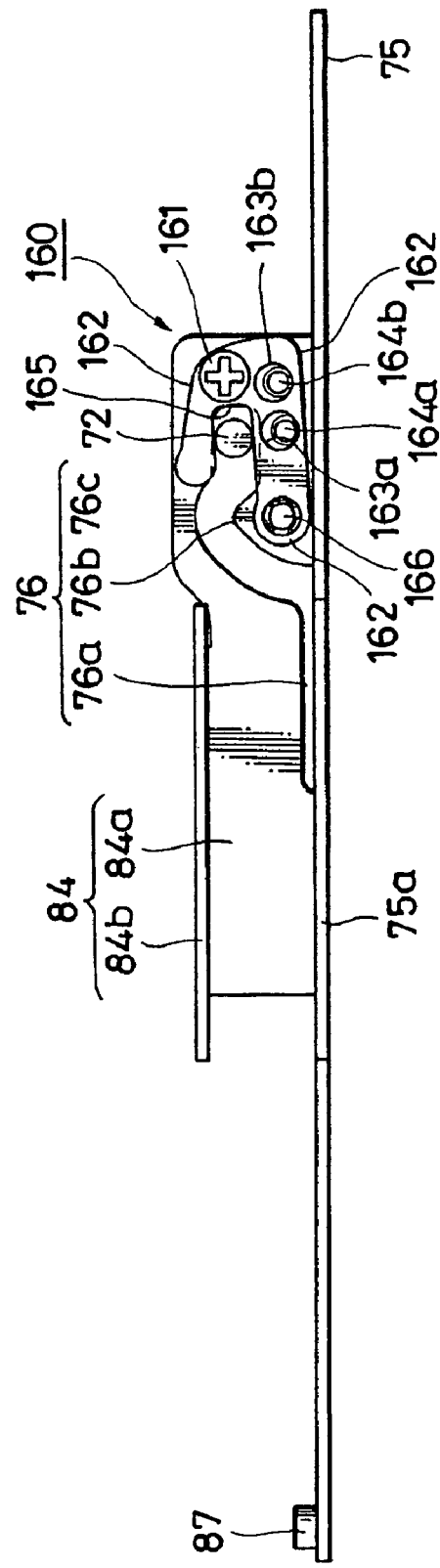
FIG. 30A
FIG. 30B

DISK DRIVE APPARATUS, AND DISK RECORDING AND/OR REPRODUCING APPARATUS

CROSS REFERENCES TO RELATED APPLICATIONS

The present invention contains subject matter related to Japanese Patent Application JP 2006-136920 filed in the Japanese Patent Office on May 16, 2006, the entire contents of which being incorporated herein by reference.

BACKGROUND OF THE INVENTION

1. Field of the Invention

The present invention relates to a disk drive apparatus for recording and/or reproducing an information signal on a disk-type recording medium by moving an optical pickup in a radial direction relative to the disk-type recording medium, and also relates to a disk recording and/or reproducing apparatus such as personal computers and digital video recorders including the disk drive apparatus.

2. Description of the Related Art

Generally, an optical disk such as a CD (Compact Disk) and a DVD (Digital Versatile Disk), and a magnetooptical disk such as a MD (Mini Disk) are widely known as a disk-type recording medium, and there are various disk drive apparatus for recording and reproducing an information signal using the optical disks.

The followings are examples of the disk drive apparatus including various mechanisms in replacing the optical disks described below. One example is a disk drive apparatus in which a cover or flap provided with a chassis is opened upward and the optical disk is directly loaded on a turntable through an opening portion thereof. Another example is a disk drive apparatus in which a disk tray containing the optical disk is transferred inside and outside of the apparatus chassis in a horizontal direction, and the optical disk is automatically loaded on the turntable provided inside the apparatus chassis when the disk tray is drawn into the apparatus chassis. Still another example is a disk drive apparatus in which the turntable is provided with the disk tray in a unified manner, and the optical disk is directly loaded on the turntable when the disk tray is drawn outside of the apparatus chassis.

However, in the above-described disk drive apparatus, an operator has to open and close the cover or flap of the apparatus chassis, draw in and out the disk tray, and load the optical disk on the turntable.

There is provided a slot-in type disk drive apparatus in which a disk insertion slot in a front face of the apparatus chassis. With this apparatus the operator only has to insert the optical disk from the disk insertion slot, and the optical disk is automatically drawn inside the apparatus chassis and loaded on the turntable. There are provide various types of the slot-in type disk drive apparatus as described below. One example is a slot-in type disk drive apparatus having a roller unit in which transferring rollers for transferring the inserted optical disk by holding a main surface or an outer circumference of the disk between the rollers and support projections that faces the vicinity of the disk insertion slot. Another example is a slot-in type disk drive apparatus having a swinger unit formed with combined thin plate swingers, and the optical disk is moved and transferred as the swinger unit to a disk loading portion.

In the slot-in type disk drive apparatuses, the latter slot-in type disk drive apparatus using the swinger unit is more suitable for reducing the thickness of the disk drive apparatus than the former slot-in type disk drive apparatus having a roller unit since the swinger unit is formed by combining the thin sheet metals.

In addition, such a disk drive apparatus is disclosed in Japanese Unexamined Patent Publication No. 2005-190645 as an example of the disk drive apparatus in the related art. The disk drive apparatus described in Japanese Unexamined Patent Publication No. 2005-190645 includes a chassis, a disk loading portion, a disk rotational drive mechanism, an optical pickup and a pickup transfer mechanism. The chassis is configured such that a disk insertion slot through which an optical disk is inserted and/or ejected is provided in a front face. The disk loading portion is configured such that the optical disk inserted from the disk insertion slot to the inside of the chassis is loaded thereon. The disk rotational drive mechanism is configured to rotationally drive the optical disk loaded on the disk loading portion. The optical pickup is configured to write in and/or read out a signal on the optical disk rotationally driven by the disk rotational drive mechanism. The pickup transfer mechanism is configured to operate to transfer the optical pickup over inner and outer circumferences of the optical disk. Further, the disk drive apparatus of Japanese Unexamined Patent Publication No. 2005-190645 includes a base unit in which those described in the above are provided integrally into the base and a disk transfer mechanism that transfers the optical disk between a disk insertion-ejection position where the optical disk is inserted and ejected from the disk insertion slot and a disk loading position where the optical disk is loaded on the disk loading portion. The disk transfer mechanism has a plurality of support members that are operated to move between a main surface of the chassis facing the disk loading portion and a main surface of the optical disk inserted from the disk insertion slot, and the plurality of support members have fitting contact portions that can fittingly contact with an outer circumferential portion of the optical disk inserted from the disk insertion slot. The outer circumferential portion of the optical disk is sandwiched by those fitting contact portions, so that at least one operation of a loading operation, a centering operation and an eject operation of ejecting the optical disk from the disk insertion slot to the outside of the chassis.

According to the disk drive apparatus having such configuration, a further reduction in size, weight and thickness of the whole apparatus can be achieved as the slot-in type disk drive apparatus since the loading operation, centering operation or eject operation of the optical disk can stably and appropriately be performed by the plurality of support members without having an effect from a space between the base and the optical disk that is inserted from the disk insertion slot.

Furthermore, there is also such a disk drive apparatus described in Japanese Unexamined Patent Publication No. 2002-117604 as another example of the disk drive apparatus in the related art. The disk drive apparatus described in Japanese Unexamined Patent Publication No. 2002-117604 includes a spindle motor, a base body, a pair of slide members, a first swinger, and a second swinger. The spindle motor rotationally drives the disk. The base body supports the spindle motor. The pair of slide members are extended on both sides of the base body to support the base body, and raise and lower the base body in a direction vertical to the disk surface by reciprocally moving in a direction of the disk surface. The first swinger swings in the direction of the disk surface in order to draw the center of the disk supplied by the operator up to a center position of the spindle motor. The second swinger swings in the direction of the disk surface in order to eject the center of the disk from the center position of the spindle motor to a position where the operator removes the disk. The pair of slide members include a first slide member with which the first swinger performs a drawing operation and a second slide member with which the second swinger performs an eject operation, and the spindle motor, base body, first slide member, second slide member, first swinger and second swinger are disposed on one side of the disk.

According to the disk apparatus having such configuration, a width of the disk apparatus can be reduced since this disk apparatus is a disk transfer unit without having a roller.

Meanwhile, a disk drive apparatus for IT (Information Technology) is generally installed on a drive bay provided in a device chassis of a host device such as a personal computer (hereinafter, referred to as "PC") and a game machine, so that the apparatus is integrally used with the host device by having drive power supplied from the host device side. As increasing a demand for further reduction in size, weight and thickness in a portable host device among such host devices such as a notebook-type PC, the disk drive apparatus mounted on such host device may also be expected to be reduced in size, weight and thickness.

Further, as increasing a demand for the thinness and compactness in a DVD recording-reproducing apparatus (digital video disk recorder) representing one specific example of the information recording and/or reproducing apparatus and an AV (Audio Visual) device such as a TV (Television), the built-in disk drive apparatus may also be expected to be reduced in size, weight and thickness.

There are provided various optical disks having different outer diameters such as an optical disk having 8 cm diameter used for a camera built-in type video disk recorder (hereinafter, referred to as "camcorder") and the like, in addition to a standard type optical disk having 12 cm diameter, for example, depending on the standard and recording capacity of the optical disk. Due to the circumstances, the disk drive apparatus mounted on the PC, disk recording-reproducing apparatus for AV, and the like may be required to deal with any size of the optical disk.

In either cases of the above-mentioned disk drive apparatuses described in Japanese Unexamined Patent Publication No. 2002-117645 and Japanese Unexamined Patent Publication No. 2002-117604, for example, an internal mechanism of the disk drive apparatus starts moving such that the optical disk is drawn into the inside of the apparatus chassis when the operator inserts the optical disk into the apparatus chassis to a certain extent of depth. Then, the optical pickup is operated after the optical disk is loaded on the turntable, so that the information signal is recorded and reproduced.

However, in the thin slot-in type disk drive apparatus, a sufficiently large space in a height direction may be difficult to obtain between a surface of the optical disk loaded on the turntable and structural components of the mechanism used for drawing the optical disk, for example, due to a demand for the thinness. In contrast, further narrower (more strictly) space may be demanded for the thin slot-in type disk drive apparatus, and an amount of space change caused by variability in the component accuracy may have to strictly be controlled. If there is little space between the optical disk and the mechanism components, an abnormal sound may be generated and the surface of the optical disk may be damaged since the rotationally driven optical disk and the mechanism components come into contact in the height direction.

In addition, the thin slot-in type disk drive apparatus may depend largely on the accuracy of the components in order to achieve the thinness according to the structure of the apparatus. As a result, the space between the disk height and the surrounding components may not be secured as planned in a design scheme since the space between the optical disk after being loaded on the turntable and the surrounding components becomes too narrow in the disk drive apparatus which is assembled using components having a dimension with threshold limit.

SUMMARY OF THE INVENTION

In the thin-type disk drive apparatus of the related art, it is difficult to secure a sufficiently large space between the surface of the optical disk after being loaded on the turntable and the structural components of the mechanism used for drawing the optical disk and the like. As a result, the abnormal sound may be generated and the surface of the optical disk may be damaged since the rotationally driven optical disk comes into contact with the surrounding mechanism components and the like. Especially, it is more difficult to secure the space to a surface deflection disk having the deflection in the direction vertical to the disk surface, which is a further disadvantageous point in the thinness-type disc drive.

A disk drive apparatus according to an embodiment of the present invention includes a chassis, a disk transfer mechanism, a rotational drive mechanism, an optical pickup, a pickup movement mechanism, a base member, a base movement mechanism and an attitude adjustment mechanism. The disk drive apparatus also includes a disk insertion slot through which a disk-type recording medium is inserted and/or ejected is provided on a front face of the chassis; the disk transfer mechanism by which the disk-type recording medium is transferred between a disk ejection position located outside of the disk insertion slot of the chassis and a disk loading position located inside of the disk insertion slot. The disk drive apparatus further includes the a rotational drive mechanism including a disk loading portion on which the disk-type recording medium transferred to the disk loading position is removably loaded and which is rotationally driven, so that the disk-type recording medium is rotated. The disk drive apparatus further includes the optical pickup configured to record and/or reproduce an information signal on the disk-type recording medium that is loaded and rotated on the disk loading portion; and the pickup movement mechanism by which the optical pickup is moved along an information recording surface of the disk-type recording medium. The disk drive apparatus further includes a base movement mechanism with which the base member is attitude changeably supported and the disk-type recording medium is loaded on or removed from the disk loading portion by changing the attitude of the base member; and an attitude adjustment mechanism by which the attitude of the base member can be adjusted relative to the chassis. The disk drive apparatus according to the embodiment of the present invention is configured to have those described above.

In addition, the information recording and/or reproducing apparatus according to an embodiment of the present invention includes the disk drive apparatus and an exterior chassis. The disk drive apparatus, in which the disk-type recording medium is removably loaded, and the information signal is recorded and/or reproduced on the loaded disk-type recording medium. The disk drive apparatus is enclosed in the exterior chassis. The disk drive apparatus includes a chassis, a disk transfer mechanism, a rotational drive mechanism, an optical pickup, a pickup movement mechanism, a base member, a base movement mechanism and an attitude adjustment mechanism. The information recording and/or reproducing apparatus according to the embodiment of the present invention is configured to have those described above.

A height of the optical disk loaded on the disk loading portion of the drive unit can be adjusted at an optimal position such that the attitude adjustment mechanism adjusts the attitude of the base member to the chassis after the disk drive apparatus is assembled.

According to the disk drive apparatus and the information recording and/or reproducing apparatus in the embodiment of the present invention, the height of the optical disk can be adjusted at the optimal position after the assembly although a relation in the heights between the optical disk loaded on the disk loading portion and the surrounding mechanism components, for example, is deviated from an allowable prescribed range such that there remains a large amount of space on one side and the space becomes narrow on the other side in such case that the components having a dimension with threshold limit are used and assembled. Since the contact between the optical disk and the surrounding components can be avoided by adjusting height, the abnormal noise generated from the optical disk and the damage on the surface of the optical disk can be prevented, so that the disk drive apparatus and information recording and/or reproducing apparatus having high reliability can be provided.

Especially, in the thick optical disk having the thickness of the upper limit with the standard and the optical disk having the surface deflection of the upper limit with the standard, it is difficult to secure the space between the disk surface and the surrounding components within the prescribed range when assembly; however, the space between the disk surface and the surrounding components can be easily set within the prescribed range since the height can be adjusted after the assembly according to the embodiment of the present invention. Moreover, the embodiment of the present invention can be also used for the plurality of optical disks having the different diameters.

BRIEF DESCRIPTION OF THE DRAWINGS

FIGS. 13A and 13B are diagrams showing an optical pickup and a flexible wiring board related to a disk drive apparatus according to an embodiment of the present invention, in which FIG. 13A is a perspective view showing a state after the flexible wiring board and a pickup base are connected and FIG. 13B is a perspective view showing a state before connecting the flexible wiring board and the optical pickup base;

FIGS. 14A and 14B are diagrams showing a state of connection between an optical pickup and a flexible wiring board related to a disk drive apparatus according to an embodiment of the present invention, in which FIG. 14A is a front view, FIG. 14B is a rear view, and FIG. 14 C is a cross-sectional view magnifying an essential portion of FIG. 14B;

FIGS. 15A and 15B are diagrams showing a state of connection between an optical pickup and a flexible wiring board related to a disk drive apparatus according to an embodiment of the present invention, in which FIG. 15A is an explanatory diagram showing a state that the flexible wiring board is bent at 180 degree and moved to one side, and FIG. 15B is an explanatory diagram showing a state that the flexible wiring board is bent at 180 degree and moved to the other side;

FIGS. 16A and 16B are diagrams showing a state of connection between an optical pickup and a flexible wiring board in a drive unit (in a state having a base cover removed) related to a disk drive apparatus according to an embodiment of the present invention, in which FIG. 16A is an explanatory diagram showing a state that the optical pickup is moved to one side, and FIG. 16B is an explanatory diagram showing a state that the optical pickup is moved to the other side;

FIGS. 17A and 17B are diagrams showing a state of connection between an optical pickup and a flexible wiring board in a drive unit (in a state having a base cover attached) related to a disk drive apparatus according to an embodiment of the present invention, in which FIG. 17A is an explanatory diagram showing a stat that the optical pickup is moved to one side, and FIG. 17B is an explanatory diagram showing a state that the optical pickup is moved to the other side;

FIGS. 20A and 20B are diagrams showing a first embodiment of a disk drive apparatus according to an embodiment of the present invention which is cross-sectioned in a disk insertion-removal direction (in an front-rear direction), in which FIG. 20A is an explanatory diagram showing a state that a drive unit is moved to a disk loading position and FIG. 20B is an explanatory diagram showing a state that the drive unit is moved to a disk loading release position;

FIGS. 21A and 21B are diagrams showing a first embodiment of an attitude adjustment mechanism related to a disk drive apparatus according to an embodiment of the present invention, in which FIG. 21A is an explanatory diagram showing a state that a first cam pin enters into an upper horizontal portion of a plate side cam groove, FIG. 21B is an explanatory diagram showing the lowest stage of the attitude adjustment mechanism, and FIG. 21 C is an explanatory diagram showing the highest stage of the attitude adjustment mechanism;

FIGS. 23A and 23B are diagrams showing a magnified essential portion of FIG. 20A, in which FIG. 23A is an explanatory diagram showing the lowest stage of the attitude adjustment mechanism, and FIG. 23 B is an explanatory diagram showing the highest stage of the attitude adjustment mechanism;

FIGS. 24A and 24B are diagrams showing a second embodiment of an attitude adjustment mechanism related to a disk drive apparatus according to an embodiment of the present invention, in which FIG. 24A is an explanatory diagram showing the lowest stage of the attitude adjustment mechanism, and FIG. 24B is an explanatory diagram showing the highest stage of the attitude adjustment mechanism;

FIGS. 26A and 26B are diagrams showing a third embodiment of an attitude adjustment mechanism related to a disk drive apparatus according an embodiment of the present invention, in which FIG. 26A is an explanatory diagram showing the lowest stage of the attitude adjustment mechanism, and FIG. 26B is an explanatory diagram showing the highest stage of the attitude adjustment mechanism;

FIGS. 28A and 28B are diagrams showing a fourth embodiment of an attitude adjustment mechanism related to a disk drive apparatus according to an embodiment of the present invention, in which FIG. 28A is an explanatory diagram showing the lowest stage of the attitude adjustment mechanism, and FIG. 28B is an explanatory diagram showing the highest stage of the attitude adjustment mechanism;

FIGS. 30A and 30B are diagrams showing a fifth embodiment of an attitude adjustment mechanism related to a disk drive apparatus according to an embodiment of the present invention, in which FIG. 30A is an explanatory diagram showing the lowest stage of the attitude adjustment mechanism, and FIG. 30B is an explanatory diagram showing the highest stage of the attitude adjustment mechanism.

DESCRIPTION OF THE PREFERRED EMBODIMENTS

A disk drive apparatus and an information recording and/or reproducing apparatus having high reliability, in which a contact between a disk-type recording medium and surrounding components is avoided by providing an attitude adjustment mechanism capable of adjusting an attitude of a base member to a chassis, so that a generation of an abnormal sound and a damage on the disk-type recording medium can be prevented, are realized using a simple structure.

Embodiment 1

Figure 1:
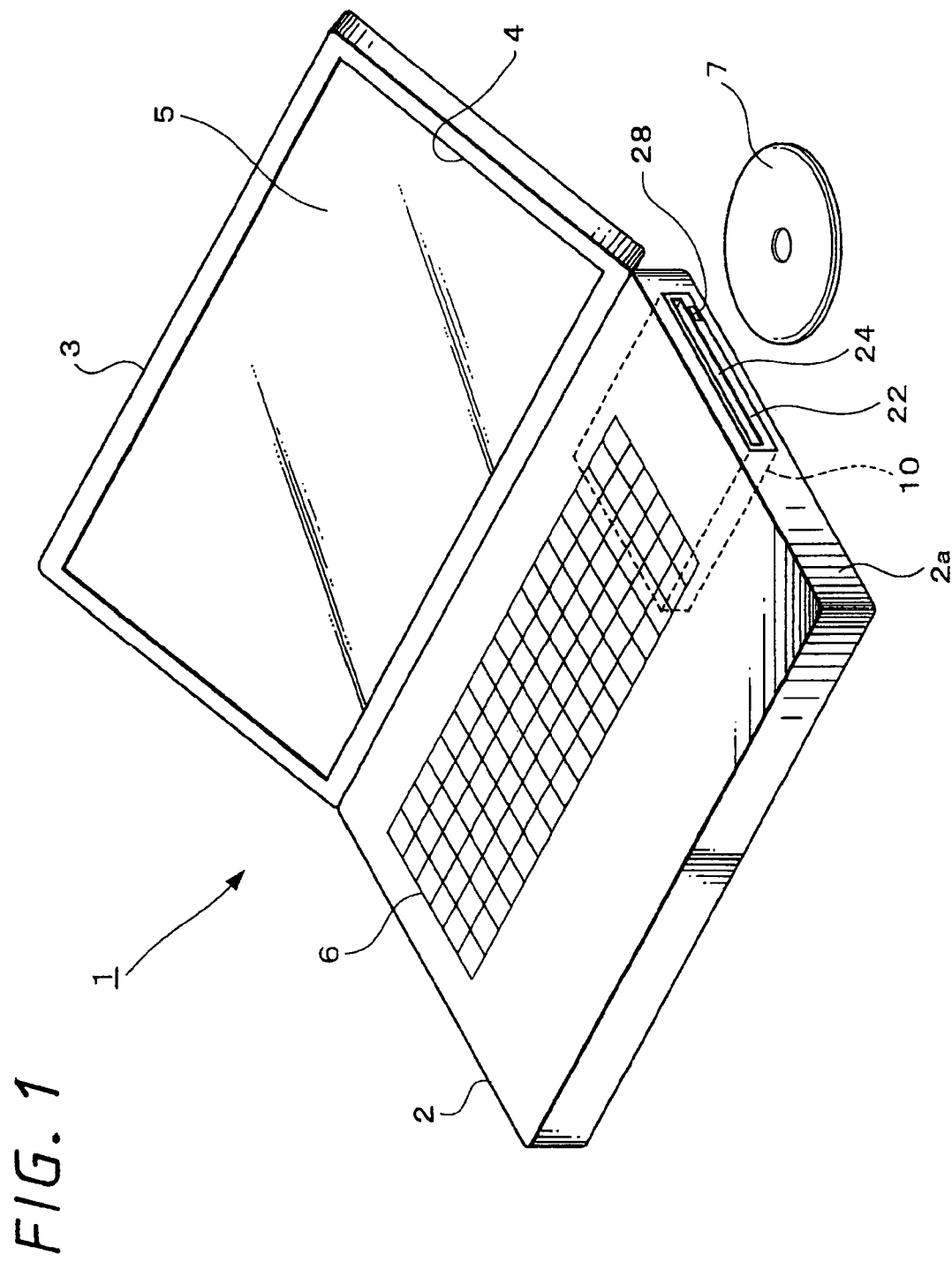
FIG. 1 is a perspective view showing one example of an information recording-reproducing apparatus having a disk drive apparatus according to an embodiment of the present invention.
Figure 2:
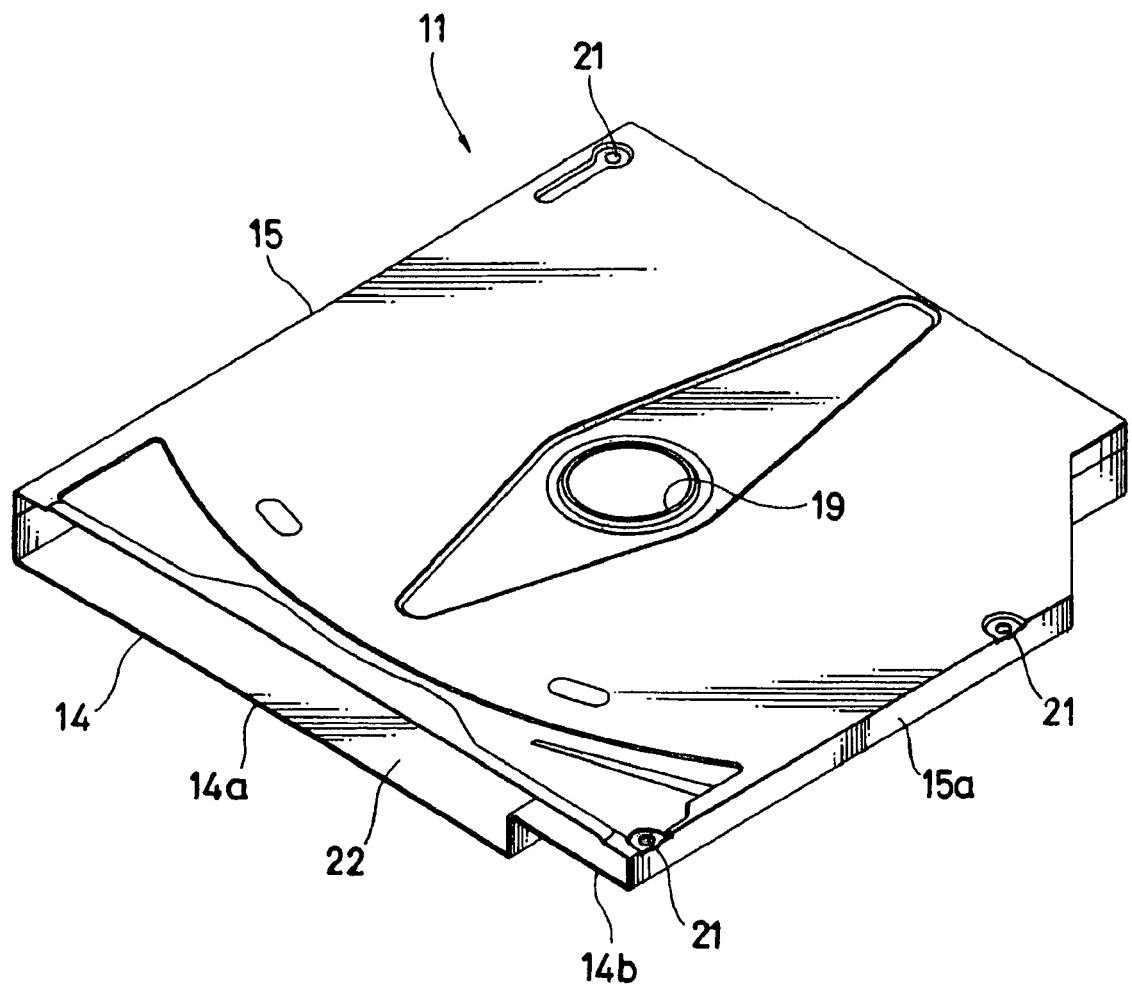
FIG. 2 is a perspective view showing one example of a chassis related to a disk rive unit according to an embodiment of the present invention.
Figure 3:
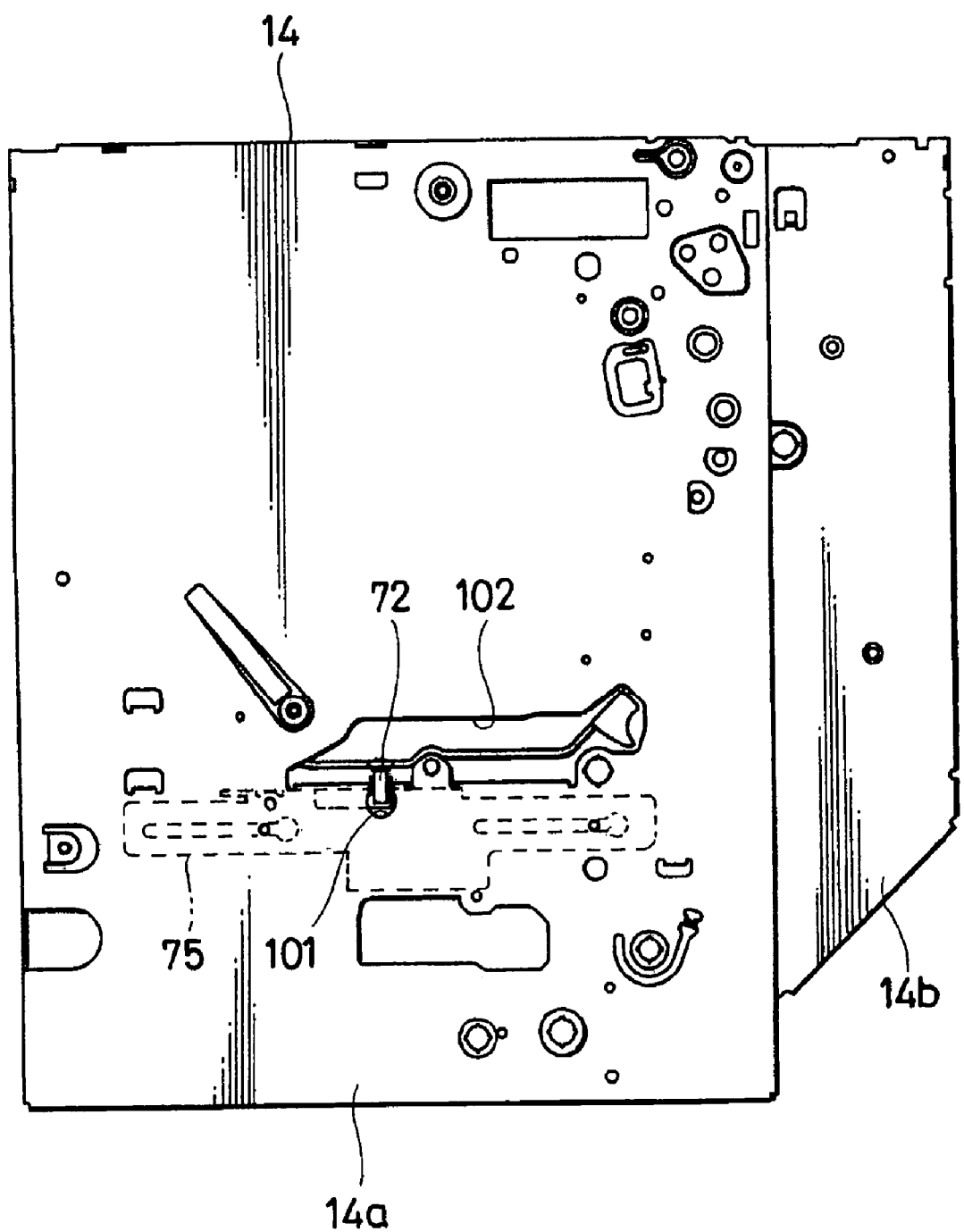
FIG. 3 is an explanatory diagram showing a state that a slide member is moved to one side when the chassis shown in FIG. 2 is viewed from a rear side.
Figure 4:
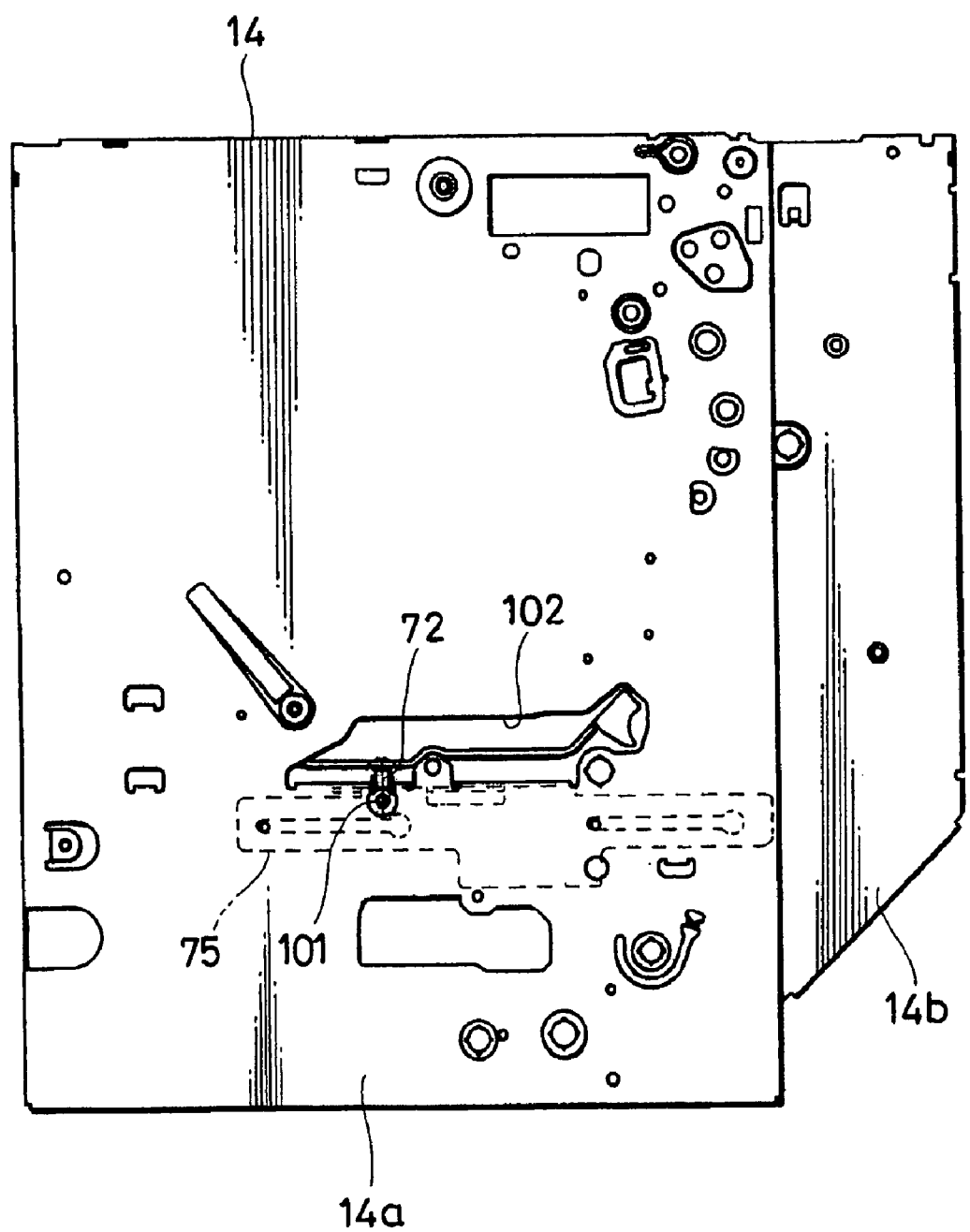
FIG. 4 is an explanatory diagram showing a state that the slide member is moved to the other side when the chassis shown in FIG. 2 is viewed from the rear side.
Figure 5:
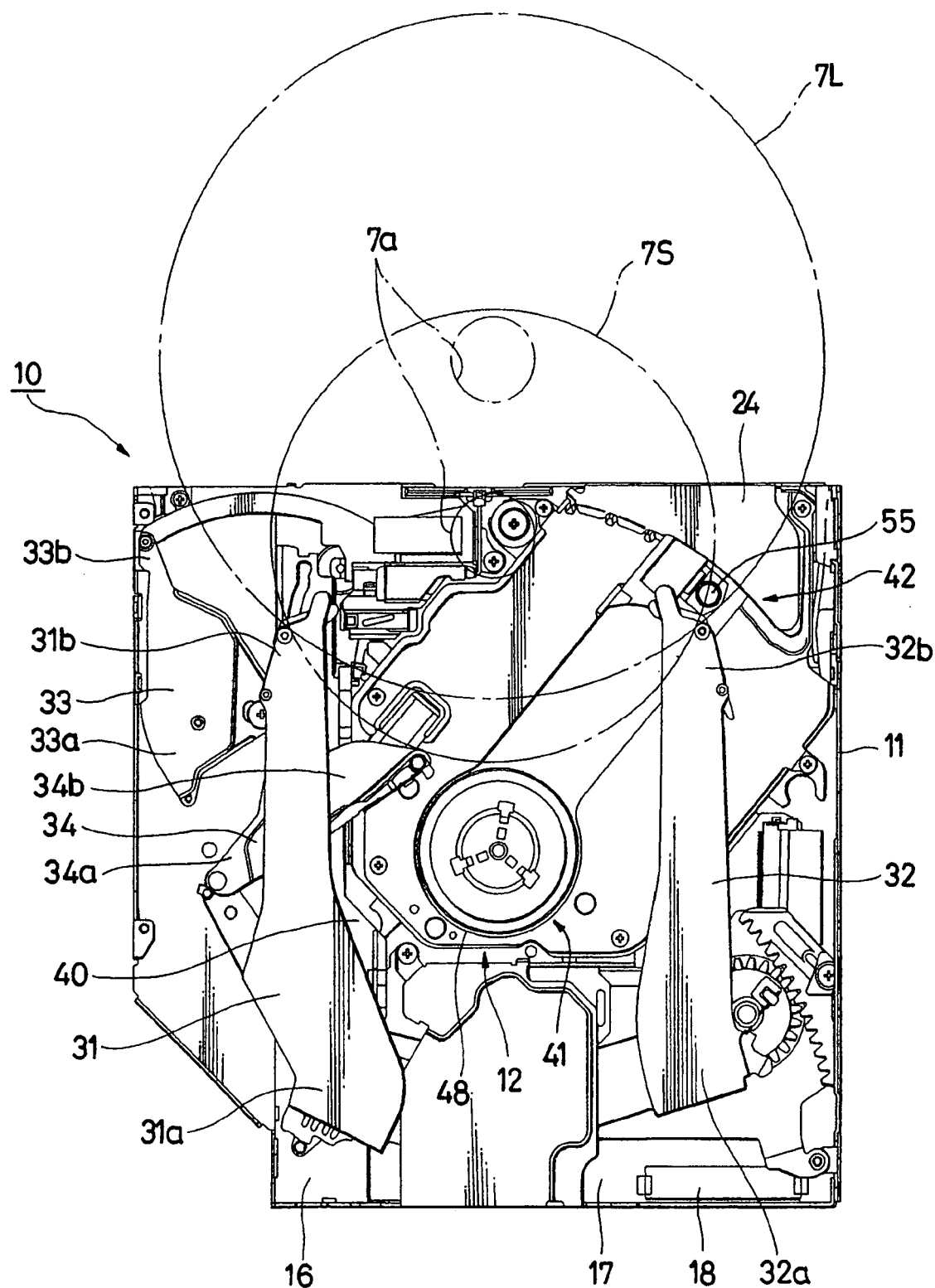
FIG. 5 is an explanatory diagram showing a state that a disk having a large diameter and a disk having a small diameter are inserted into (similarly, also ejected from) a disk drive apparatus according to an embodiment of the present invention.
Figure 6:
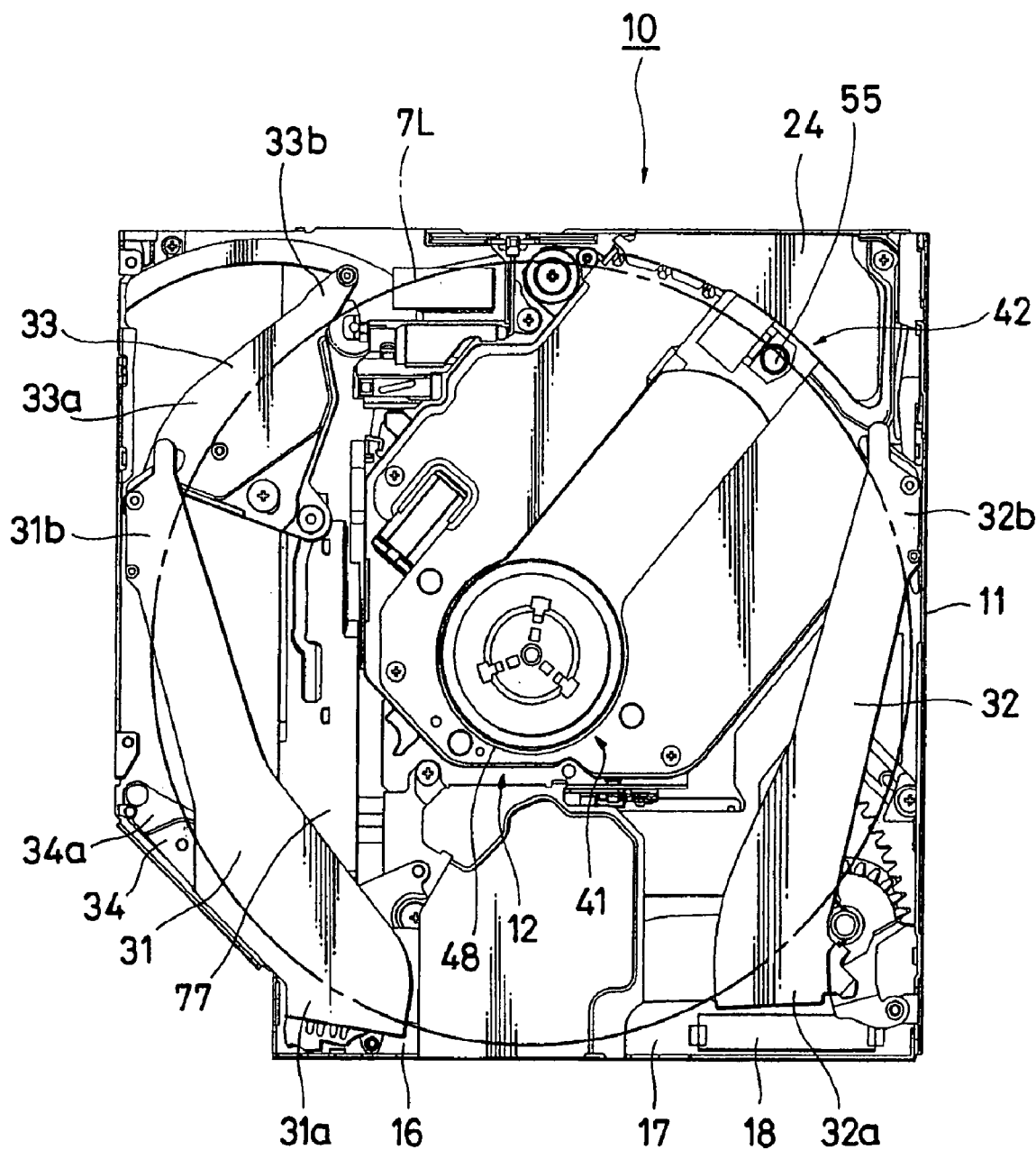
FIG. 6 is an explanatory diagram showing a state that a disk having a large diameter is loaded on a disk drive apparatus according to an embodiment of the present invention.
Figure 7:
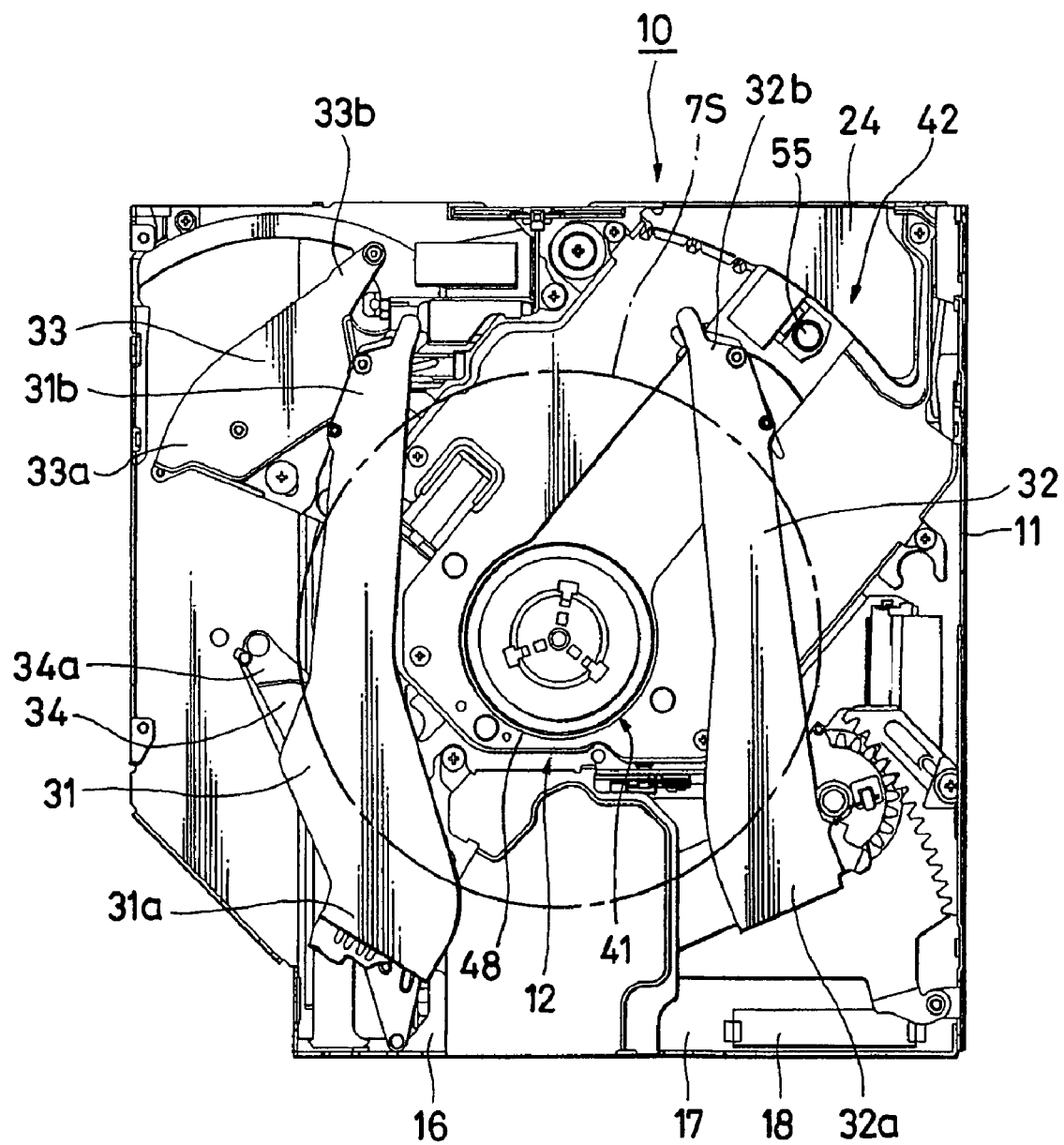
FIG. 7 is an explanatory diagram showing a state that a disk having a small diameter is loaded on a disk drive apparatus according to an embodiment of the present invention.
Figure 8:
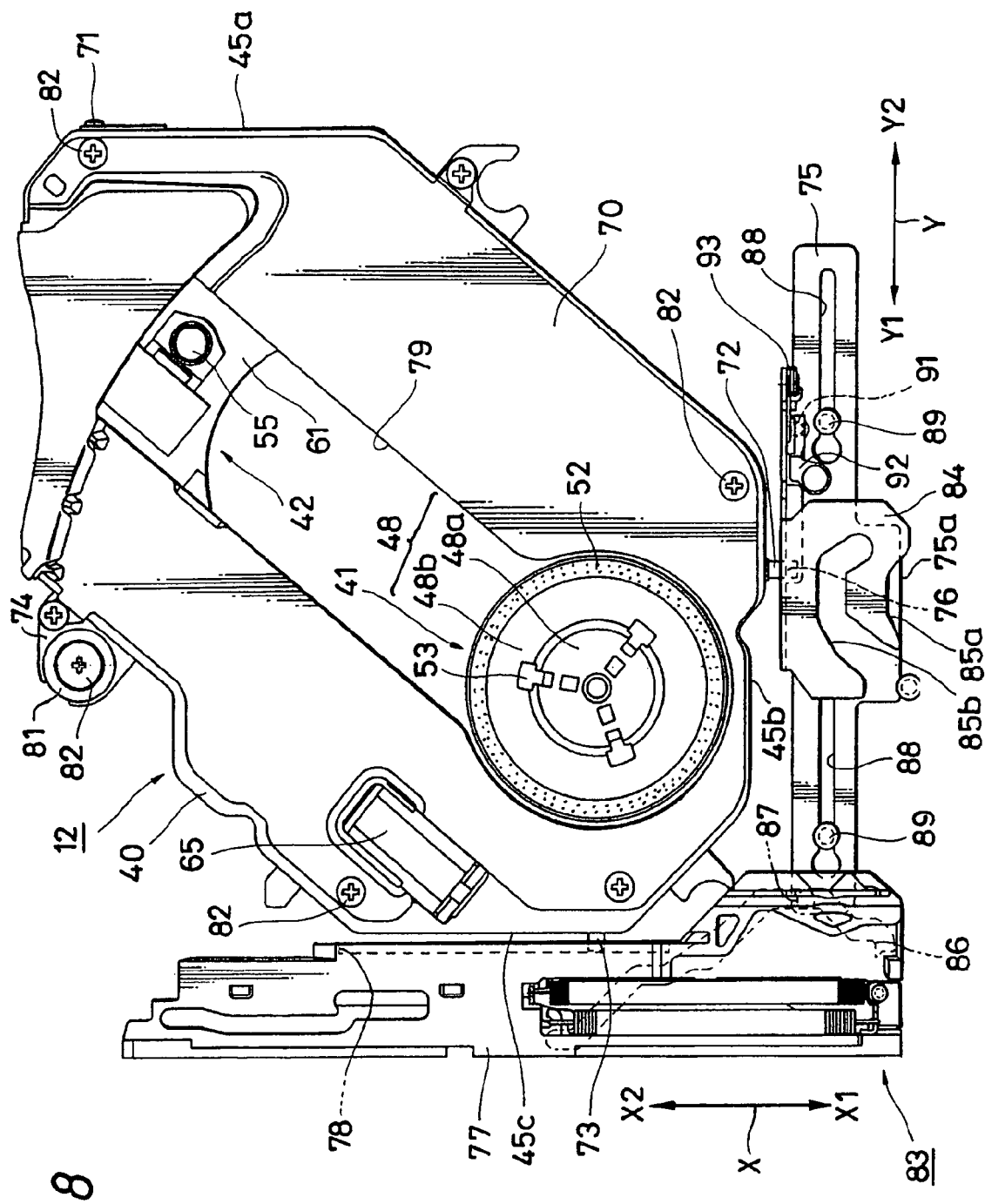
FIG. 8 is a plan view illustrating a relation between a drive unit, a slide plate and a drive lever related to a disk drive apparatus according to an embodiment of the present invention.
Figure 9:
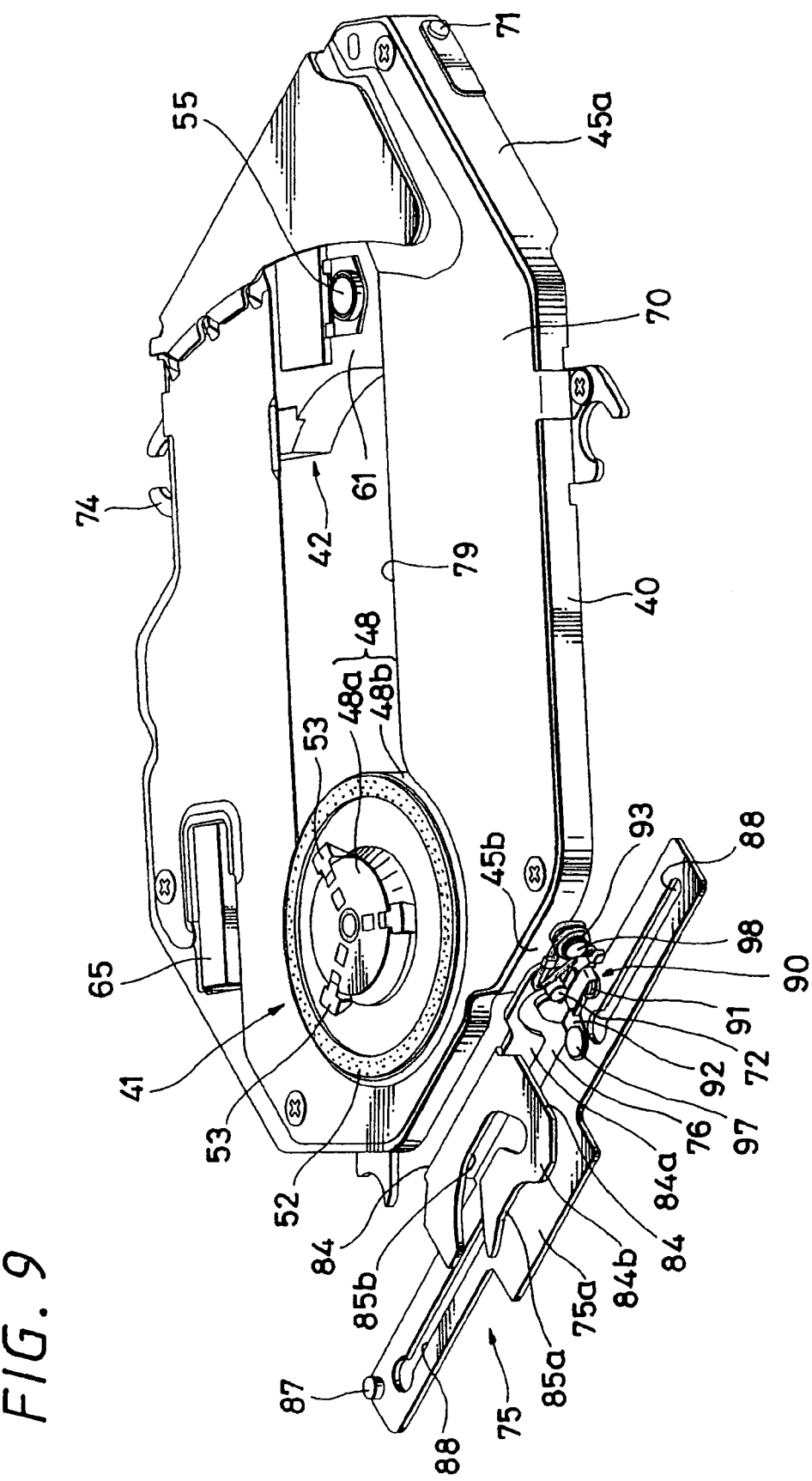
FIG. 9 is a perspective view illustrating a relation between a drive unit and a slide plate related to a disk drive apparatus according to an embodiment of the present invention.
Figure 10:
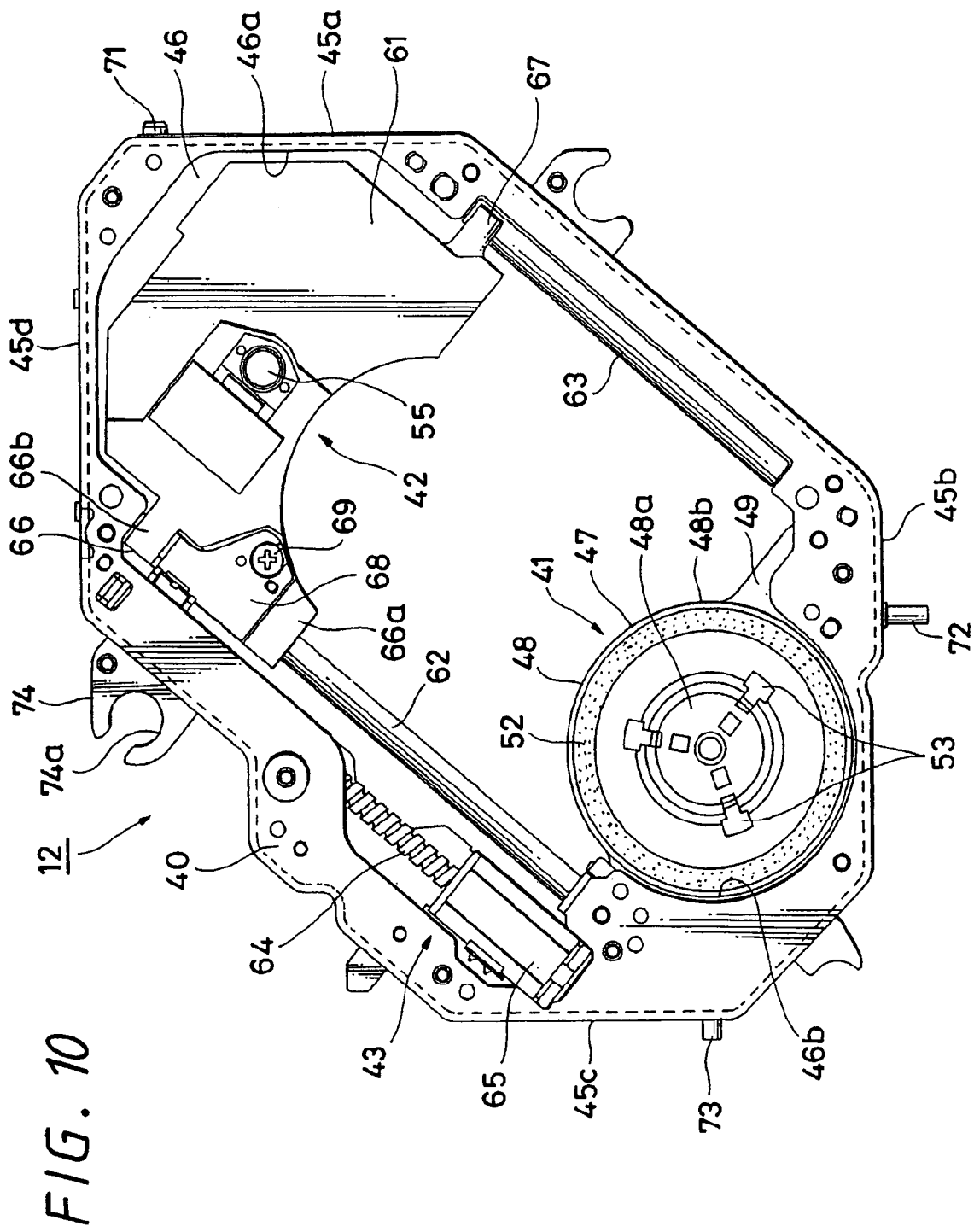
FIG. 10 is a plan view showing the drive unit in which a base cover is removed from the drive unit shown in FIG. 8.

FIG. 1 to FIGS. 30A and 30B are diagrams showing embodiments of the present invention. More specifically, FIG. 1 is a diagram showing a first embodiment of an information recording and/or reproducing apparatus according to an embodiment of the present invention. FIG. 2 to FIG. 4 are diagrams showing a chassis related to a disk drive apparatus according to an embodiment of the present invention. FIG. 5 to FIG. 7 are diagrams showing an internal mechanism of a first embodiment of a disk drive apparatus according an embodiment of the present invention. FIG. 8 to FIG. 10 are diagrams showing a base member, a rotational drive mechanism, and the like. FIG. 11 to FIGS. 15A and 15B are diagrams showing an optical pickup and a flexible wiring board. FIGS. 16A and 16B and FIGS. 17A, 17B are diagrams showing a drive unit and the flexible wiring board. FIG. 18 to FIGS. 23A and 23B are diagrams showing a first embodiment of an attitude adjustment mechanism according to an embodiment of the present invention. FIGS. 24A and 24B to FIGS. 30A and 30B are diagrams showing other embodiments of attitude adjustment mechanisms according to embodiments of the present invention.

First, the first embodiment of the information recording and/or reproducing apparatus that uses the disk drive apparatus according to the embodiment of the present invention is described by referring to FIG. 1. A notebook-type personal computer (hereinafter, referred to as "notebook-type PC") 1 shown in FIG. 1 represents the first embodiment of the information recording and/or reproducing apparatus according to the embodiment of the present invention, on which a slot-in type disk drive apparatus 10 is mounted. The notebook-type PC 1 has an apparatus chassis 2 formed of a rectangular, thin and flat hollow body and a cover body 3 formed of a similarly rectangular, thin and flat hollow body. The apparatus chassis 2 and the cover body 3 are connected in a freely rotatable manner using a hinge portion (not illustrated) on one side of a width direction and configured such that an arbitrary attitude can be maintained in a state that the cover body 3 is open as shown in FIG. 1, a state that the cover body 3 is laid over the apparatus chassis 2, which is not illustrated though, and a state that the attitude is kept at an arbitrary position inbetween both state.

An opening portion 4 leaving a small circumferential fringe is provided on an inside surface of the cover body 3. The opening portion 4 of the cover body 3 faces a display surface of a display unit 5 such as a liquid crystal display, an organic EL display, and a surface-conduction electron-emitter display that is enclosed in the cover body 3. In addition, an input operation member 6 for performing an input operation by a combination of multiple keys is provided on a surface, which corresponds to an upper surface of the apparatus chassis 2, and faces the cover body 3. Although not illustrated, a control unit is contained the apparatus chassis 2. Further, the disc drive apparatus 10 representing the first embodiment of the disc drive apparatus according to the embodiment of the present invention is enclosed in the apparatus chassis 2. The disc drive apparatus 10 is attached such that a front surface of the apparatus faces an opening portion opened in a lateral surface 2a on one side of the apparatus chassis 2 whereas the front surface forms an approximately the same surface as the surface of the apparatus chassis 2.

The information recording and/or reproducing apparatus according to the embodiment of the present invention is not limited to the notebook-type PC 1 shown in this embodiment but is used as a desk top type personal computer, and also used as an apparatus that can perform the recording and reproducing the information signal using the disk-type recording medium or used as various information recording and/or reproducing apparatuses that can perform both of the recording and reproducing.

As examples of the information recording and/or reproducing apparatus, an optical disk type recording apparatus, an optical disk type reproducing apparatus, an optical disk type image-pickup apparatus, a magnetooptical disk type image-pickup apparatus, a magnetooptical disk type recording apparatus, a magnetooptical disk type reproducing apparatus, and the like can be listed as such information recording and/or reproducing apparatus. In these cases, not only can various sizes of disks such as a disk having the diameter of 12 cm and a disk having the diameter of 8 cm be used as the size of the disk-type recording medium to be used but a plurality of optical disks having different diameters can also be used.

The disc drive apparatus 10 shown in FIG. 1 is the slot-in type disk drive apparatus having a structure having a reduced thickness of around 12.7 mm, for example. The disk drive apparatus 10 is included in the notebook-type PC 1 and is integrally driven with the notebook-type PC 1, so that the recording and/or reproducing of the information signal can be performed on an optical disk 7, indicating the disk-type recording medium such as CD and DVD. It should be noted that not only can the optical disks such as play-only CD, CD-ROM and DVD-ROM be used; however, also various optical disks such as a rewritable CD-RW, DVD-R and DVD-RW on which information can be recorded once or recorded repeatedly can be used as the disk-type recording medium according to the embodiment of the present invention.

The disk drive apparatus 10 includes a chassis 11 that corresponds to an external case of a apparatus main body, a drive unit 12 that is enclosed in the chassis 11, and the like. As shown in FIG. 2 to FIG. 4, the chassis 11 has a thin box-shaped case main body 14 having openings in the top surface and in the front surface and having a case cover body 15 covering the top opening portion of the case main body 14. The case main body 14 is formed of a container body formed with a sheet metal, and a bottom portion 14a of the main body forms an approximately rectangular shape. A deck portion 14b having a bottom level raised higher than the bottom portion 14a and projecting outside is provided on one side of a width direction crossing with a longitudinal direction of the case main body 14.

A drive control portion for controlling drives of various devices, mechanisms and the like described later, and a sub-chassis 16 covering part of the drive control portion are disposed in the bottom portion 14a of the case main body 14 shown in FIG. 5 to FIG. 7. The drive control portion has a circuit substrate 17 on which a prescribed wiring circuit is formed, and an electronic component such as an IC chip, a connector 18 for facilitating an electrical connection of each portion, a detection switch for detecting an operation of each portion, and the like are attached to the circuit substrate 17. Among these, the connector 18 is opposed to an opening portion provided on a back portion of the case main body 14 such that the connector 18 can be connected and disconnected from the outside.

The circuit substrate 17 is attached to the bottom portion 14a of the case main body 14 by screwing down and the like. Further, the sub-chassis 16 is disposed above the drive control portion such that the inside of the case main body 14 is partitioned into upper and lower portions at an approximately the same height as the deck portion 14b, and the sub-chassis 16 is fixed to the bottom portion 14a by screwing, or the like.

The case cover body 15 has a shape corresponding to the flat shape of the case main body 14 and is formed of a comparatively thin sheet metal. Bending portions 15a formed such that the case cover body 15 is bent slightly along both lateral surfaces and back surface of the case main body 14 are provided on three sides of the case cover body 15 excluding a side corresponding to the front opening portion of the case main body 14. The bending portions 15a of the three sides are overlapped on respective top portions of the both lateral surfaces and back surface of the case main body 14 to engage one another when the case cover body 15 is assembled to the case main body 14.

An approximately circular opening portion 19 is provided on an approximately center portion of the case cover body 15. Further, a plurality (three places in this embodiment) of through-holes 21 to penetrating fixing screws therein are provided on outer edge portions of the case cover body 15. Corresponding to respective through-holes 21, fixing strips having screw holes are provided at corresponding positions of the case main body 14. The case cover body 15 is attached to the case main body 14 and tightly fixed by the fixing screws screwed into the screw holes by penetrating through those through-holes 21. A front panel 22 is attached to a front face of the chassis 11 formed of the case main body 14 and the case cover body 15 such that an opening portion 23 formed in the front face of this chassis is covered with the front panel 22.

As shown in FIGS. 20A and 20B, the front panel 22 is formed of an elongated plate-like member having a size that can cover the whole front face of the chassis 11 including the opening portion 23. A disk insertion slot 24 extended in the longitudinal direction is provided on one side of a width direction of the front panel 22. A size (length and width) of the disk insertion slot 24 is a little larger than the diameter and thickness of the optical disk 7 to be used. In a case that the plurality of optical disks 7 having different diameters can be used, the length of the disk insertion slot 24 is a little larger than the diameter of the optical disk having the largest diameter.

The optical disk 7 is inserted from the disk insertion slot 24 into the chassis 11, and the optical disk 7 is ejected from the disk insertion slot 24 to the outside of the chassis 11. Further, a panel curtain 25 to prevent a dust and the like from entering inside of the chassis 11 from the outside is provided inside of the disk insertion slot 24 of the front panel 22. The panel curtain 25 is formed of a pair of pliable film members (or sheet members) having bending flexibility that are disposed on the both sides of the width direction of the disk insertion slot 24. The panel curtain 25 covers the whole disk insertion slot 24 as shown in FIG. 20A while the optical disk 7 is not passing through, so that the dust and the like are prevented from entering through this slot. On the other hand, when the optical disk 7 passes through the disk insertion slot 24, the panel curtain 25 is bent elastically on the side of the movement of the optical disk 7 as shown in FIG. 20B, so that the passage of the optical disk 7 is allowed but the disk and the like are prevented from entering.

Further, an eject button 28 to be depressed to eject the optical disk 7 inserted in the inside of the chassis 11 is provided on the front face of the front panel 22 as shown in FIG. 1. A disk transfer mechanism 30 to transfer the optical disk 7 is provided between the disk loading position inside of the disk insertion slot 24 and the disk ejection position outside of the disk insertion slot 24 in the chassis 11. More specifically, the disk transfer mechanism 30 holds the optical disk 7 inserted from the disk insertion slot 24 and transfers the optical disk 7 to the disk loading position where a disk loading portion 26 is located. In addition, the disk transfer mechanism holds and transfers the optical disk 7 placed on the disk loading portion 26 in order to transfer the optical disk 7 to the disk ejection position such that a top portion of the optical disk 7 is projected in a prescribed amount from the disk insertion slot 24.

As shown in FIG. 5 to FIG. 7, the disk transfer mechanism 30 has a main surface facing the disk loading portion 26 of the case cover body 15 and two rotatable arms 31 and 32 as support members movably operated against the main surface of the optical disk 7 inserted from the disk insertion slot 24. The first rotatable arm 31 and the second rotatable arm 32 are respectively formed of long sheet metals and disposed on both sides of a left-right direction interposing the disk loading portion 26 disposed in an approximately center portion of the chassis 11. Further, the first rotatable arm 31 and the second rotatable arm 32 are rotatably supported with base end portions 31a and 32a positioned on further back side of the disk loading portion 26 through support shafts provided on the sub-chassis 16. Accordingly, respective top end portions 31b and 32b of the first rotatable arm 31 and second rotatable arm 32 are positioned on further front side of the disk loading portion 26, and the respective top end portions 31b and 32b face the inside of the disk insertion slot 24.

Front side fitting contact members fitted with the outer circumferential portion of the inserted optical disk 7 are respectively provided on top end portions 31b and 32b of the first rotatable arm 31 and second rotatable arm 32. Further, a rear side fitting contact member that is fitted with the outer circumferential portion of the optical disk 7 in combination with the front side fitting contact member when locating the optical disk 7 to the disk loading position at the base end portion 31a of the first rotatable arm 31. Those fitting contact members are respectively provided, so that the fitting contact members are projected in a downward direction. The front side fitting contact members and the rear side fitting contact member are formed of a resin that is softer material than that formed of the optical disk 7. Further, each fitting contact member forms a drum shape by forming an axis diameter of a center portion smaller than axis diameters of both outside portions in order to prevent a slippage of the optical disk 7 and the like.

The first rotatable arm 31 and the second rotatable arm 32 are configured such that those rotatable arms are interlocked by interlocking mechanism (not illustrated) and rotatable in mutually reverse directions. More specifically, the top end portion 31b of the first rotatable arm 31 and the top end portion 32b of the second rotatable arm 32 are capable of swinging in a mutually approaching or departing direction by the interlocking mechanism. Further, twist coil springs used as biasing members to bias rotatable arms 31 and 32 in the mutually approaching direction are provided to the base end portions 31a and 32a of the first rotatable arm 31 and second rotatable arm 32, respectively, although not illustrated.

In addition, the disk transfer mechanism 30 has a third rotatable arm 33 in order to assist the loading operation to draw the optical disk 7 into the chassis 11 from the disk insertion slot 24. The third rotatable arm 33 is formed of a long sheet metal and disposed at a little further front side of the tope end portion 31b of the first rotatable arm 31. A base end portion 33a of the third rotatable arm 33 is rotatably supported by a spindle provided on the deck portion 14b of the case main body 14. A third fitting contact member to be fitted with the front side of the outer circumferential portion of the optical disk 7 inserted from the disk insertion slot 24 is provided rotatably on a top end portion 33b of the third rotatable arm 33. The third fitting contact member is supported, so that the fitting contact members are projected in a downward direction.

Further, the disk transfer mechanism 30 has a fourth rotatable arm 34 in order to assist the eject operation to eject the optical disk 7 from the disk insertion slot 24 to the outside of the chassis 11. The fourth rotatable arm 34 is formed of a long sheet metal and a base end portion 34a of this rotatable arm is supported rotatably at a middle portion of the first rotatable arm 31. A fourth fitting contact member to be fitted with the rear side of the outer circumferential portion of the optical disk 7 inserted from the disk insertion slot 24 is provided rotatably at a top end portion 34b of the fourth rotatable arm 34. The fourth fitting contact member is supported, so that the fitting contact members are projected in a downward direction.

The third fitting contact member and the fourth fitting contact member are formed of a resin that is softer than the optical disk 7. Further, each fitting contact member forms a drum shape by forming an axis diameter of a center portion smaller than axis diameters of both outside portions in order to prevent a slippage of the optical disk 7 and the like.

In addition, the disk transfer mechanism 30 has a drive lever 77 to cooperate the first to the fourth rotatable arms 31, 32, 33 and 34. As shown in FIG. 6 and FIG. 8, the drive lever 77 is formed of a flat board-type member and is held in a manner movable in a front-rear direction within a prescribed range in the bottom portion 14a of the case main body 14. The drive lever 77 is positioned lower than the optical disk 7 that is inserted from the disk insertion slot 24 into the chassis 11, and an upper portion of this lever is located at an approximately same height as the bottom portion of the deck portion 14b. The drive lever 77 is slidably driven in the front-rear direction by a lever drive mechanism (including a drive motor, a group of gears) that is provided on the bottom portion 14a of the case main body 14, although not illustrated.

The first rotatable arm 31 and the second rotatable arm 32 are rotatably operated toward the mutually opposite directions through the interlocking mechanism by the sliding movement of the drive lever 77 in the front-rear direction. The third rotatable arm 33 and the fourth rotatable arm 34 are rotatably operated similarly in cooperation with each other. Thus, the first rotatable arm 31, the second rotatable arm 32, the third rotatable arm 33 and the fourth rotatable arm 34 mutually cooperate such that the loading operation, the centering operation and the eject operation are conducted.

The loading operation is configured to draw the optical disk 7 from the disk insertion slot 24 into the chassis 11. The centering operation is configured to locate the optical disk 7 drawn into the chassis 11 at the disk loading position of the disk loading portion 26. In addition, the eject operation is configured to eject the optical disk 7 from the disk insertion slot 24 to the outside of the chassis 11 by depressing the eject button 28 performed by the operator.

Next, the operation of transferring the optical disk 7 performed by the disk transfer mechanism 30 is described. FIG. 5 shows a state that a disk having a large diameter 7L or a disk having a small diameter 7S is inserted from the disk insertion slot 24 into the chassis 11 (ejecting from the disk insertion slot 24 to the outside of the chassis 11 is also similar). In this embodiment, the optical disks 7 can be transferred to the disk loading position by holding the respective outer circumferences corresponding to the sizes of the optical disks 7 when the optical disks 7 having the different diameters (for example, the large diameter disk 7L and the small diameter disk 7S) are inserted from the disk insertion slot 24.

When the optical disk 7 is inserted from the disk insertion slot 24 as shown in FIG. 5 and FIG. 20B, a detection switch (not illustrated) detects that the optical disk 7 is inserted at a prescribed position. Thus, the operation of the disk transfer mechanism 30 is started such that the optical disk 7 is held by the four fitting contact portions through the actions of the first to the fourth rotatable arms 31 to 34 and is transferred to the disk loading position. FIG. 6 shows a state that the large diameter disk 7L is transferred to the disk loading position. In addition, FIG. 7 shows a state that the small diameter disk 7S is transferred to the disk loading position. In the disk loading positions described above, the large diameter disk 7L or the small diameter disk 7S is chucked onto a turntable 48 of the disk loading portion by an action of a base movement mechanism 83 which is described later.

On the other hand, the chucking of the large diameter disk 7L or small diameter disk 7S by the turntable 48 is released when the operator depresses the eject button 28. Simultaneously, an opposite operation of the disk transfer mechanism 30 is started such that the optical disk 7 is held by the four fitting contact portions through the actions of the four rotatable arms that are the rotatable arms 31 to 34 from the first to the fourth and is transferred from the disk loading position shown in FIG. 6 or FIG. 7 to the disk ejection position shown in FIG. 5.

The drive unit 12 is configured to have a base member 40, a rotational drive mechanism 41, an optical pickup 42, a pickup movement mechanism 43 and the like as shown in FIG. 8 to FIG. 10. The rotational drive mechanism 41 has the turntable 48 that becomes the disk loading portion, so that the optical disk 7 transferred by the disk transfer mechanism 30 is loaded on the turntable 48 and rotationally driven at a prescribed speed (for example, at a constant line speed). The optical pickup 42 writes new information on the optical disk 7 loaded and rotationally driven on the turntable 48 by irradiating an information recording surface of this optical disk with light beams, or reads information prerecorded from the information recording surface by reading reflection light of the irradiated light beams.

The pickup movement mechanism 43 moves the optical pickup 42 outwardly in the radius direction along the information recording surface of the optical disk 7 loaded and rotationally driven on the turntable 48. The recording and/or reproducing operation of the information signal is performed by the optical pickup 42 when outwardly moving in the radius direction. The rotational drive mechanism 41, optical pickup 42 and pickup movement mechanism 43 are installed on the base member 40 attached to the chassis 11 in a manner capable of changing an attitude inside of the chassis 11.

The base member 40 is formed such that a sheet metal is cut out into a prescribed shape and an outer circumference thereof is bent in a in a slightly downward direction. A planar shape of the base member 40 forms a frame body having an approximately octagonal shape with a horizontally long form as a whole such that large chamfer portions are provided at four corners of a rectangle and a large opening portion 46 is provided inside as shown in FIG. 10. The opening portion 46 has a pickup opening portion 46a to expose an upper part of the optical pickup 42 and a table opening portion 46b to drive the turntable of the rotational drive mechanism 41 to face upward. The pickup opening portion 46a forms an approximately rectangular shape of large size in order to expose the entire upper part of the optical pickup 42, and the table opening portion 46b forming an approximately circular shape is disposed at one side of the longitudinal direction of this pickup opening portion.

The rotational drive mechanism 41 is disposed in the table opening portion 46b. The rotational drive mechanism 41 has a spindle motor 47 including the turntable 48 on which the optical disk 7 is removably loaded and a support plate 49 that supports the spindle motor 47 by fixing on the base member 40 as shown in FIG. 10 and FIGS. 20A and 20B. The turntable 48 is mounted on a rotation portion of the spindle motor 47 integrally as one body and is supported in a freely rotatable manner by a fixing portion 47a that is fixed to the support plate 49. The support plate 49 that supports the spindle motor 47 is attached by screwing down on a lower surface of the base member 40 such that a mounting portion 48b of the turntable 48 projects slightly upward from the table opening portion 46b of the base member 40.

The turntable 48 has an engagement portion 48a formed of a column-shaped convex portion that is engaged with a center hole 7a of the optical disk 7 and the mounting portion 48b on which a circumferential portion of the center hole 7a of the optical disk 7 is mounted. The engagement portion 48a and the mounting portion 48b are integrally formed and a ring-shaped cushion material 52 to cushion against the contact with the optical disk 7 is attached to the mounting portion 48b. A plurality (three pieces in this embodiment) of latch nails 53 to be engaged with the center hole 7a of the optical disk 7 are disposed at equal intervals in a circumferential direction in the engagement portion 48a. Each latch nail 53 is biased by an elastic member such as a coil spring though not illustrated, and each top end portion is projected outward in the radial direction from a circumferential surface of the engagement portion 48a. The latch nails 53 form a chucking mechanism such that the optical disk 7 is held on the turntable 48 by forming all the latch nails 53 engaged with the center hole 7a.

The optical pickup 42 is configured such that this optical pickup 42 capable of approaching and departing from the rotational drive mechanism 41 within a prescribed range. The optical pickup 42 has a semiconductor laser that becomes a light source to emit light beams and an optical detector including a light-sensitive element to receive the rerotating light beams and the like. In the optical pickup 42, the light beams are emitted from the semiconductor laser; the light beams are focused and irradiated on the information recording surface of the optical disk 7 using an object lens 55; and the light beams reflected and rerotated from the information recording surface are received by the optical detector. Thus, the information signal can be read from or write on the optical disk 7.

In addition, the optical pickup 42 has an object lens drive mechanism 56 such as a biaxial actuator to drive and displace the object lens 55 to an optical axis direction (hereinafter, referred to as "focusing direction") and a direction orthogonal to a recording track of the optical disk 7 (hereinafter referred to as "tracking direction", hereinafter). The object lens drive mechanism 56 focuses the object lens 55 on the information recording surface while displacing the object lens 55 in the focusing direction and the tracking direction based on a detection signal that is detected from the optical disk 7 by the optical detector. Accordingly, the drive control such as a focusing servo to focus the object lens 55 on the information recording surface and a tracking servo to form spots of the light beams focused by the object lens 55 to follow the recording track are conducted. The optical pickup 42 is mounted on the base member 40 through the pickup movement mechanism 43 such that the optical pickup 42 is capable of approaching and departing from the turntable 48 within the prescribed range.

The pickup movement mechanism 43 has a pickup base 61, a pair of guide shafts 62 and 63, a lead screw shaft 64 and a drive motor 65. The pickup base 61 is formed of a flat block-shaped member having the biaxial actuator, the optical detector, and the like enclosed therein and is movably supported by the pair of guide shafts 62 and 63. The pair of guide shafts 62 and 63 are disposed in approximately parallel mutually leaving a prescribed interval on one side of the turntable 48 at the lower side of the base member 40. Further, the pair of guide shafts 62 and 63 are respectively supported at both ends by bearing portions at four places of the base member 40. Each bearing portion is formed of a retainer plate that is a separate member from a bearing strip provided on the base member 40, and the pair of guide shafts 62 and 63 are tightly fixed to the base member 40 such that each guide shaft is held between the bearing strip and the retainer plate by screwing into the retainer plate.

The pickup base 61 has a first bearing portion 66 and a second bearing portion 67 which project to both outersides orthogonal to the axis directions of the pair of guide shafts 62 and 63. The first bearing portion 66 includes a front bearing portion 66a and rear bearing portion 66b having bearing holes through which the first guide shaft 62 is slidably inserted. The front and rear bearing portions 66a and 66b are disposed in the same plane leaving a prescribed interval in the axis direction of the first guide shaft 62. A rack 68 having an engagement portion to engage with a screw groove of the lead screw shaft 64 is disposed between the front and rear bearing portions 66a and 66b. The rack 68 is screwed down on the pickup base 61 using a fixing screw 69.

A guide groove having a lateral opening is provided on the second bearing portion 67. The second guide shaft 63 is slidably inserted through this guide groove. The pickup base 61 is slidably supported by the second guide shaft 63 piercing the second bearing portion 67 and the first guide shaft 62 piercing the front and rear bearing portions 66a and 66b of the first bearing portion 66. The lead screw shaft 64 is approximately disposed in parallel leaving a prescribed interval between this shaft and the first guide shaft 62. The lead screw shaft 64 corresponds to a rotational shaft of the drive motor 65, and the drive motor 65 is fixed to the base member 40 with a mounting bracket though not illustrated. A top end side of the lead screw shaft 64 is supported rotatably at the mounting bracket. This mounting bracket is screwed down on the base member 40, and the lead screw shaft 64 and the drive motor 65 are attached to the base member 40.

One end of a flexible wiring board 111 is connected with the pickup base 61 as shown in FIG. 11 to FIG. 14. The flexible wiring board 111 is a pliable wiring member having bending flexibility used to connect electrically the optical pickup 42 held on the base member 40 with a power source side connector (not illustrated) located outside of the disk drive apparatus 10. The flexible wiring board 111 has a first connection portion 111a attached to the pickup base 61 and a second connection portion 111b connected with the power source side connector. The first connection portion 111a and the second connection portion 111b are forming a Y-bend shape having a prescribed angle inbetween, and a base portion 111c continuous with the both portions is formed as a sufficiently large planar portion.

A wiring circuit group 113 having multiple wiring circuits is formed on the flexible wiring board 111, and each wiring circuit runs respectively continuous from the first connection portion 111a to the second connection portion 111b. Each wiring circuit of the wiring circuit group 113 is formed with a wider width in the base portion 111c and with gradually narrower width toward each top end of the first connection portion 111a and second connection portion 111b. Moreover, an overhang portion 111d is provided on the base portion 111c such that a part of this base portion overhangs toward the inside. A main purpose of the overhang portion 111d is to prevent the flexible wiring board from entangling due to an uplift when moving the pickup base to the inner and outer circumferences. A waste land 114 formed of the same material as that forming the wiring circuit but does not form the wiring circuit is provided on the inside of the overhang portion 111d.

The waste land 114 is set beforehand as the waste land for minimizing a damage caused by an external force since the second bearing portion 67 of the optical pickup first comes into contact with a part of this waste land when the base unit is lowered onto the case bottom side by the external force and the like such as a shock in the flat type slot-in disk drive apparatus. In addition, the waste land 114 Also has an effect of improving the strength against bending force in the base portion 111c and preventing the stress from enormously applying on the wiring circuit group 113 running through the base portion 111c by bearing the stress generated when a bending position is shifted. When the disk drive apparatus 10 is assembled in the chassis 11, the flexible wiring board 111 is bent at 180 degree on the base portion 111c as shown in FIGS. 15A and 15B to FIGS. 17A and 17B, and a position of a bending portion also shifts by the movement of the optical pickup 42. Moreover, a curvature radius at the bending portion of the base portion 111c becomes smaller since the disk drive apparatus 10 is the flat type and approximately whole of the flexible wiring board 111 is enclosed in the inside of the chassis 11. As a result, the internal stress has been remarkably large at the bending portion of the flexible wiring board 111.

Furthermore, the optical disk 7 collides to the bending portion since the optical disk 7 is inserted in and taken out of the chassis 11, and the large internal stress is also generated in the wiring circuit group 113 of the bending portion due to the external force at collision. As a result, each wiring circuit of the wiring circuit group 113 is disconnected and a fire is caused to occur since the internal stress becomes remarkably large by the collision of the optical disk 7, the shift of the bending portion and the like in the disk drive apparatus of related art without having the waste land 114. However, the disconnection and fire of the wiring circuit group 113 can be prevented by improving the strength through the waste land 114 provided on the base portion 111c of the flexible wiring board 111 as described in this embodiment.

In addition, the tope end portion of the first connection portion 111a of the flexible wiring board 111 forms the two-thronged shape as shown in FIG. 11 to FIGS. 13A and 13B, and hence a terminal portion 112a and a fixing portion 112b are formed in parallel leaving a prescribed interval. A pickup side reinforcement plate 115 to reinforcingly support one end of each wiring circuit of the wiring circuit group 113 is attached to the top end of the terminal portion 112a, and a power source side reinforcement plate 116 to reinforcingly support the other end of each wiring circuit of the wiring circuit group 113 is attached to the top end of the second connection portion 111b. The power source side of the wiring circuit group 113 is removably connected with a power source side connector (not illustrated) through the power source side reinforcement plate 116. Further, the pickup side of the wiring circuit group 113 is removably connected with a connector 121 mounted on an upper surface of the pickup base 61 through the pickup side reinforcement plate 115.

The connector 121 is attached such that a connecting port faces on the opposite side of a surface of the pickup base 61 facing the rotational drive mechanism 41, and each terminal on the pickup side of the wiring circuit group 113 can be connected from a lateral side. The connector 121 is electrically connected with an electronic device, an electrical part and the like such as the object lens drive mechanism 56 and the optical detector through a printed wiring board and the like though not illustrated. Further, an actuator cover 122 and a pickup cover 123 are attached to an upper surface of the pickup base 61. The actuator cover 122 covers a part of the object lens drive mechanism 56 such that a portion excluding the object lens 55 is covered. The pickup cover 123 covers approximately one half of the upper surface of the pickup base 61, and hence external light is prevented from entering into an optical path through which light beams of an optical system of the optical pickup 42 pass.

A mounting strip 124 projecting to the opposite side of a surface facing the rotational drive mechanism 41 is provided on the pickup cover 123. The mounting strip 124 is disposed in parallel leaving a prescribed interval on a lateral side of the connector 121, and a height of this strip is located at an approximately the same height as the connecting port of the connector 121. An engagement convex portion 125 formed of a circular bulged portion projecting to one side is provided on the mounting strip 124. As a material of the pickup cover 123, a metal such as a stainless steel (SUS), an iron plate and a copper plate, for example, is suitable but engineering plastics and the like can also be used.

Figure 14A:
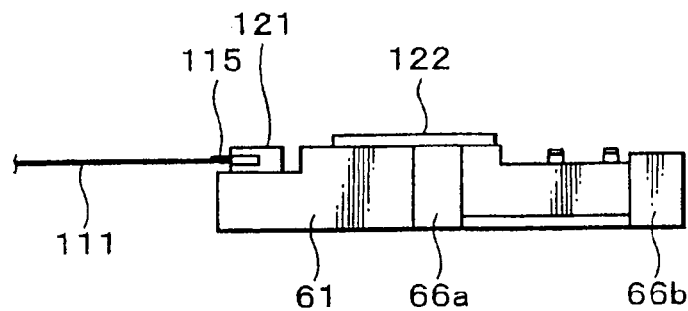
Figure 14B:
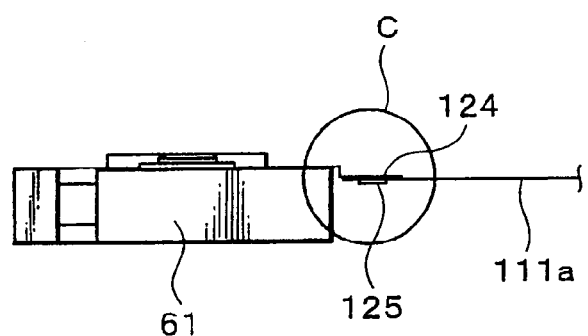
Figure 14C:
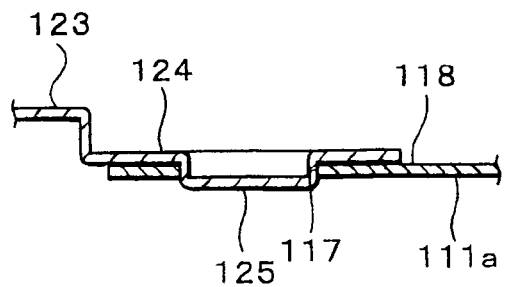
Figure 15A:
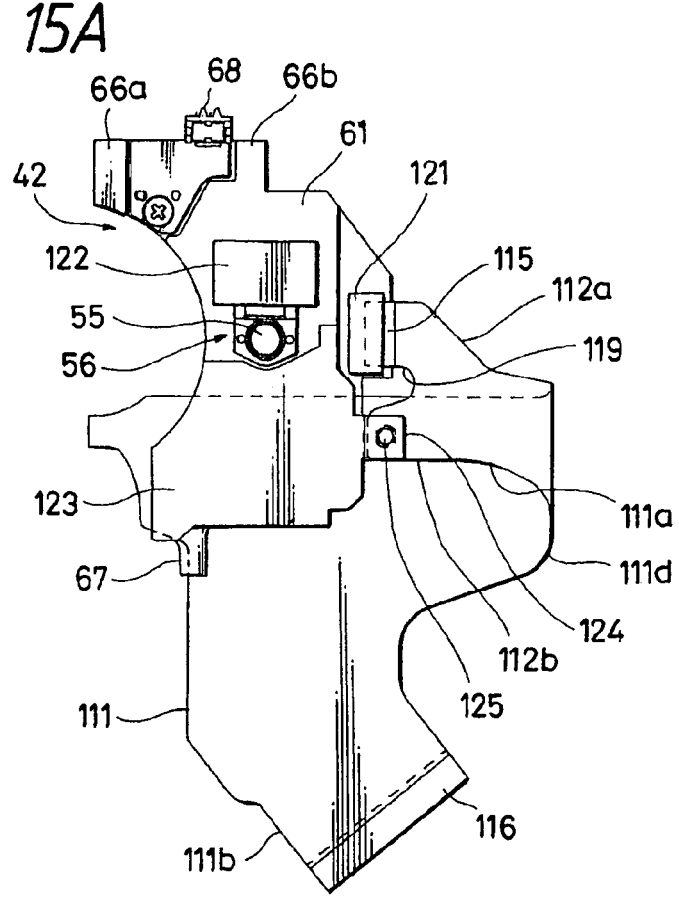
Figure 15B:
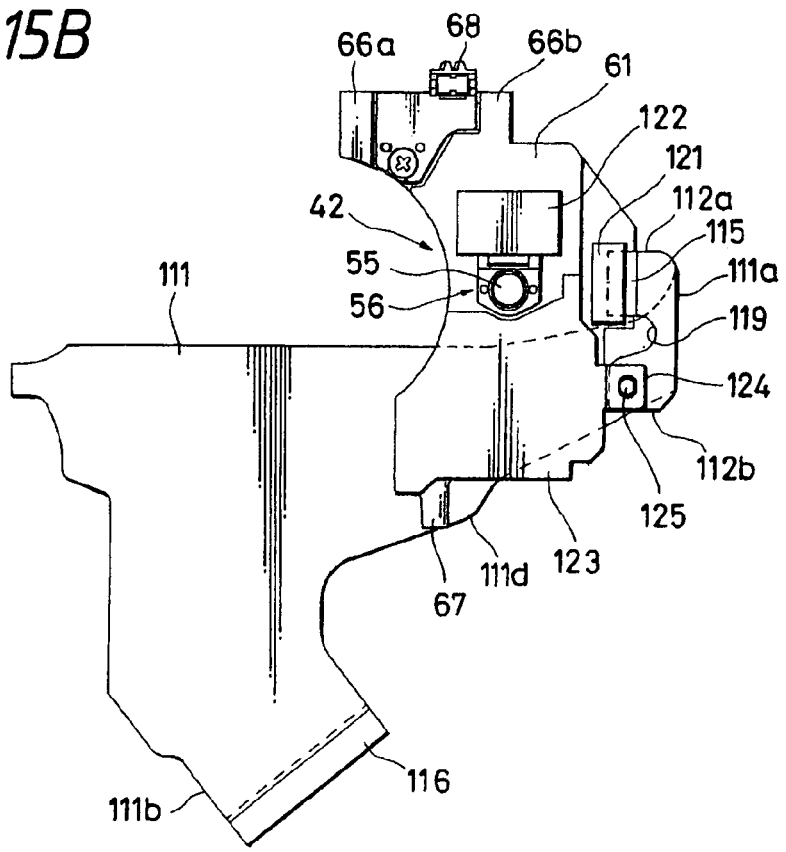
Figure 16A:
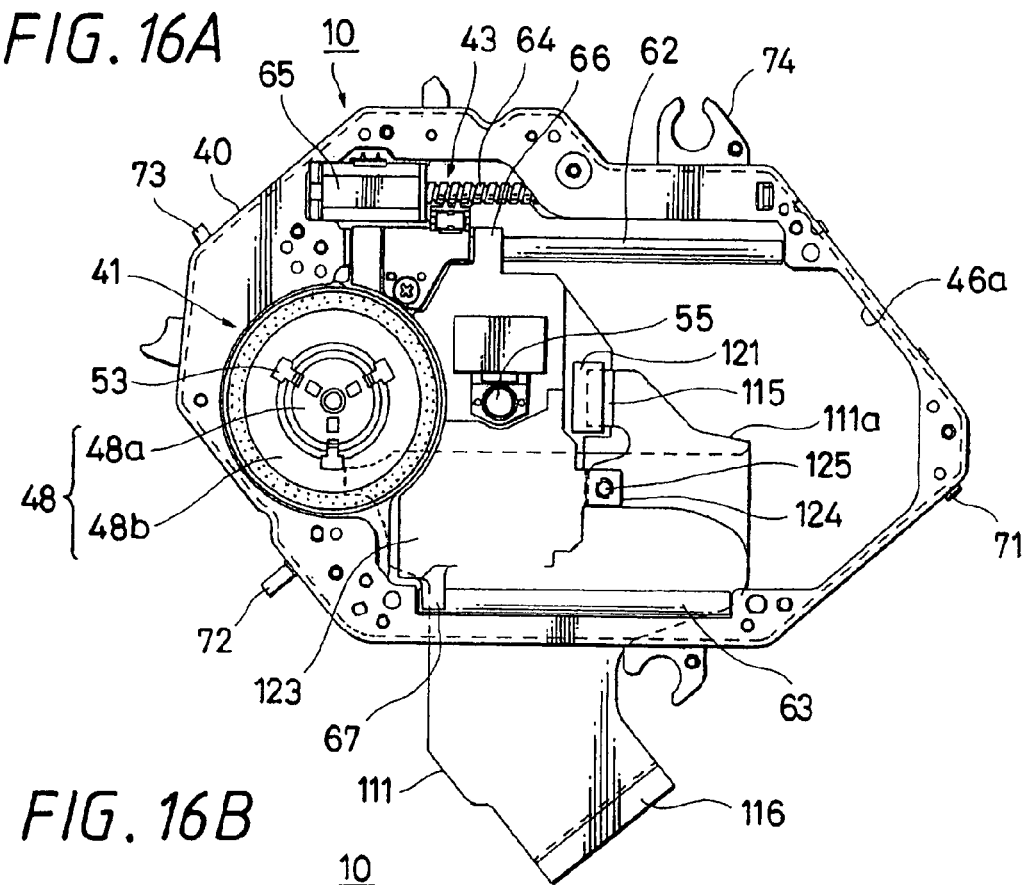
Figure 16B:
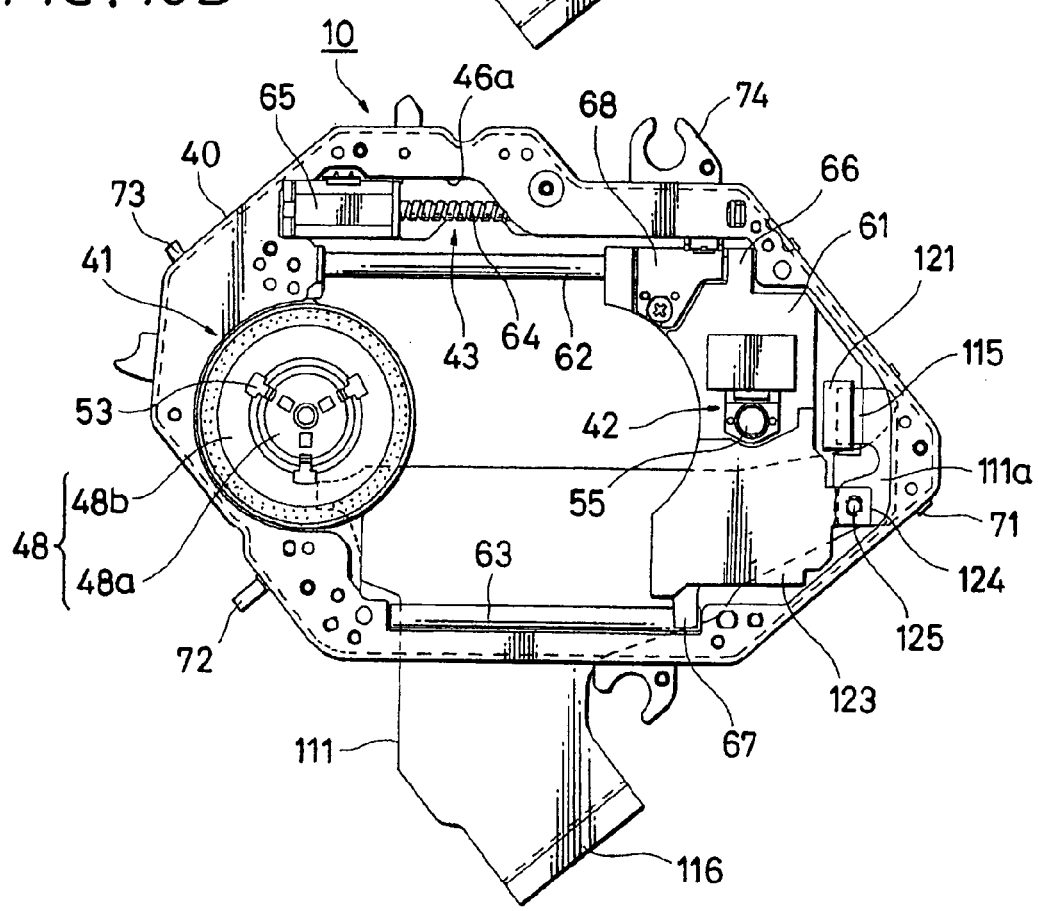

The above-described terminal portion 112a and the above-described fixing portion 112b are provided on the top end of the first connection portion 111a of the flexible wiring board 111 correspondingly to the connector 121 And the mounting strip 124 on the pickup cover 123. The fixing portion 112b is provided in order to bear the whole or the most of the external force applied on the first connection portion 111a during the movement of the optical pickup 42 after the assembly, so that the external force applied on the terminal portion 112a is reduced or the external force is not applied at all. An engagement hole 117 to be engaged with the engagement convex portion 125 of the mounting strip 124 is provided on the fixing portion 112b (FIGS. 14B and 14C). The engagement hole 117 forms an elongate hole extending in a direction orthogonal to an extending direction of the pickup reinforcement plate 115. Since the engagement hole 117 forms the elongate hole, an error of an interval between the connector 121 And the engagement convex portion 125 caused by an assembly error and the like is absorbed, so that the unnecessary stress caused by such an error is not applied on the terminal portion 112a, and an error in a width direction after inserting into the connector is absorbed, so that the positional accuracy in the rotational direction of the whole flexible wiring board can be increased.

Further, a bonding layer 118 formed of an adhesive is applied to a prescribed range on the fixing portion 112b of the first connection portion 111a. The bonding layer 118 is provided in order to increase the bonding strength of the fixing portion 112b against the mounting strip 124 By bonding the fixing portion 112b to one surface of the mounting strip 124. The bonding layer 118 is formed by applying the adhesive and can be also provided by sticking a two-sided tape having bonding layers provided on both sides, for example. Since the fixing portion 112b having the bonding layer 118 bears most of the external force applied on the first connection portion 111a, a large stress is generated in a portion continuous with the terminal portion 112a. Therefore, a circular arc-shaped escape portion 119 having a large curvature radius is provided on the continuous portion between the terminal portion 112a and the fixing portion 112b in this embodiment, so that the escape portion 119 prevent the large stress from generating in a bottom end portion of the fixing portion 112b.

Figure 11:
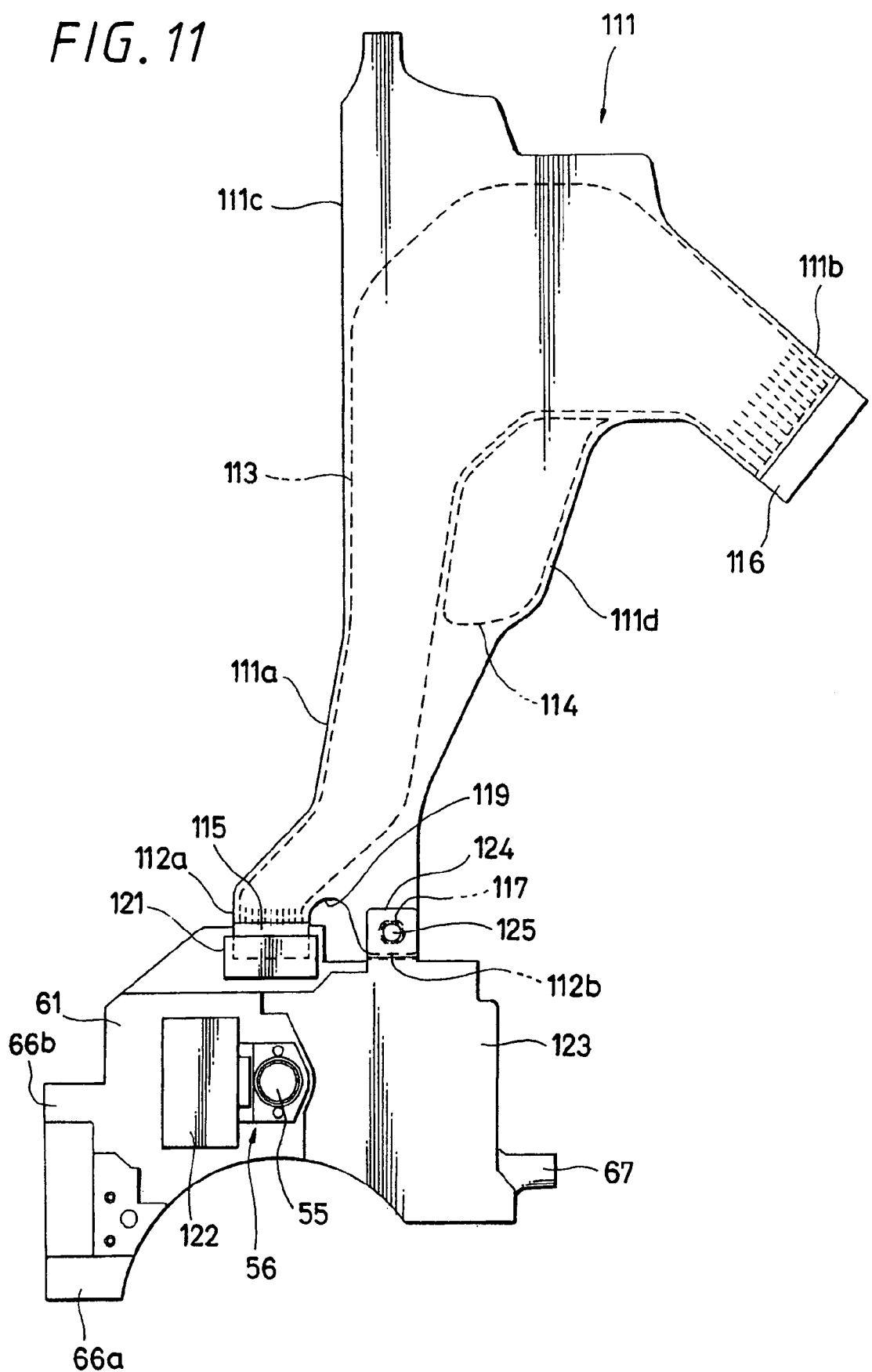
FIG. 11 is a plan view showing an optical pickup and a flexible wiring board related to a disk drive apparatus according to an embodiment of the present invention, in which the plan view shows a state after the flexible wiring board and a pickup base are connected.
Figure 12:
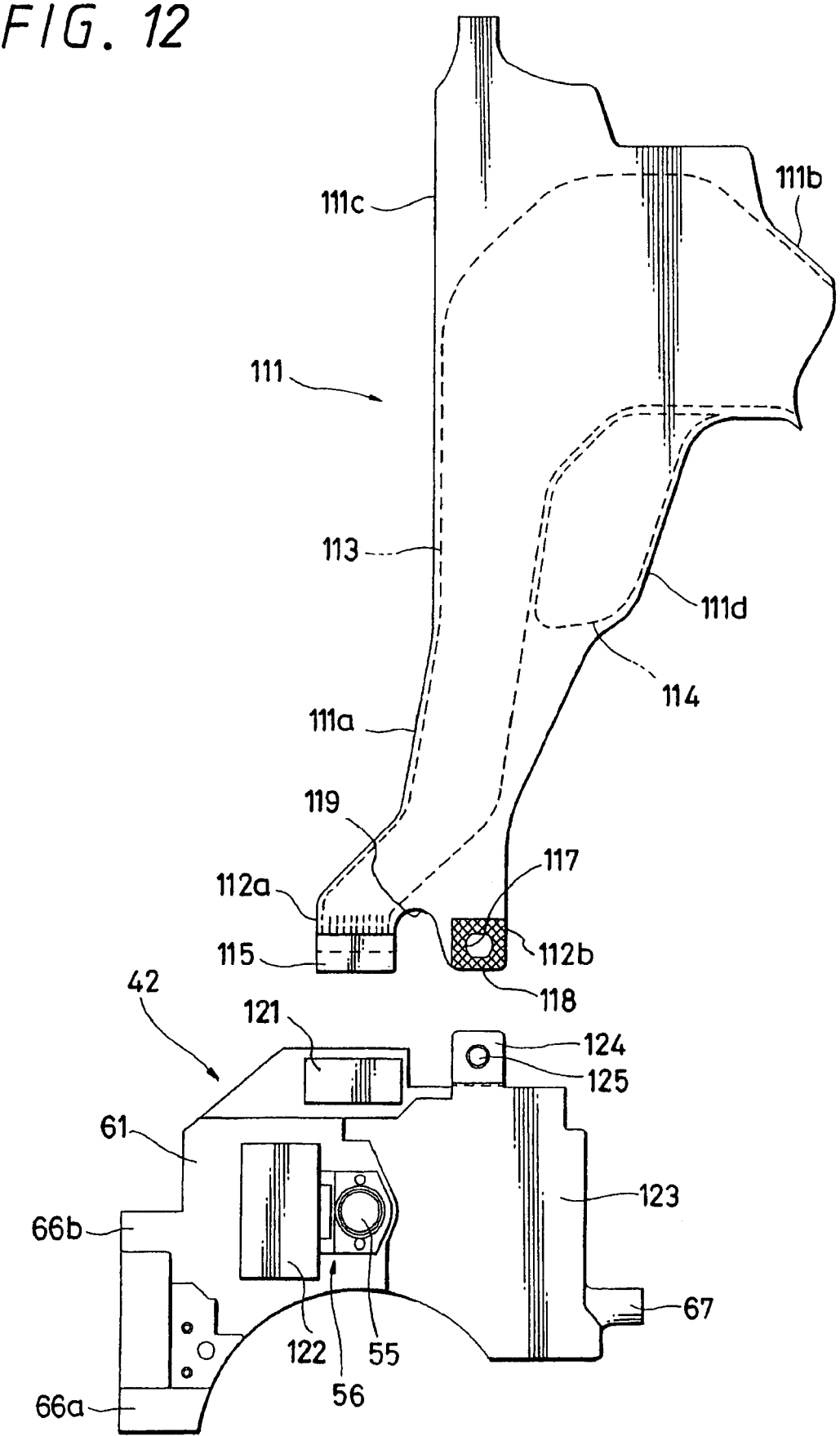
FIG. 12 is a plan view showing an optical pickup and a flexible wiring board related to a disk drive apparatus according to an embodiment of the present invention, in which the plan view shows a state before connecting the flexible wiring board and a pickup base.
Figure 13A:
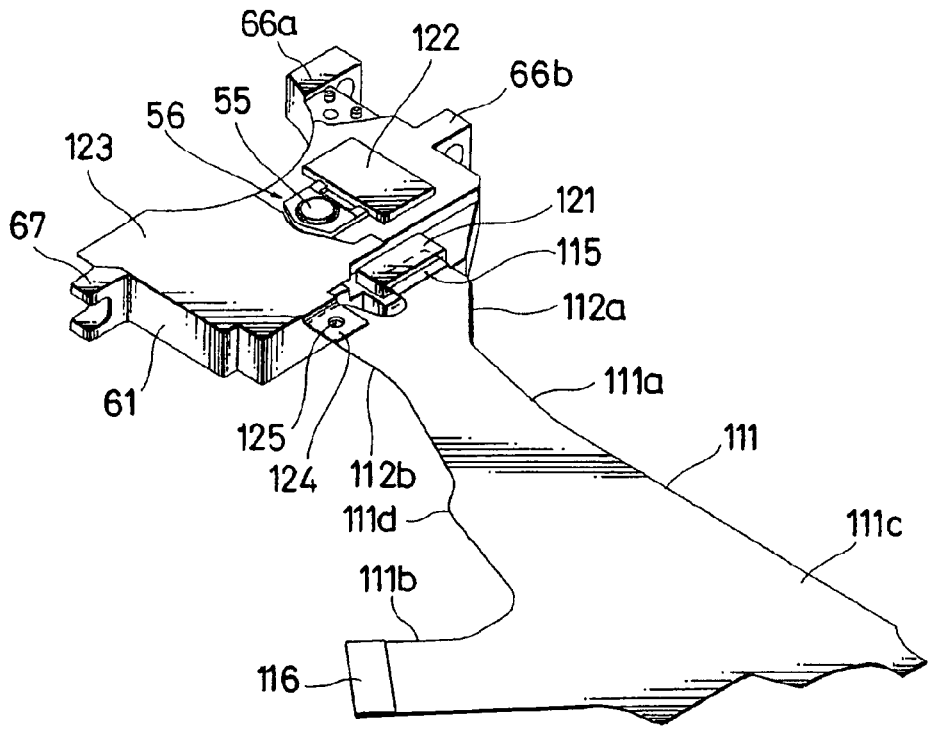
Figure 13B:
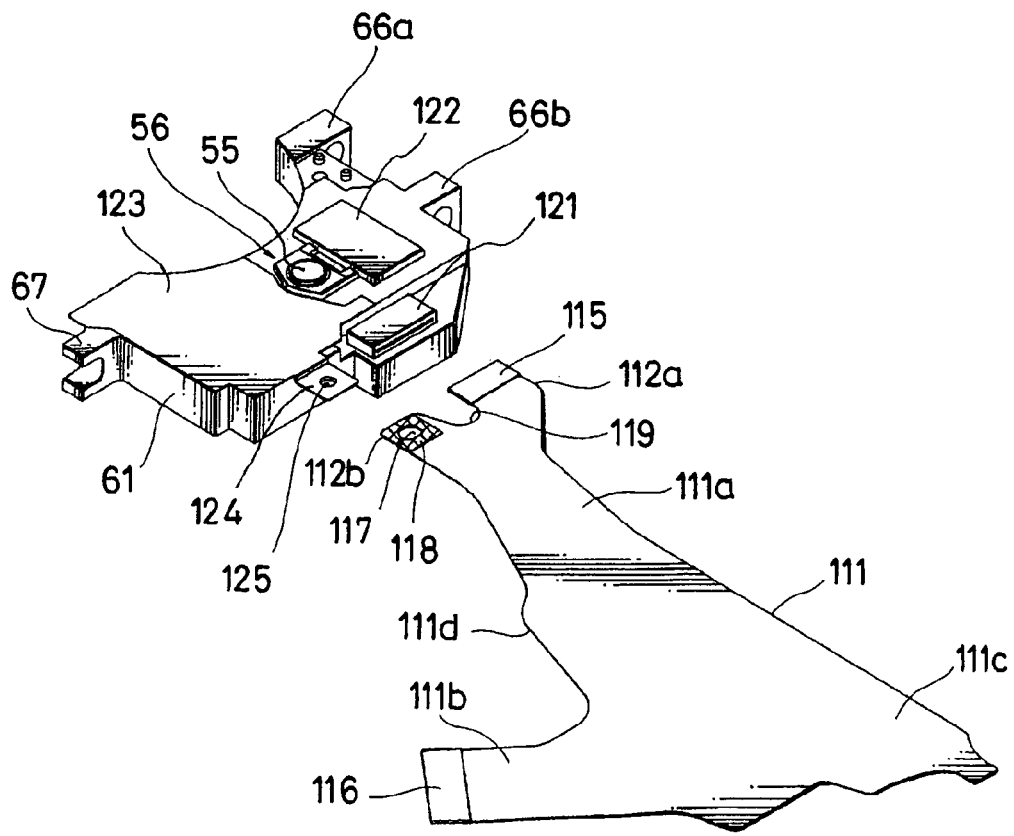

FIG. 11 and FIG. 13A show a state that the fixing portion 112b is engaged with the mounting strip 124 and each connection terminal on the pickup side is connected with the connector 121, and FIG. 12 and FIG. 13B show a state before such engagement and connection. As shown in FIGS. 15A and 15B, FIGS. 16A and 16B, and FIGS. 17A and 17B, the flexible wiring board 111 is bent at 180 degree on the first connection portion 111a at the time of the assembly of this wiring board into the disk drive apparatus 10. Further, the bending position also shifts as the optical pickup 42 moves between a position closest to the rotational drive mechanism 41 (shown in FIG. 15A, FIG. 16A and FIG. 17A) and a position the most distant position from the rotational drive mechanism 41 (shown in FIG. 15B, FIG. 16B and FIG. 17B).

As a result, a state of the stress in the first connection portion 111a of the flexible wiring board 111 constantly changes; however, the first connection portion 111a is fixed to the mounting strip 124 By the fixing portion 112b and the pickup cover 123 having the mounting strip 124 is fixed to the pickup base 61. Accordingly, the fixing portion 112b can bear the whole or most of the stress generated in the bending portion of the first connection portion 111a, and the stress generated by the bending portion is not applied at all on the terminal portion 112a or the stress applied thereon can be reduced. Therefore, the uplift of the terminal portion 112a is prevented and high binding strength can be secured, so that the reliability of the disk drive apparatus 10 can be improved.

According to this embodiment, since the connector 121 connecting the optical pickup 42 and the flexible wiring board 111 is disposed on the lateral side of the object lens 55, the connector 121 can be disposed in the upward direction till the maximum thickness of the optical pickup 42 (refer to FIG. 14A), so that a wider internal space of the optical pickup 42 can be secured. As a result, the flexibility in design of the optical pickup 42 can be increased. Conversely, a size reduction of the optical pickup 42 can be achieved by reducing an volume of the internal space of the optical pickup 42.

In addition, the binding strength of the flexible wiring board 111 can be greatly increased since the mounting strip 124 projecting to the lateral side is provided on the pickup cover 123 fixed to the pickup base 61; the mounting strip 124 is located at the position of the approximately same height as the insertion port of the connector 121; and the fixing portion 112b of the flexible wiring board 111 is connected with the mounting strip 124. Moreover, since the bonding strength generated by the bonding layer 118 is added further in addition to a retaining force of the connector 121, the binding strength can be further increased and the flexible wiring board 111 can be prevented from dropping off due to causes such as a seek operation of the optical pickup 42 and the vibration/shock, so that the disk drive apparatus having high reliability can be provided.

More specifically, the disk drive apparatus according to this embodiment is configured such that the top end of the first connection portion 111a of the flexible wiring board 111 positioned at the side of the optical pickup 42 forms the Y-bend shape in which one side forms the terminal portion 112a capable of forming the electrical connection, the engagement hole 117 and the bonding layer 118 are provided on the fixing portion 112b of the other side, and the continuous portion between the fixing portion 112b and the terminal portion 112a forms the circular arc having the large curvature radius. Accordingly, the uplift of the flexible wiring board 111 against the optical pickup 42 is prevented and the binding strength is increased, so that the disk drive apparatus having high reliability can be achieved.

Figure 17A:
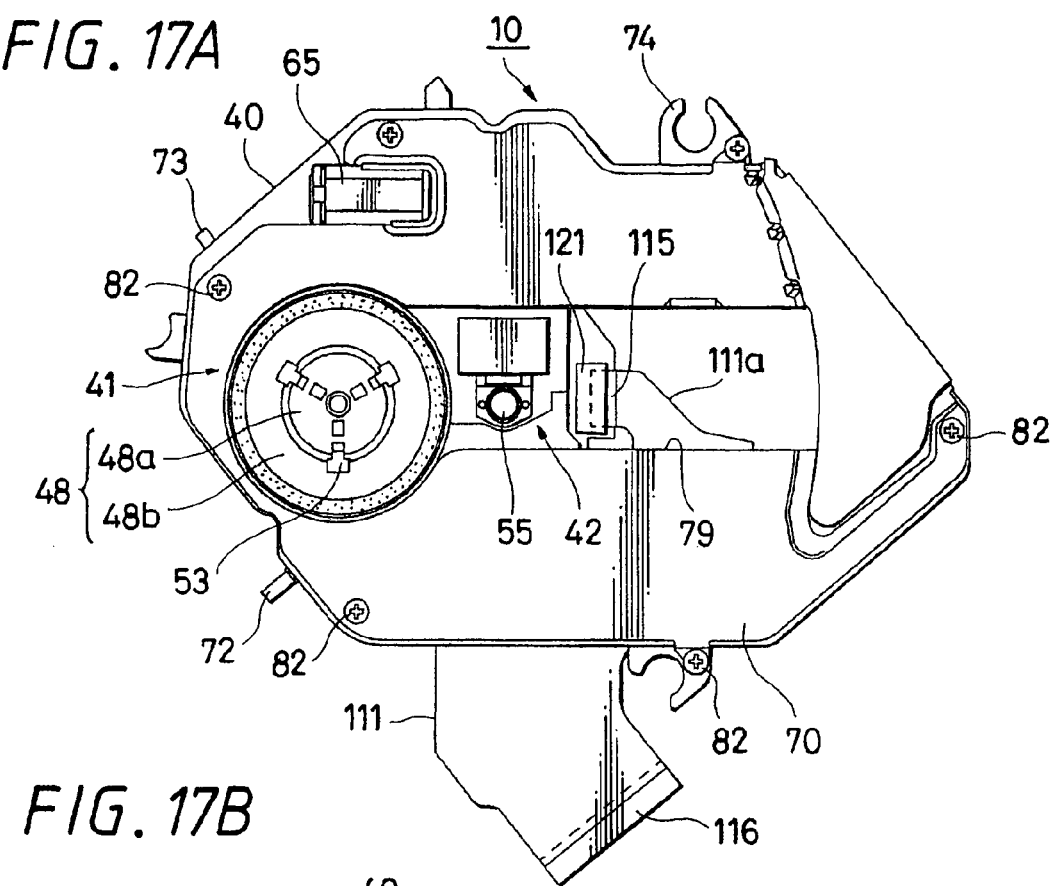
Figure 17B:
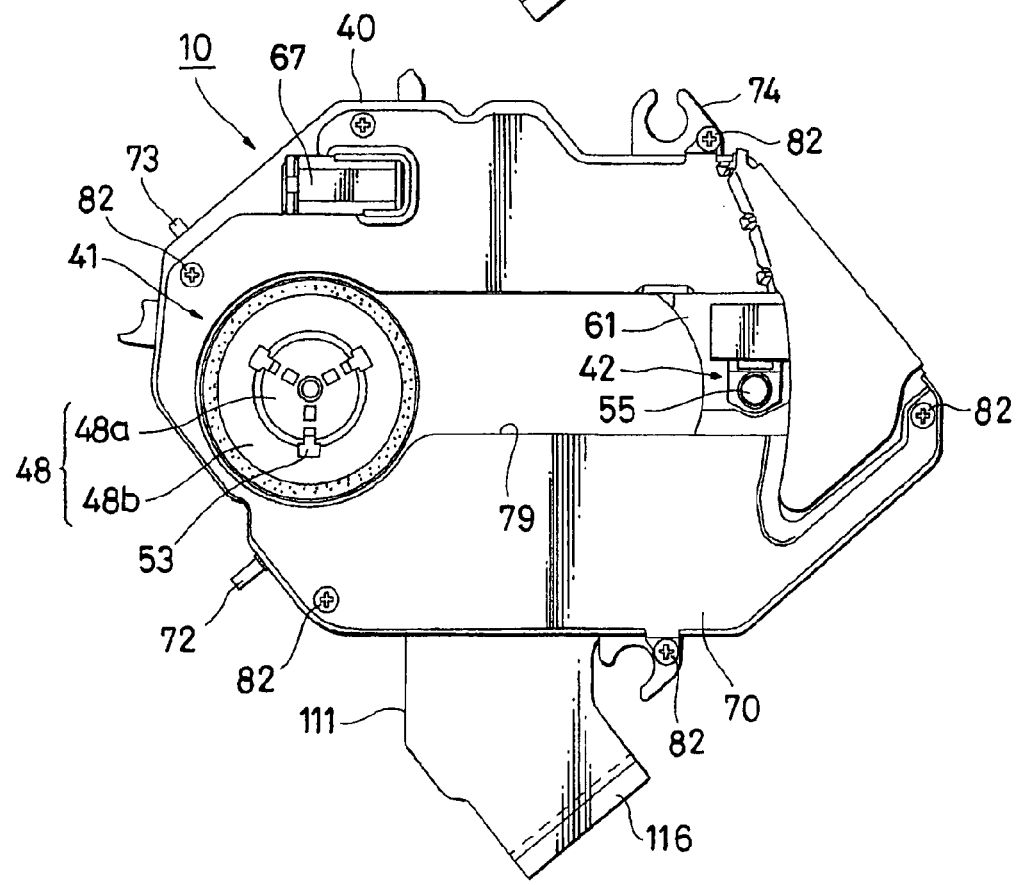

As shown in FIGS. 17A and 17B, a base cover 70 is attached to the upper surface of the base member 40. The base cover 70 forms a shape approximately corresponding to the planar shape of the base member 40. An opening portion 79 is provided on the base cover 70 in order to expose the turntable 48 and the object lens 55 of the optical pickup 42. The opening portion 79 is extended in the movement direction of the optical pickup 42 and formed as an elongate hole continuing from a position where the optical pickup 42 is located at the most distant position from the turntable 48 to the table opening portion where the turntable 48 is exposed. The base cover 70 is tightly fixed on the upper surface of the base member 40 using a plurality (six pieces in this embodiment) of fixing screws 82.

In addition, the base member 40 has a support shaft 71 provided on a first chamfer portion 45a, a first cam pin 72 provided on a second chamfer portion 45b, a second cam pin 73 provided on a third chamfer portion 45c, and a support portion 74 provided on the vicinity of a fourth chamfer portion 45d. The support shaft 71, the first cam pin 72 and the second cam pin 73 are projected approximately vertical to surfaces of the chamfer portions in respective chamfer portions 45a, 45b and 45c. The support portion 74 is integrally formed such that a part of the base member 40 is bent outside. The support shaft 71 is an shaft portion to support rotatably the drive unit 12 against the chassis 11 and is disposed at a position distant from the spindle motor 47.

The first cam pin 72 and the second cam pin 73 are pins to operate rotatably the drive unit 12 to an upper-lower direction against the chassis 11. The support portion 74 supports elastically the drive unit 12 at the chassis 11 through an insulator having elasticity and viscosity such as rubber. Accordingly, an engagement hole 74a for holding the insulator is provided on the support portion 74. A cut-out to form an opening on a lateral side is provided on the engagement hole 74a, so that the insulator can be put in and out from the lateral side.

As shown in FIG. 8, the first cam pin 72 is slidably engaged with a cam groove 76 provided on a slide plate 75. In addition, the second cam pin 73 is slidably engaged with a cam groove 78 that in a slide lever 77. The drive unit 12 is disposed on one side of the disk insertion slot 24 of the chassis 11 as shown in FIG. 5 to FIG. 7. Further, the drive unit 12 is configured such that a rotating center is set on the side of the disk insertion slot 24 of the drive unit 12 and an inner side of a depth direction is rotatable in the upper-lower direction around this rotating center as a base.

More specifically, the drive unit 12 is disposed such that the rotational drive mechanism 41 faces the approximately center portion of the chassis 11 and a longitudinal direction of this drive mechanism is directed to a diagonal direction of the chassis 11. A bearing hole is provided on a lateral surface of the chassis 11 facing the support shaft 71 of the drive unit 12 in this state, and the support shaft 71 is engaged with this bearing hole in a freely rotatable manner. As shown in FIG. 8, the support portion 74 of the drive unit 12 is provided at a position approximately overlapping with an extended line of an shaft center line of the support shaft 71. The engagement hole 74a is provided on the support portion 74 and an insulator 81 is mounted on the engagement hole 74a. The insulator 81 has a hole that pierces a center portion thereof, and the support portion 74 is fixed and supported elastically at the bottom portion 14a of the case main body 14 by a fixing screw 82 that penetrates through this hole.

The drive unit 12 is thus attached to the chassis 11 in a manner capable of changing an inclination angle in the upper-lower direction. The base movement mechanism 83 is provided on the disk drive apparatus 10 in order to secure a raising and lowering operation to change an attitude (inclination angle) of the drive unit 12. The base movement mechanism 83 moves the drive unit 12 to a chucking position, a chucking release position and a middle position (recording-reproducing position) by swinging the drive unit 12 in the upper-lower direction in order to bring into the raising and lowering operation.

More specifically, the drive unit 12 is raised by the base movement mechanism 83, so that the turntable 48 which is the disk loading portion 26 moves to the disk loading position. Accordingly, the engagement portion 48a of the turntable 48 is engaged with the center hole 7a of the optical disk 7 positioned at the disk loading position, so that the optical disk 7 is chucked onto the turntable 48. On the other hand, the drive unit 12 is lowered by the base movement mechanism 83, so that the turntable 48 moves to the chucking release position. As a result, the engagement portion 48a of the turntable 48 disengages from the center hole 7a of the optical disk 7 and the chucking of the optical disk 7 is released. The recording or reproducing of the information signal can be performed on the optical disk 7 using the optical pickup 42 when the drive unit 12 is moved to the middle position (recording-reproducing position) between the chucking position and the chucking release position.

The base movement mechanism 83 has the slide plate 75 and the drive lever 77 respectively capable of forming a slide operation. The slide plate 75 represents one specific example of the slide member and includes a lengthy member formed of a sheet metal as shown in FIG. 8 and FIG. 9. A wide-width portion 75a projecting to one side of a width direction is provided on a midway portion of a longitudinal direction of the slide plate 75. A cam strip 84 raised by bending at 90 degree is provided on the other side of the wide-width portion 75a of the slide plate 75. The cam strip 84 forms an L-shape having an upper portion bent to a horizontal direction, and a vertical plane portion 84a and a horizontal plane portion 84b are formed thereby.

Two kinds of cam portion 85a and 85b corresponding to two kinds of optical disks having different diameters are provided on the horizontal plane portion 84b of the slide plate 75. The first cam portion 85a corresponds to the optical disk 7L having the large diameter (hereinafter, referred to as "large diameter disk". For example, the optical disk having the diameter of 120 mm) and is used when the large diameter disk 7L is handled. The second cam portion 85b corresponds to the optical disk 7S having the small diameter (hereinafter, referred to as "small diameter disk". For example the optical disk having the diameter of 80 mm) and is used when the small diameter disk 7S is handled.

A plate side cam groove 76 slidably engaged with the first cam pin 72 provided on the base member 40 of the drive unit 12 is provided on the vertical plane portion 84a of the slide plate 75. The plate side cam groove 76 changes the attitude of the drive unit 12 by raising and lowering the base member 40 through guiding the first cam pin 72. The plate side cam groove 76 positions the first cam pin 72 at a lower horizontal portion 76a, a top end portion 76b and an upper horizontal portion 76c as shown in FIGS. 14A to 14C. The lower horizontal portion 76a of the plate side cam groove 76 positions the drive unit 12 at the chucking release position through the first cam pin 72. The drive unit 12 is separated at the most distant position from the optical disk 7 that is located at the disk loading position, and is in an inclined state having the turntable 48 face downward as shown in FIG. 13B.

The top end portion 76b of the plate side cam groove 76 positions the drive unit 12 at the chucking position through the first cam pin 72. The engagement portion 48a of the turntable 48 is engaged with the center hole 7a of the optical disk 7 located at the disk loading position, and the drive unit 12 becomes an inclined state having the turntable 48 face slightly upward. In addition, the upper horizontal portion 76c positions the drive unit 12 at the middle position through the first cam pin 72. The drive unit 12 becomes a state approximately in parallel with the inserted optical disk 7 as shown in FIG. 13A, and the recording or reproducing of the information signal is performed on the optical disk 7 under this state.

Such plate side cam groove 76 is formed in the vertical plane portion 84a of the cam strip 84 of the slide plate 75. The lower horizontal portion 76a of the plate side cam groove 76 is formed in a manner extending in a longitudinal direction at a bottom end portion of the vertical plane portion 84a. The top end portion 76b is provided on an upper end of a curved portion continuous with one end of the lower horizontal portion 76a. Further, the upper horizontal portion 76c is provided at a position in a slightly downward direction from the top end portion 76b. The upper horizontal portion 76c is extended approximately in parallel with the lower horizontal portion 76a, and the other end of this horizontal portion is closed. An attitude adjustment mechanism described later, is provided correspondingly to the upper horizontal portion 76c.

An operation pin 87 is provided on one end of the longitudinal direction of the slide plate 75. The operation pin 87 is projected to a surface from which the cam strip 84 of the slide plate 75 protrudes, and the operation pin 87 is slidably engaged with a interlocking cam groove 86 that is provided on the drive lever 77. Furthermore, two elongate holes 88 and 88 are provided on the slide plate 75 in order to secure a linear movement of the slide plate 75. A guide pin 89 fixed to the bottom portion 14a of the case main body 14 is slidably engaged with each elongate hole 88.

As shown in FIG. 8, the drive lever 77 is formed of a lengthy member which is formed of a resin and has an appropriate thickness, and the lever side cam groove 78 is provided on one side of a width direction. The second cam pin 73 provided on the third chamfer portion 45c of the base member 40 of the drive unit 12 is slidably engaged with the lever side cam groove 78. The lever side cam groove 78 turns the base member 40 by raising and lowering the second cam pin 73 in cooperation with the plate side cam groove 76 that raises and lowers the first cam pin 72, and thereby the attitude of the drive unit 12 is changed. Since a function of the lever side cam groove 78 is the same as the function of the plate side cam groove 76 and a shape of this cam groove is also approximately similar, an explanation of the shape of the lever side cam groove 78 is omitted.

The interlocking cam groove 86, with which the operation pin 87 of the slide plate 75 is engaged, is provided on a lower surface of the drive lever 77. The drive lever 77 is slidably supported at the bottom portion 14a of the case main body 14 in a direction approximately orthogonal to a sliding direction of the slide plate 75. The drive lever 77 and the slide plate 75 are disposed at the bottom portion 14a of the case main body 14 with such a relation as shown in FIG. 8.

More specifically, the drive lever 77 is slidably supported at the bottom portion 14a in a manner facing the third chamfer portion 45c of the base member 40 by directing the longitudinal direction of this lever in the front-rear direction of having the optical disk 7 put in and taken out. Against the drive lever 77, the slide plate 75 is disposed at the inner side of the drive unit 12 in a manner facing the second chamfer portion 45b of the base member 40 by directing the longitudinal direction of this plate to a direction orthogonal in the front-rear direction of having the optical disk 7 put in and taken out, and is slidably supported at the bottom portion 14a.

The base movement mechanism 83 having such configuration is operated by a drive mechanism (not illustrated) having a power transmission mechanism such as a drive motor and a gear provided on the bottom portion 14a of the case main body 14 of the chassis 11. When the drive mechanism is activated, the drive lever 77 is first brought into a slide operation in an front-rear direction (direction to cause the optical disk 7 inserted and ejected) X and the slide plate 75 is brought into the slide operation to a left-right direction Y orthogonal in the front-rear direction X by the front-rear operation of the drive lever 77 as shown in FIG. 8. More specifically, the interlocking cam groove 86 moves in the front-rear direction X by the front-rear operation of the drive lever 77, and the operation pin 87 moves in the left-right direction Y correspondingly to a shape change of the interlocking cam groove 86. Thus, the slide plate 75 moves the same distance as the operation pin 87 in the left-right direction Y correspondingly to a travel distance of the operation pin 87.

FIG. 20B shows an initial state of inserting the optical disk 7 into the disk insertion slot 24 of the disk drive apparatus 10 (or a final state of taking out the optical disk 7 from the disk insertion slot 24). Under this state, the whole drive unit 12 is in the inclined state since the inner side of the depth direction of the drive unit 12 is lowered and the turntable 48 retracts under the disk loading position. The drive mechanism to slide the drive lever 77 is activated from this state, and thus the drive unit 12 moves from the disk loading release position shown in FIG. 20B to the disk loading position shown in FIG. 20A such that the attitude of this drive unit changes from the inclined state to an approximately horizontal state. It should be noted that an escape hole 15a to avoid an interference of the turntable 48 against the engagement portion 48a is provided at a position corresponding to the turntable 48 in the case cover body 15 of the chassis 11.

When the drive mechanism is activated from the state shown in FIG. 20B, the drive lever 77 first moves to the rear direction X1 of the front-rear direction X (refer to FIG. 8). Thus, the operation pin 87 is guided by the interlocking cam groove 86 of the drive lever 77 and moves in the left direction Y1 of the left-right direction Y (refer to FIG. 8). As a result, the slide plate 75 moves the same distance as the operation pin 87 in the left direction Y1 correspondingly to the travel distance of the operation pin 87. The lever side cam groove 78 provided on the drive lever 77 and the plate side cam groove 76 provided on the slide plate 75 cooperate as the cam mechanisms. More specifically, the lever side cam groove 78 raises the second cam pin 73 provided on the base member 40 of the drive unit 12, and simultaneously, the plate side cam groove 76 raises the first cam pin 72 that is provided on the base member 40.

The first cam pin 72 is guided by the plate side cam groove 76 and moves to an upper position, and simultaneously the second cam pin 73 is guided by the lever side cam groove 78 and moves to an upper position. Further, the first cam pin 72 moves up to the top end portion 76b of the plate side cam groove 76, and the second cam pin 73 moves up to the top end portion of the lever side cam groove 78. As a result, the engagement portion 48a of the turntable 48 enters into the center hole 7a of the optical disk 7. The optical disk 7 is chucked onto the turntable 48.

Furthermore, the first cam pin 72 moves from the top end portion 76b to the upper horizontal portion 76c and similarly the second cam pin 73 moves from the top end portion to the upper horizontal portion when the drive lever 77 moves to the rear direction X1 and the slide plate 75 moves in the left direction Y1. The first cam pin 72 and the second cam pin 73 are slightly lowered, so that the disk drive apparatus 10 is brought into the state shown in FIG. 20A. The disk drive apparatus 10 becomes an approximately horizontal state and under this state the information signal on the optical disk 7 loaded on the turntable 48 can be read from the information recording surface using the optical pickup 42 and also new information signal can be written on the information recording surface.

An operation opposite to the above-described operation is performed by moving the drive lever 77 to the front direction X2 of the front-rear direction X from the approximately horizontal state of the disk drive apparatus 10. More specifically, the drive lever 77 moves to the front direction X2, and thus, the slide plate 75 moves to the right direction Y2 of the left-right direction Y through actions of the interlocking cam groove 86 and the operation pin 87 engaged with this cam groove. Accordingly, the first cam pin 72 moves from the upper horizontal portion 76c to the top end portion 76b and similarly the second cam pin 73 moves from the upper horizontal portion to the top end portion. Further, the first cam pin 72 moves from the top end portion 76b to the lower horizontal portion 76a and similarly the second cam pin 73 moves from the top end portion to the lower horizontal portion, and thus the optical disk 7 is removed from the turntable 48. As a result, the drive unit 12 moves from the chucking position of the upper side to the chucking release position of the lower side, so that the attitude of the drive unit 12 changes from the state shown in FIG. 20A to the state shown in FIG. 20B.

At the position of the approximately horizontal state in which the information signal is recorded and reproduced, the drive unit 12 operated in this manner can adjust the height (attitude) by the attitude adjustment mechanism related to the disk drive apparatus according to the embodiment of the present invention. An attitude adjustment mechanism 90 shown in FIG. 9 represents a first embodiment of the attitude adjustment mechanism related to the disk drive apparatus according to the embodiment of the present invention.

Figure 18:
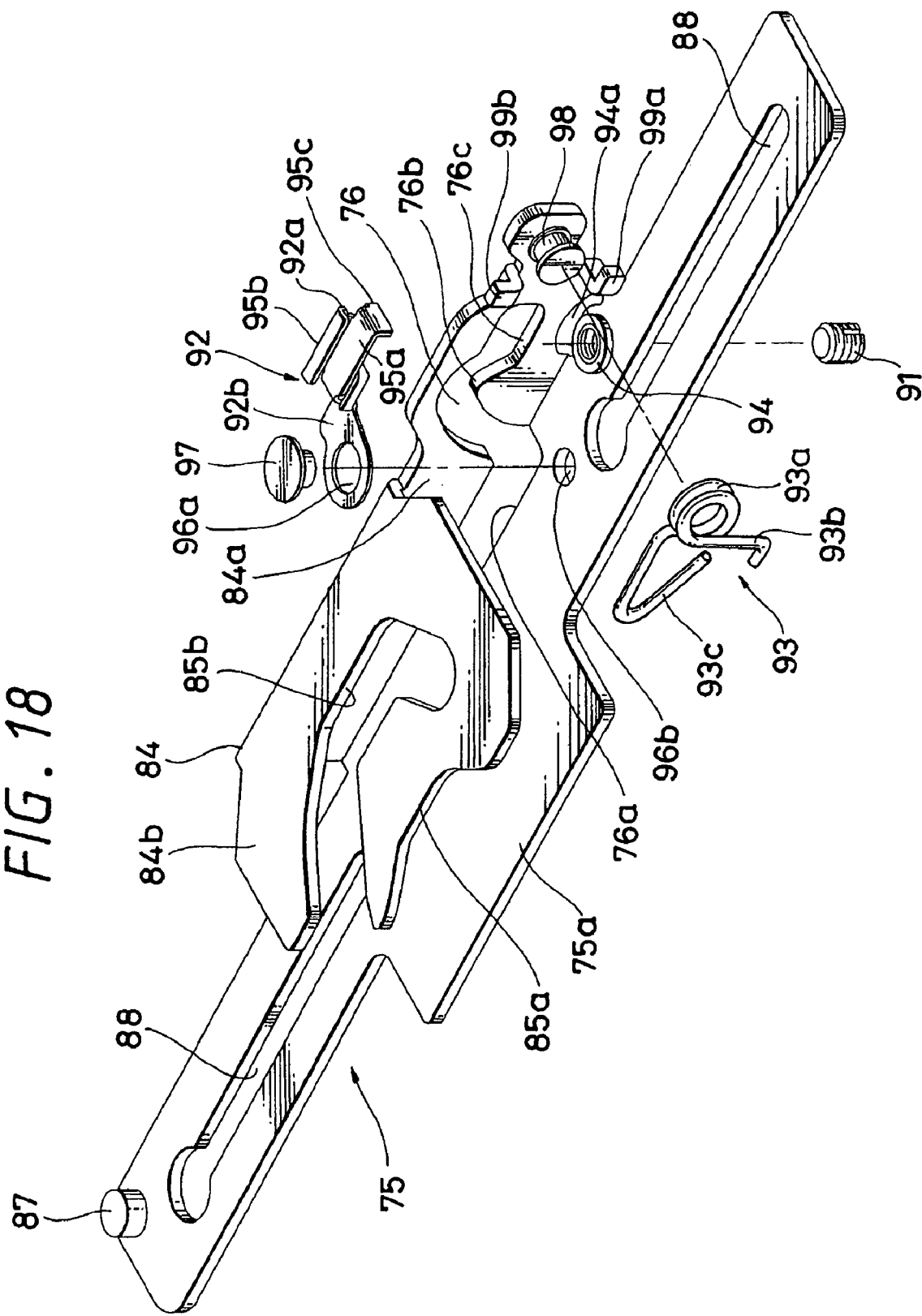
FIG. 18 is an exploded perspective view showing a first embodiment of an attitude adjustment mechanism related to a disk drive apparatus according to an embodiment of the present invention.
Figure 19:
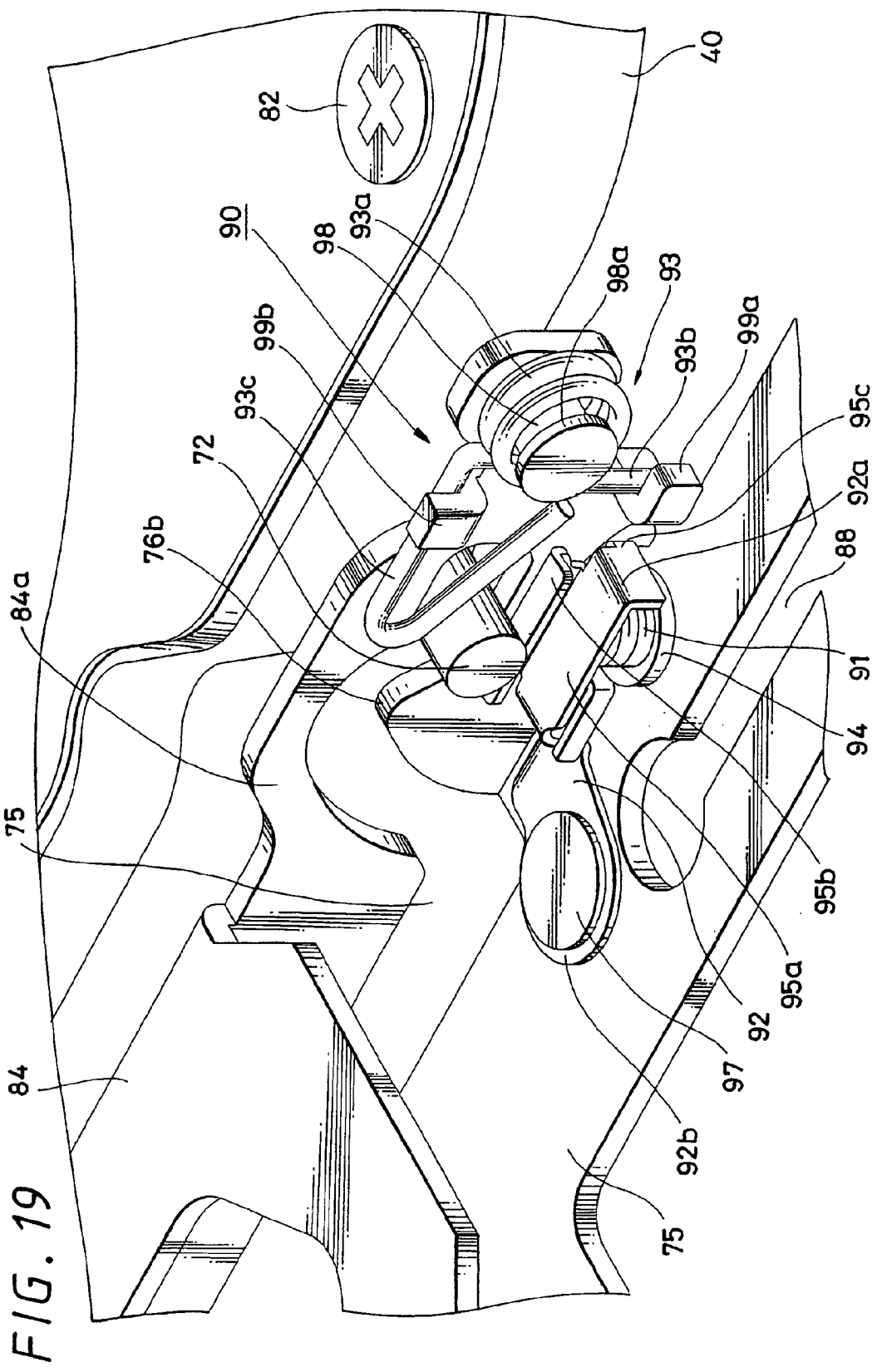
FIG. 19 is an explanatory diagram showing a magnified essential portion of FIG. 9.

The attitude adjustment mechanism 90 representing the first embodiment is provided on the slide plate 75 (slide member) and has an adjusting screw 91, an operation member 92 and an elastic member 93 as shown in FIG. 18 and FIG. 19. A locking screw (called generally "headless screw") is used as the adjusting screw 91 in this embodiment. The adjusting screw 91 is disposed in the vicinity of the upper horizontal portion 76c of the plate side cam groove 76 that is provide in the slide plate 75. Therefore, a boss portion 94 is provided on the slide plate 75 by burring processing performed on a part of this slide plate. A female screw matching with a male screw of the adjusting screw 91 is provided in a hole of the boss portion 94, so that the adjusting screw 91 is screwed into this female screw.

In the boss portion 94 of the slide plate 75, an upper end surface of the adjusting screw 91 screwed in this boss portion is disposed at a position facing right under the first cam pin 72 when moving to the upper horizontal portion 76c. Moreover, in this embodiment, the boss portion 94 is set as close to the vertical plane portion 84a as possible by providing a cut-out 94a in the bending portion of the vertical plane portion 84a of the cam strip 84 such that a top end surface of the adjusting screw 91 comes into fitting contact with the bottom end portion of the first cam pin 72 as close to the bottom end as possible.

In addition, the operation member 92 interposed between the adjusting screw 91 and the first cam pin 72 is attached in the vicinity of the boss portion 94 of the slide plate 75. The operation member 92 has a fitting contact portion 92a, a fixing portion 92b and a connection portion 92c integrally formed of a spring material formed of a sheet metal. The fitting contact portion 92a of the operation member 92 is configured such that the adjusting screw 91 is fitted with one side and the first cam pin 72 is fitted with the other side opposing thereto. The fitting contact portion 92a has a cross-sectional shape forming U-shape such that the top end surface of the adjusting screw 91 is fitted with an outer surface of a first strip 95a in mutually opposing two strips of the U-shape and an outer circumferential surface of the first cam pin 72 is fitted with an outer surface of a second strip 95b.

The fixing portion 92b is provided in order to fix the operation member 92 to the slide plate 75 and a through-hole 96a is provided for the fixing. The fitting contact portion 92a is elastically connected with the fixing portion 92b through the connection portion 92c. A caulking pin 97 is inserted through the through-hole 96a of the fixing portion 92b. A top end portion of the caulking pin 97 is inserted through a caulking hole 96b provided on the slide plate 75. The operation member 92 is fixed to the slide plate 75 by caulking the top end portion of the caulking pin 97. In addition, a baffle strip 95c to prevent the operation member 92 from rotating is provided on the connection portion 92c. The baffle strip 95c is formed of a bent strip that forms crank-shape, and one end is continuous with the first strip 95a and the other end is hooked on the connection portion 92c.

In the operation member 92 fixed to the slide plate 75, an outer surface of the first strip 95a of the fitting contact portion 92a faces an upper side of the boss portion 94. An outer surface of the second strip 95b of the fitting contact portion 92a is located at a height approximately the same as a lower side of the upper horizontal portion 76c of the plate side cam groove 76. The first cam pin 72 enters into the upper horizontal portion 76c, and thus, the first cam pin 72 is placed on the second strip 95b or is brought into a state being able to contact with the second strip 95b. Thereafter, the adjusting screw 91 is screwed in to bring the top end portion into fitting contact with the first strip 95a, and the second strip 95b is fitted with the first cam pin 72 by forming the adjusting screw 91 further screwed in. The attitude adjustment (change) of the fitting contact portion 92a can be easily made since tightening the adjusting screw 91 is easy due to the operation member 92 formed of the plate spring and a large spring force applied especially to the connection portion 92c.

A restitution spring 93 representing one specific example of the elastic member to bias the first strip 95a of the fitting contact portion 92a by pressing the first cam pin 72 entered into the upper horizontal portion 76c of the plate side cam groove 76 is attached to the vertical plane portion 84a of the cam strip 84 of the slide plate 75. The restitution spring 93 has a coil portion 93a wound by one or more turns, a first elastic part 93b continuous with one end of this coil portion 93a, and a second elastic part 93c continuous with the other end of the coil portion 93a. The coil portion 93a is engagedly supported with a suitable space at a support shaft 98 provided on the vertical plane portion 84a. A flange portion 98a to prevent the coil portion 93a from falling off is provided on a top end of an axis direction of the support shaft 98.

The first elastic part 93b of the restitution spring 93 is hooked on a first spring bearing strip 99a that is provided on the vertical plane portion 84a. In addition, the second elastic part 93c is formed by bending into V-shape, and a base side of this elastic part is hooked on a second spring bearing strip 99b provided on the vertical plane portion 84a. A top end portion of the second elastic part 93c faces the fitting contact portion 92a, so that the second elastic part 93c is fitted with the first cam pin 72 when the first cam pin 72 enters into the upper horizontal portion 76c. The first cam pin 72 is biased toward the second strip 95b of the fitting contact portion 92a or a bottom surface of the upper horizontal portion 76c by a spring force of the second spring bearing strip 99b. As a result, the first cam pin 72 is positioned at a prescribed position of the upper horizontal portion 76c, and thus, the drive unit 12 is held in the approximately horizontal state.

As a material of the slide plate 75, a metal such as a stainless steel (SUS) and a steel plate is suitable, for example; however, engineering plastics can be also used. In addition, as a material of the drive lever 77, the engineering plastics such as PC (polycarbonate) is suitable, for example; however, the metal such as the stainless steel and the steel plate can be also used.

The attitude adjustment mechanism 90 having such configuration is mounted on the slide plate 75, and that slide plate 75 is slidably supported at the bottom surface of the bottom portion 14*a* provided on the case main body 14 of the chassis 11. An adjustment operation hole 101 is provided at a position corresponding to the first cam pin 72 of the bottom portion 14*a* of the case main body 14 As shown in FIG. 3 and FIG. 4, so that an adjustment operation of the attitude adjustment mechanism 90 can be performed from the back side of the bottom portion 14*a*. The operation hole 101 is formed as a circular hole slightly larger than an outer diameter of the adjusting screw 91 such that a top end of a tool such as a screw driver can be inserted. Moreover, an open window 102 to expose a top end portion of the swing side of the base member 40 is provided on the vicinity of the operation hole 101 in the bottom portion 14*a* of the case main body 14.

The attitude adjustment mechanism 90 is used as follows, for example. This attitude adjustment is normally carried out after completing the assembly of the disk drive apparatus 10. In the flat slot-in type disc drive apparatus 10, sufficiently large space may not be secured in the height direction between the disk surface of the optical disk 7 loaded on the turntable 48 and the structural components such as the first to fourth rotatable arms 31 to 34 of the disk transfer mechanism 30 And the space may have to be set for further (more strictly) narrower manner. Moreover, the space may have to control strictly even the amount of space changed by the variability in the component accuracy. Under such circumstance, little space remains between the optical disk 7 and the structural components of the disk transfer mechanism 30, for example, the abnormal sound may be generated and the surface of the optical disk be damaged since the rotating optical disk 7 is brought into contact with the structural components and the like.

In such cases, the attitude of the disk drive apparatus 10 (inclination, height, and the like) is precisely adjusted using the attitude adjustment mechanism 90. Thus, the contact of the rotating optical disk 7 with the structural components and the like can be prevented, so that the generation of the abnormal sound, the damage to the surface of the optical disk, and the like can also be prevented. Especially, in the case of the thick optical disk having the thickness in the upper limit of the standard and the optical disk having the surface deflection in the upper limit of the standard, the space between the disk surface and the surrounding mechanism components may not be secured due to the tolerance of the component, a deformity of the marginal component, and the like. Therefore, the attitude (height) adjustment is carried out using the attitude adjustment mechanism 90, and hence the space between each of the upper surface and lower surface of the optical disk 7 and the structural components of the surrounding devices, for example, is secured within the prescribed range and a production yield can be improved.

The adjustment by the attitude adjustment mechanism 90 can be carried out as follows, for example. After the assembly of the disk drive apparatus 10 is completed, the thick optical disk having the thickness in the upper limit of the standard and similarly the optical disk having the surface deflection in the upper limit of the standard are loaded on the turntable 48 that is the disk loading portion, and the loaded optical disks are rotated at a prescribed rotational speed. The optical disk is rotationally driven while being in contact with the surrounding components in a case that there is rarely any space between the upper surface of the optical disk and the surrounding components disposed on an upper side of this optical disk or little space remains between the lower surface of the optical disk and the surrounding components disposed on a lower side of this optical disk. The abnormal sound is generated due to the contact and a friction between the optical disk and the surrounding components.

This adjustment is carried out when the abnormal sound is heard with the worker's ear. Further, the attitude (height) adjustment of the drive unit 12 is carried out by rotating the adjusting screw 91 until the generated abnormal sound is eliminated. In addition, a current waveform of the spindle motor 47 and a rotational speed of the turntable 48, for example, may be observed as another method, so that the adjustment can be carried out according to a change of the waveform and rotational speed. In this case, the drive current of the motor changes and the rotational speed of the turntable 48 changes when the rotating optical disk 7 comes into contact with the surrounding components, and therefore the adjustment is carried out in a manner cancelling those changes.

The specific adjustment is carried out as follows, for example. The drive unit 12 is located at the position capable of performing the recording or reproducing of the information signal, more specifically the first cam pin 72 and second cam pin 73 provided on the base member 40 are located at each upper horizontal portion 76*c* of the plate side cam groove 76 and lever side cam groove 78 (shown in FIG. 9, FIG. 19 and FIG. 21B). In this case, the slide plate 75 and the drive lever 77 are located at positions where the respective operations are finished, more specifically at positions being respectively moved to opposite sides (the Y1 direction in the case of the slide plate 75, and the X1 direction in the case of the drive lever 77) from the state shown in FIG. 8.

The first cam pin 72 is placed on the upper surface of the second strip 95*b* in the fitting contact portion 92*a* of the operation member 92, and the upper end surface of the fixing screw 91 is fitted with the lower surface of the first strip 95*a* of the fitting contact portion 92*a*. Further, the second elastic part 93*c* of the restitution spring 93 is fitted with the upper surface of the first cam pin 72, and the first cam pin 72 is biased toward the fitting contact portion 92*a* by the spring force of this restitution spring and stably fixed to this fitting contact portion.

Therefore, when the adjusting screw 91 is rotated left or right, the first cam pin 72 (also similar in the case of the second cam pin 73) is moved upward or downward by the adjusting screw 91 which moves forward or backward correspondingly to the rotating direction of this screw. The rotating operation of the adjusting screw 91 can be carried out from the outside of the bottom side of the case main body 14, which is the outside of the chassis 11. The adjusting screw 91 is an ordinary locking screw (commonly called "headless screw") and is formed as a right-hand screw similarly to a normal screw. Therefore, when the adjusting screw 91 is rotated clockwise, the fitting contact portion 92*a* is pushed up in proportion to a rotational amount of this screw. Thus, the height of the turntable 48 of the drive unit 12 is raised by an equivalent amount of ascent of the adjusting screw 91. On the other hand, the adjusting screw 91 is rotated counterclockwise, and thus the fitting contact portion 92*a* is pressed down in proportion to the rotational amount of this screw. As a result, the height of the turntable 48 of the drive unit 12 is lowered by an equivalent amount of descent of the adjustment screw 91.

An adjusting range of the height (attitude) by the adjusting screw 91 is equivalent to a groove width of the upper horizontal portion 76*c* of the plate side cam groove 76, and therefore the adjustment amount (amount of raising and lowering) is determined by the groove width. More specifically, when the adjusting screw 91 is excessively rotated toward a screw-in direction, the first cam pin 72 is fitted with a groove edge on the upper side of the upper horizontal portion 76c (a limit of the height in the upper direction) as shown in FIG. 21 C and FIG. 22. Also, there is a limit of the height in the lower direction when the upper surface of the second strip 95b of the fitting contact portion 92a moves downward away from the groove edge on the lower side of the upper horizontal portion 76c. Therefore, the height adjustment can be carried out in a single step form within a range of the groove width of the upper horizontal portion 76c according to this embodiment. The fitting contact portion 92a may easily follow the adjusting screw 91 in proportion to the adjustment amount of this screw since the operation member 92 is formed of the plate spring material formed of the stainless steel.

In addition, the second strip 95b of the fitting contact portion 92a of the operation member 92 is configured such that a bending portion is located at the highest position by inclining a main surface of this strip, so that an edge of an top end fringe does not contact with the first cam pin 72 as shown in FIGS. 23 A and B. Accordingly, the first cam pin 72 is supported at the bending portion having a smooth curve of a comparatively large curvature radius, so that an increase in frictional resistance caused by the sliding can be prevented and the first cam pin 72 can be prevented from being damaged by the edge of the second strip 95b.

Figure 22:
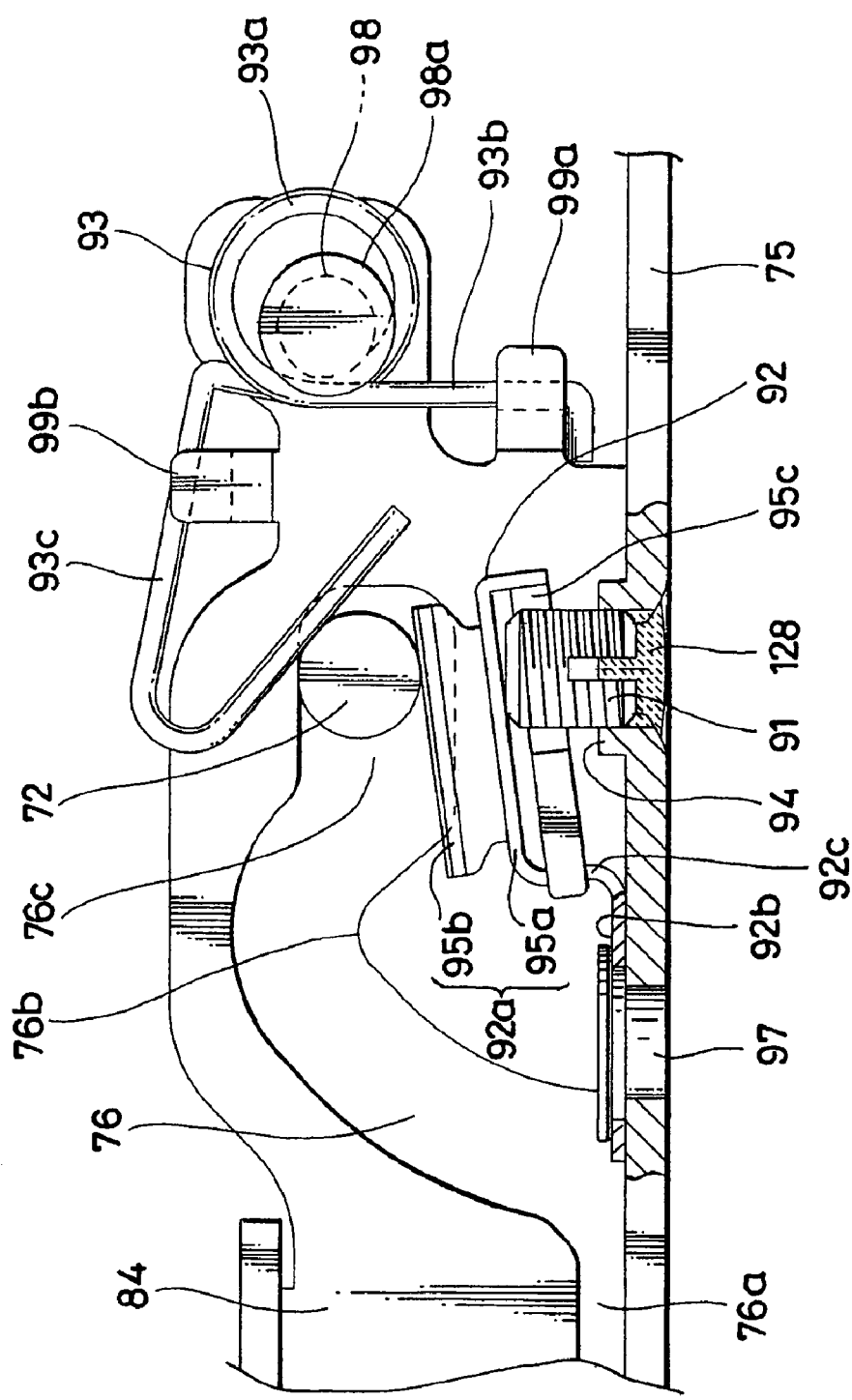
FIG. 22 is an explanatory diagram showing a magnified essential portion of FIG. 21 C.
Figure 23A:
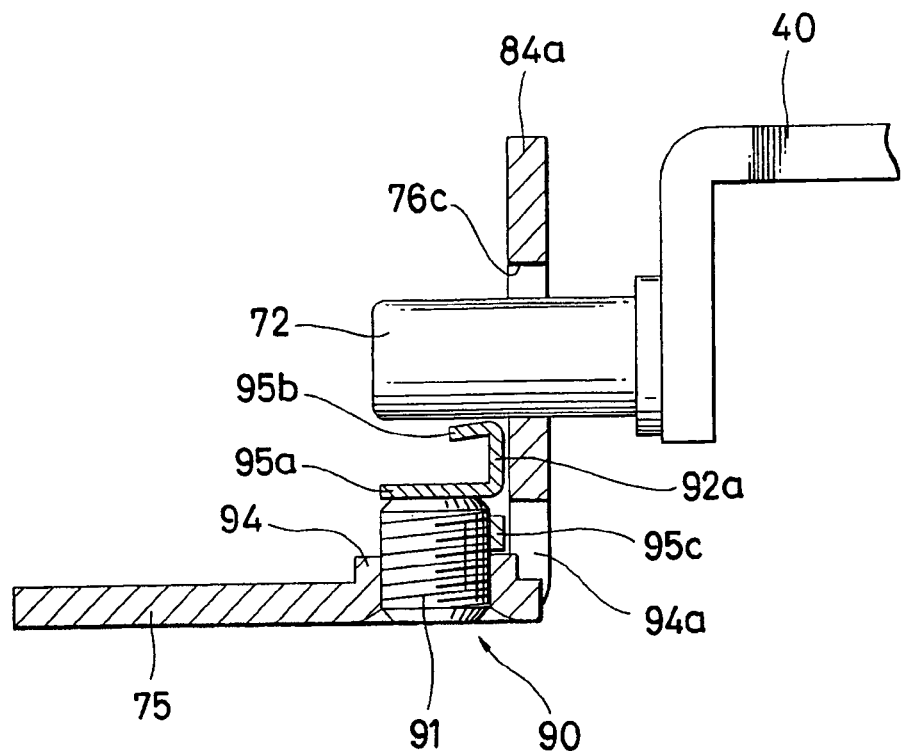
Figure 23B:
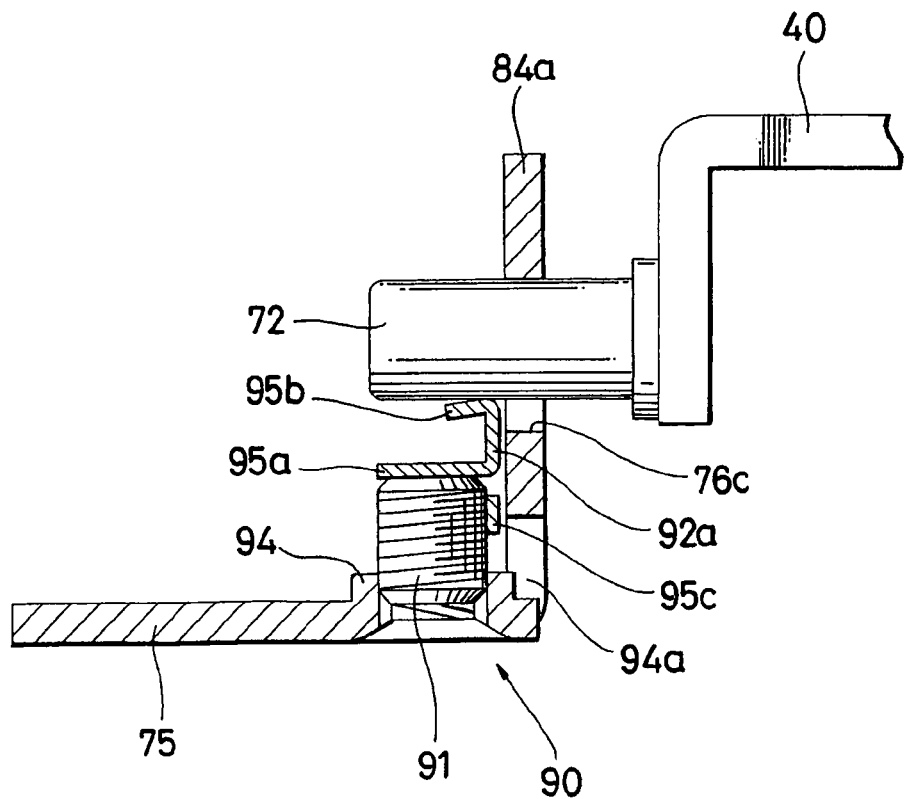

After such adjustment as described above is completed, an ultraviolet cure adhesive 128 is applied to the hole of the boss portion 94 of the slide plate 75 through the operation hole 101 provided on the case main body 14 of the chassis 11 as shown in FIG. 22. Thereafter, the ultraviolet cure adhesive 128 is irradiated with an ultraviolet ray in order to fix a back side of the adjusting screw 91 at the position after being adjusted. The adjusting screw 91 is prevented from loosening, so that the height at adjustment does not change. Thus, the adjustment according to this embodiment is carried out in a final process at a production stage of the disk drive apparatus 10, and furthermore the positioning of the drive unit 12 is located at the position where the optical disk 7 is driven rotationally. Therefore, the adjustment of the height can be carried out easily and securely without causing an error in the height adjustment of the drive unit 12.

Figure 24A:
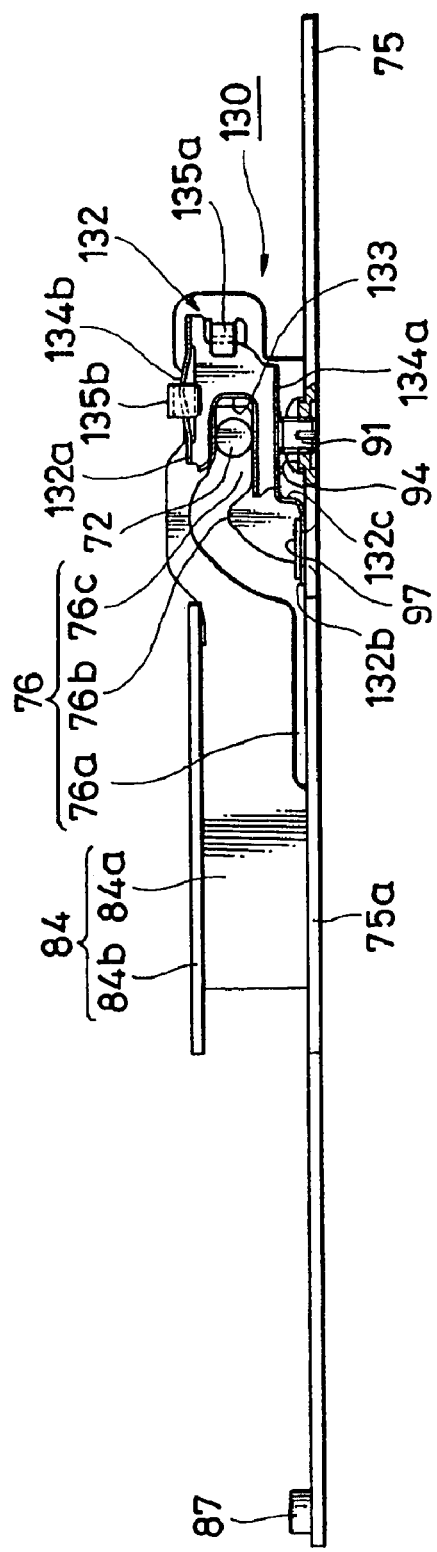
Figure 24B:
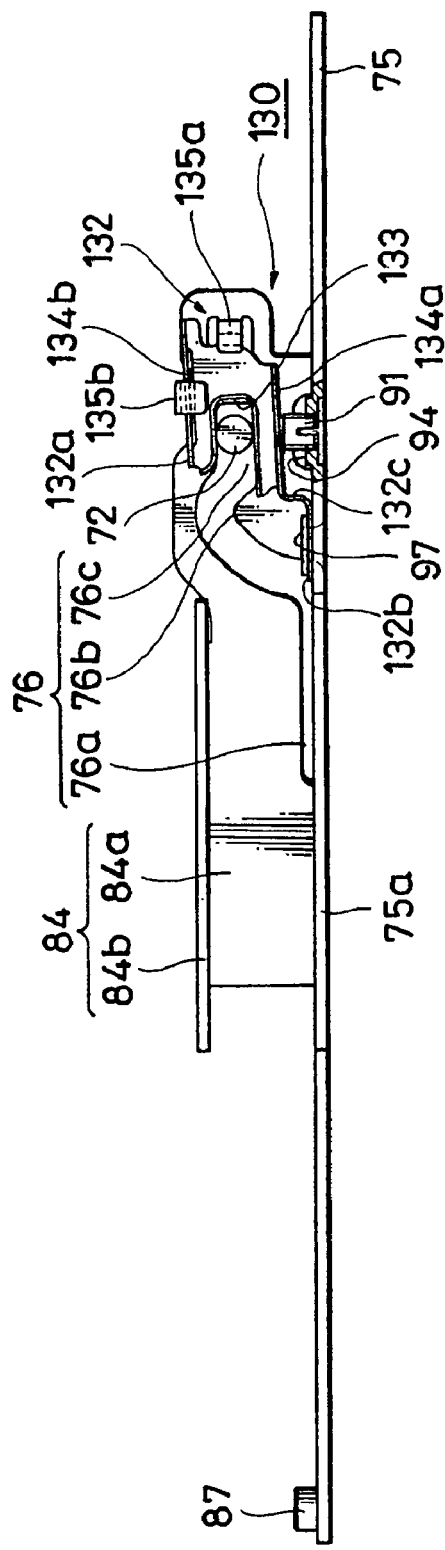
Figure 25:
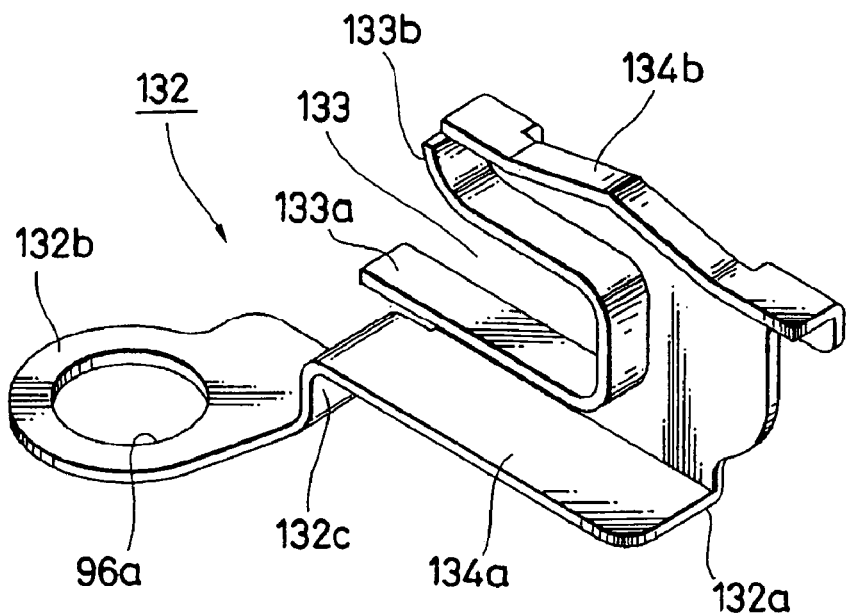
FIG. 25 is a perspective view showing an operation member related to the attitude adjustment mechanism shown in FIGS. 24A and 24B.

FIG. 24 to FIG. 30 show other embodiments of the attitude adjustment mechanism according to the embodiment of the present invention. FIGS. 24 A and B, and FIG. 25 are diagrams showing a second embodiment of the attitude adjustment mechanism related to the disk drive apparatus according to the embodiment of the present invention. An attitude adjustment mechanism 130 shown as the second embodiment has the adjusting screw 91 and an operation member 132. In the attitude adjustment mechanism 130 related to the second embodiment, a difference from the above-described attitude adjustment mechanism 90 is only the operation member 132 and a configuration of a support portion of the slide plate 75 to support the operation member 132. Therefore, only the support portion and the operation member 132 are described here, and duplicated explanations are omitted by giving the same reference numerals to the same portions.

The operation member 132 of the attitude adjustment mechanism 130 has such a configuration as shown in FIG. 25. More specifically, the operation member 132 has a fitting contact portion 132a, a fixing portion 132b and connection portion 132c integrally formed of a spring material formed of a sheet metal. The fitting contact portion 132a of the operation member 132 forms U-shape and has a pin bearing portion 133, a first strip 134a and a second strip 134b. The pin bearing portion 133 is a concave portion where the first cam pin 72 moving to the upper horizontal portion 76c is put in and out, and has an opening on a lateral side. A rib portion 133a for reinforcement is provided on a U-shaped rim of the pin bearing portion 133. A broadening portion 133b, which is curved outward, is provided on an edge portion (upper end) on one side of the rib portion 133a, and the first cam pin 72 can be easily pulled in and out by the broadening portion 133b.

The first strip 134a and second strip 134b of the fitting contact portion 132a are disposed in a manner interposing the pin bearing portion 133 and facing each other at respective outer edges. The top end surface of the adjusting screw 91 is fitted with a lower surface of the first strip 134a. In addition, the second strip 134b is formed as an elastic strip having a spring property given at a central part thereof by providing a slit extending along an outer edge at a position entering a prescribed length from the outer edge to an inner side. The fixing portion 132b is provided in order to fix the operation member 132 to the slide plate 75, and the through-hole 96a is provided for the fixing. The fitting contact portion 132a is elastically connected with the fixing portion 132b through the connection portion 132c.

The caulking pin 97 is inserted through the through-hole 96a of the fixing portion 132b of the operation member 132. The operation member 132 is fixed to the slide plate 75 by caulking the top end portion of the caulking pin 97 after inserting through the caulking hole 96b of the slide plate 75. As shown in FIGS. 24 A and B, the operation member 132 fixed to the slide plate 75 is fitted with the adjusting screw 91 with which the first strip 134a of the fitting contact portion 132a is screwed on the boss portion 94. Further, the pin bearing portion 133 of the fitting contact portion 132a faces the upper horizontal portion 76c of the plate side cam groove 76 provided on the slide plate 75.

A first guide strip 135a and a second guide strip 135b are provided on the vertical plane portion 84a of the cam strip 84 correspondingly to the fitting contact portion 132a of the operation member 132. Both guide strips 135a and 135b are formed by cutting out and bending parts of the cam strip 84. The first guide strip 135a slidably contacts with a part of the fitting contact portion 132a and functions as a guide to move the fitting contact portion 132a along a main surface of the vertical plane portion 84a, so that the fitting contact portion 132a is prevented from falling off and being bent during the movement. In addition, the second guide strip 135b prevents the fitting contact portion 132a from falling off similarly to the first guide strip 135a and when biases the second strip 134b having the large spring property toward the first cam pin 72. The pin bearing portion 133 is pressed to the first cam pin 72 by the spring force of the second strip 134b, and thus the drive unit 12 is securely supported at a prescribed position.

The adjustment according to the second embodiment is approximately similar to the adjustment according to the above-described embodiment. More specifically, the adjustment is carried out by rotating left or right the adjusting screw 91. FIG. 24 A shows a state that the adjusting screw 91 is brought into the lowest position, in which the lower surface of the first cam pin 72 entering inside the upper horizontal portion 76c of the plate side guide groove 76 is put in fitting contact with the groove edge of the lower side of the upper horizontal portion 76c. A lower edge of the pin bearing portion 133 of the fitting contact portion 132a is positioned at the same height as the groove edge of the lower side of the upper horizontal portion 76c, and the upper end surface of the adjusting screw 91 is put in fitting contact with a lower surface of the first strip 134a. The fitting contact portion 132a is pressed on the first cam pin 72 by the biasing force of the second strip 134b, and hence the first cam pin 72 is positioned.

The adjusting screw 91 is rotated and tightened in the clockwise direction, and hence the first cam pin 72 is pushed up through the fitting contact portion 132a as shown in FIG. 24B. The attitude (height) of the drive unit 12 is adjusted by pushing up the first cam pin 72 or by pushing down this cam pin such that the adjusting screw 91 is rotated to a reverse side of a counterclockwise direction when the drive unit 12 is raised too high. Thus, the drive unit 12 can be securely supported at a prescribed position where the optical disk 7 does not collide with the surrounding components. As described above, an amount of tightening (amount of raising and lowering) the adjusting screw 91 is adjusted, so that the attitude (height) of the fitting contact portion 132a of the operation member 132 is adjusted, and thus the drive unit 12 can be set in a prescribed attitude at the prescribed position. Here, a groove width of the pin bearing portion 133 of the fitting contact portion 132a may preferably be set slightly larger than the diameter of the first cam pin 72, and rattling of the first cam pin 72 may be suppressed as much as possible in this case.

Figure 27:
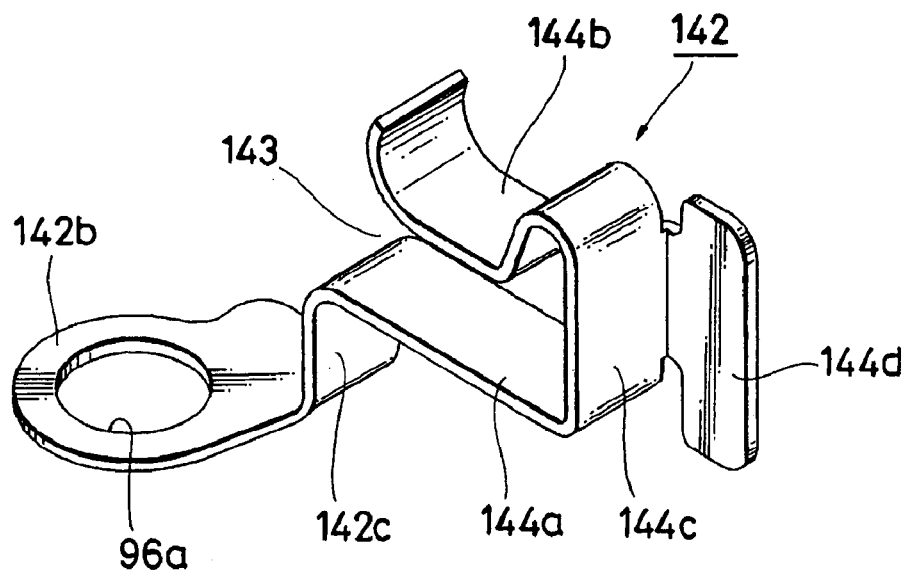
FIG. 27 is a perspective view showing an operation member related to the attitude adjustment mechanism shown in FIGS. 26A and 26B.

FIGS. 26A and 26B, and FIG. 27 are diagrams showing a third embodiment of the attitude adjustment mechanism related to the disk drive apparatus according the embodiment of the present invention. An attitude adjustment mechanism 140 shown as the third embodiment has the adjusting screw 91 and an operation member 142. In the attitude adjustment mechanism 140 related to the third embodiment, a difference from the above-described attitude adjustment mechanism 130 is only the operation member 142 and a configuration of a support portion of the slide plate 75 to support the operation member 142. Therefore, only the support portion and the operation member 142 are described here, and duplicated explanations are omitted by giving the same reference numerals to the same portions.

The operation member 142 of the attitude adjustment mechanism 140 has such a configuration as shown in FIG. 27. More specifically, the operation member 142 has a fitting contact portion 142a, a fixing portion 142b and a connection portion 142c integrally formed of a spring material formed of a sheet metal. The fitting contact portion 142a of the operation member 142 forms u-shape and has a pin bearing portion 143, a first strip 144a, a second strip 144b and a guide strip 144c. The pin bearing portion 143 is a concave portion where the first cam pin 72 moving to the upper horizontal portion 76c is put in and out, and has an opening on a lateral side. An interval between the facing two strips 144a and 144b of the pin bearing portion 143 is set slightly smaller than the diameter of the first cam pin 72.

Since the interval between the first strip 144a and second strip 144b is set smaller than the diameter of the first cam pin 72 as described above, the rattling of the first cam pin 72 is absorbed by the spring property generated in the fitting contact portion 142a, so that the drive unit 12 can be securely supported at a prescribed position. Furthermore, since a reinforcement rib is not provided on the first strip 144a and the second strip 144b and both strips are formed of only planar portions in this embodiment, the spring property can be easily vested in both strips 144a and 144b. On the other hand, since a guide portion 144d is formed in the connection strip 144c connecting the first strip 144a and the second strip 144b by bending a part of this connection strip into L-shape, sufficiently large strength can be maintained in the connection strip 144c.

A guide strip 145 is provided on the vertical plane portion 84a of the cam strip 84 correspondingly to the fitting contact portion 142a of the operation member 142. The guide strip 145 is formed by cutting out and bending a part of the cam strip 84. The guide strip 145 slidably contacts with the guide portion 144d of the fitting contact portion 142a and functions as a guide to move the fitting contact portion 142a along the main surface of the vertical plane portion 84a, so that the fitting contact portion 142a is prevented from falling off and being bent during the movement.

The adjustment of the attitude adjustment mechanism 140 is similar to the above-described embodiments and is carried out by rotating left or right the adjusting screw 91. More specifically, FIG. 26A shows a state that the adjusting screw 91 is brought into the lowest position, in which the lower surface of the first cam pin 72 entering inside the upper horizontal portion 76c of the plate side guide groove 76 is put in fitting contact with the groove edge of the lower side of the upper horizontal portion 76c. An upper surface of the first strip 144a of the fitting contact portion 142a is positioned at the same height as the groove edge of the lower side of the upper horizontal portion 76c. As a result, the upper surface of the first strip 144a is put in fitting contact with the lower surface of the first cam pin 72, and the upper end surface of the adjusting screw 91 is put in fitting contact with the lower surface of the first strip 144a. The second strip 144b is pressed on the first cam pin 72, so that the first cam pin 72 is positioned by the biasing force of the second strip 144b.

The adjusting screw 91 is rotated and tightened in the clockwise direction, and thus the first cam pin 72 is pushed up through the first strip 144a as shown in FIG. 26B. The attitude (height) of the drive unit 12 is adjusted through pushing up the first cam pin 72 or pressing down this cam pin when the drive unit 12 is raised too high. Thus, the drive unit 12 can be securely supported at a prescribed position where the optical disk 7 does not collide with the surrounding components.

Figure 29:
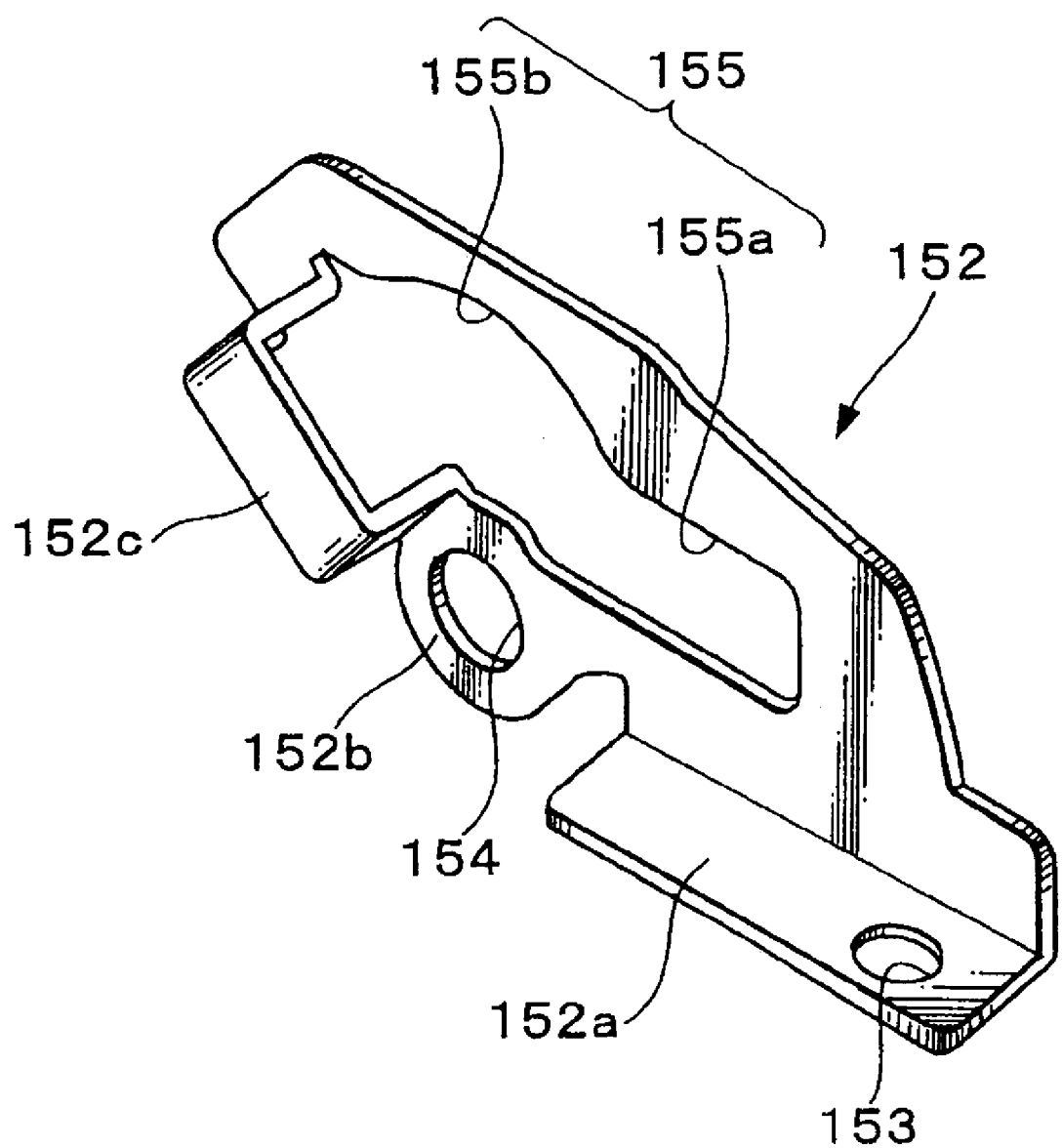
FIG. 29 is a perspective view showing an operation member related to the attitude adjustment mechanism shown in FIGS. 28A and 28B.

FIGS. 28A and 28B, and FIG. 29 are diagrams showing a fourth embodiment of the attitude adjustment mechanism related to the disk drive apparatus according to the embodiment of the present invention. An attitude adjustment mechanism 150 shown as the fourth embodiment has the adjusting screw 91 and an operation member 152. In the attitude adjustment mechanism 150 related to the fourth embodiment, differences from the above-described attitude adjustment mechanisms 130 And 140 are only the operation member 152 and a configuration of a support portion of the slide plate 75 to support the operation member 152. Therefore, only the support portion and the operation member 152 are described here, and duplicated explanations are omitted by giving the same reference numerals to the same portions.

The operation member 152 of the attitude adjustment mechanism 150 has a configuration as shown in FIG. 29. More specifically, the operation member 152 has a fitting contact portion 152a, a bearing portion 152b and a bridge portion 152c integrally formed of a spring material formed of a sheet metal. The operation member 152 forms an approximate fan-shape as a whole, and the bearing portion 152b is disposed at a pivotal portion of the fan. The bearing portion 152b is provided in order to rotatably support the operation member 152 at the slide plate 75, and a caulking pin 156 is caulked after inserting through a through-hole 154 provided for this support. Locating the bearing portion 152b as the center, the fitting contact portion 152a is disposed on one side of the operation member 152 and the bridge portion 152c is disposed on the other side.

An operation cam groove 155 having an approximate shape partially overlapping with a shape of the plate side cam groove 76 is provided on the operation member 152. The operation cam groove 155 has an adjustment portion 155a that has a shape approximately similar to the upper horizontal portion 76c of the plate side cam groove 76 and a guide portion 155b continuous with one end of the adjustment portion 155a and having a shape approximately similar to the top end portion 76b of the plate side cam groove 76. The first cam pin 72 piercing the plate side cam groove 76 is penetrated through the operation cam groove 155 and slidably engaged with this operation cam groove in such penetrated state. Therefore, in order to secure the strength and the like, the bridge portion 152c is provided along a side opposite to the adjustment portion 155a in the operation member 152 overlapping on a travel trajectory of the first cam pin 72 that goes in and out the operation cam groove 155. The bridge portion 152c is formed of a swelling portion projecting in a U-shaped form against a main surface of the operation member 152, and the first cam pin 72 can pass by a back side of this swelling portion.

The operation member 152 is rotatably supported at the vertical plane portion 84a forming a part of the cam strip 84 of the slide plate 76 using a caulking pin 156. In a state of having the operation member 152 attached, the operation cam groove 155 and the plate side cam groove 76 is set having such a relation as shown in FIGS. 28A and 28B. More specifically, a groove width of the adjustment portion 155a of the operation cam groove 155 has an approximately similar size to the diameter of the first cam pin 72 and is slidable without causing almost any rattling. On the other hand, the groove width of the upper horizontal portion 76c of the plate side cam groove 76 is formed slightly larger than the diameter of the first cam pin 72.

FIG. 28A shows a state that one side of the first cam pin 72 is put in fitting contact with the lower edge of the upper horizontal portion 76c. The other side of the first cam pin 72 is approximately in contact with the operation cam groove 155; however, there remains a little space against the upper edge of the upper horizontal portion 76c. FIG. 28B shows a state that one side of the first cam pin 72 is put in fitting contact with the upper edge of the upper horizontal portion 76c. The other side of the first cam pin 72 is approximately in contact with the operation cam groove 155; however, there remains a little space against the lower edge of the upper horizontal portion 76c.

The fitting contact portion 152a of the operation member 152 forms L-shape, and a though-hole 153 through which a top end portion of an adjusting screw 151 is inserted is provided therein. A top portion of the adjusting screw 151 the slide plate 76 is inserted rotatably through the through-hole 153 that is provide in the fitting contact portion 152a. A retaining ring (for example, E-ring) 157 for preventing the adjusting screw's coming-off is attached to the top portion of the adjusting screw 151. Thus, the adjusting screw 151 is connected with the fitting contact portion 152a in a manner capable of rotating and changing the attitude. Therefore, when the adjusting screw 151 is rotated, the operation member 152 is rotated in the clockwise direction or the counterclockwise direction around the caulking pin 156 as the rotating center correspondingly to a rotating direction of this screw.

A guide strip 158 is provided on the vertical plane portion 84a in order to secure the rotating movement of the operation member 152. The guide strip 158 is formed by cutting out and bending a part of the vertical plane portion 84a. The guide strip 158 functions as a guide to move the operation member 152 along a main surface of this strip, so that the operation member 152 is prevented from falling off and being bent due to a sliding contact with a part of the operation member 152 during the movement.

The adjustment of the attitude adjustment mechanism 150 is similar to the above-described embodiments and is carried out by rotating left or right the adjusting screw 151. More specifically, FIG. 28A shows a state that the adjusting screw 151 is brought into the lowest position, and the lower surface of the first cam pin 72 entering inside the upper horizontal portion 76c of the plate side guide groove 76 is put in fitting contact with the groove edge of the lower side of the upper horizontal portion 76c. The lower edge of the adjustment portion 155a of the operation cam groove 155 is positioned at the same height as the groove edge of the lower side of the upper horizontal portion 76c. The adjusting screw 151 is rotated and tightened in the clockwise direction, and hence the operation member 152 is rotated around the caulking pin 156 as the rotating center, so that the first cam pin 72 is pushed up and is brought into a state shown in FIG. 28B.

The attitude (height) of the drive unit 12 is adjusted through pushing up the first cam pin 72 or pressing down (rotating counterclockwise the adjusting screw 151) when the drive unit 12 is raised too high. Thus, the drive unit 12 can be securely supported at a prescribed position where the optical disk 7 does not collide with the surrounding components.

FIGS. 30A and 30B are diagrams showing a fifth embodiment of the attitude adjustment mechanism related to the disk drive apparatus according to the embodiment of the present invention. An attitude adjustment mechanism 160 shown as the fifth embodiment is configured such that the attitude (height) adjustment of the drive unit 12 can be carried out stepwise, and has a fixing screw 161 and an operation member 162. In the attitude adjustment mechanism 160 related to the fifth embodiment, differences from the above-described attitude adjustment mechanisms 130, 140 and 150 are only the operation member 162 and a configuration of a support portion of the slide plate 75 to support the operation member 162. Therefore, the support portion and the operation member 162 only are described here, and duplicated explanations are omitted by giving the same reference numerals to the same portions.

The operation member 162 of the attitude adjustment mechanism 160 has such a configuration as shown in FIG. 30. More specifically, the operation member 162 has a fitting contact portion 162a and a bearing portion 162b integrally formed of a sheet metal. The operation member 162 forms approximately a U-shape, and the bearing portion 162b is disposed at the top end of one strip of this operation member. The bearing portion 162b is provided in order to rotatably support the operation member 162 at the slide plate 75, and a caulking pin 166 is caulked after inserting through a through-hole provided for this support.

An operation cam groove 165 having an approximate shape overlapping partially with the shape of the plate side cam groove 76 is provided on the fitting contact portion 162a of the operation member 162. The operation cam groove 165 has a shape approximately similar to the upper horizontal portion 76c of the plate side cam groove 76. The first cam pin 72 piercing the plate side cam groove 76 is penetrated through the operation cam groove 165 and is slidably engaged in the penetrated state.

The operation member 162 is rotatably supported at the vertical plane portion 84a forming the part of the cam strip 84 of the slide plate 76 using the caulking pin 166. In a state of having the operation member 162 attached, the operation cam groove 165 and the plate side cam groove 76 are set having such a relation as shown in FIGS. 30A and 30B. More specifically, a groove width of the operation cam groove 165 has a size approximately similar to the diameter of the first cam pin 72 and is slidable without causing almost any rattling. On the other hand, the groove width of the upper horizontal portion 76*c* of the plate side cam groove 76 is formed slightly larger than the diameter of the first cam pin 72.

FIG. 30A shows a state that one side of the first cam pin 72 is put in fitting contact with the lower edge of the upper horizontal portion 76*c*. The other side of the first cam pin 72 is approximately in contact with the operation cam groove 165; however, there remains a little space against the upper edge of the upper horizontal portion 76*c*. FIG. 30B shows a state that one side of the first cam pin 72 is put in fitting contact with the upper edge of the upper horizontal portion 76*c*. The other side of the first cam pin 72 is approximately in contact with the operation cam groove 165; however, there remains a little space against the lower edge of the upper horizontal portion 76*c*.

A plurality (three pieces in this embodiment) of insertion through-holes 163*a*, 163*b* and 163*c* where a fixing screw 161 is selectively inserted are provided on the fitting contact portion 162*a* of the operation member 162. Screw holes 164*a*, 164*b* and 164*c* of the same number as the insertion through-holes 163*a* through 163*c* are provided on the vertical plane portion 84*a* in the cam strip 84 of the slide plate 76 correspondingly to the insertion through-holes 163*a* through 163*c*. The insertion through-holes 163*a* to 163*c* are set to the screw holes 164*a* to 164*c* such that a displacement amount increases gradually as increasing the distance from the caulking pin 166 that is the rotating center of the operation member 162. The operation member 162 is fixed to a position of the insertion through-hole by screwing and tightening the fixing screw 161 into one insertion through-hole selected from the plurality of insertion through-holes 163*a* to 163*c*. Therefore, the operation member 162 can be fixed at three stages in this embodiment.

The attitude (height) adjustment using the attitude adjustment mechanism 160 can be carried out as follows, for example. FIG. 30A shows a state that one side of the first cam pin 72 is put in fitting contact with the lower edge of the upper horizontal portion 76*c* and a lower edge of the operation cam groove 165 of the operation member 162. The other side of the first cam pin 72 is approximately in contact with an upper edge of the operation cam groove 165; however, there remains a little space left against the upper edge of the upper horizontal portion 76*c*. Under this state, a screw shaft of the fixing screw 161 is inserted through the first insertion through-hole 163*a* and a top end portion of this screw is screwed and tightened in the first screw hole 164*a*, and thus, the operation member 162 is fixed at a position of the lowest stage.

FIG. 30B shows a state that one side of the first cam pin 72 is put in fitting contact with the upper edge of the upper horizontal portion 76*c* and the upper edge of the operation cam groove 165 of the operation member 162. The other side of the first cam pin 72 is approximately in contact with the lower edge of the operation cam groove 165; however, there remains a space left against the lower edge of the upper horizontal portion 76*c*. Under this state, the screw shaft of the fixing screw 161 is inserted through the third insertion through-hole 163*c* and a top end portion of this screw is screwed and tightened in the third screw hole 164*c*, and thus, the operation member 162 is fixed at a position of the highest stage. The operation member 162 can be fixed at a position of the middle stage such that the second insertion through-hole 163*b* is matched with the second screw hole 164*b*; the screw shaft of the fixing screw 161 is inserted through the second screw hole 164*b*; and the top end portion of this screw is screwed and tightened in the second screw hole 164*b*, though not illustrated.

The plurality of screw holes are provided in advance in the slide plate 75 and simultaneously the plurality of insertion through-holes are provided on the operation member 162 as the attitude adjustment mechanism 160 related to the fifth embodiment, and hence the operation member 162 that rotatably or slightly moves can be fixed at the plurality of stages using the fixing screw 161. Thus, the attitude (height) of the drive unit 12 can be adjusted similarly to the above-described embodiments. It should be noted that the adjustment needs to be carried out during an assembly process in the case of this embodiment since the adjustment is unable to carry out from the outside of the chassis 11 after the disk drive apparatus 10 is completed.

According to the embodiments of the present invention, the space between the disk surface and the surrounding components caused by variability in components can optimally be adjusted by providing the attitude adjustment mechanism as described above, and hence the thin-type disk drive apparatus having high reliability and the information recording and/or reproducing apparatus having this disk drive apparatus may be provided. Moreover, since the attitude is adjusted at the final stage of the production process of the disk drive apparatus, an improvement in the manufacturing yield may be provided to simplify the assembly process and the like, and to achieve a cost reduction.

The embodiment of the present invention is not limited to the embodiments described hereinbefore and shown in the drawings, and various modifications and alterations to the embodiments can be effected within the scope and spirit not deviating from the present invention. For example, the examples is applied to the notebook-type PC are described in the above-described embodiments; however, the embodiment of the present invention can be applied to other electronic devices using the optical disk and the magnetooptical disk, which are, for example, a desktop type personal computer, an electronic dictionary, a DVD player, a car navigation system, and other various electronic devices.

Furthermore, it is obvious that the configuration can be set such that the chucking and chucking release of the disk can be performed by moving the drive unit in parallel although the examples forming the chucking and chucking release of the disk performed by rotatably moving the drive unit are described in the above-described embodiments. Moreover, the configuration may be set such that the optical disk is inserted and ejected from an opening portion other than disk insertion slot although the examples having the optical disk inserted and removed from the disk insertion slot are described.

It should be understood by those skilled in the art that various modifications, combinations, sub-combinations and alterations may occur depending on design requirements and other factors insofar as they are within the scope of the appended claims or the equivalents thereof.

What is claimed is:

1. A disk drive apparatus comprising:
   a chassis having a disk insertion slot provided on a front face through which a disk-type recording medium is inserted and/or ejected;
   a disk transfer mechanism by which the disk-type recording medium is transferred between a disk ejection position located outside of the disk insertion slot in the chassis and a disk loading position located inside of the disk insertion slot;

a rotational drive mechanism including a disk loading portion on which the disk-type recording medium is removably loaded and which is rotationally driven, such that the disk-type recording medium is rotated;

an optical pickup configured to record and/or reproduce an information signal on the disk-type recording medium that is loaded and rotated on the disk loading portion;

a pickup movement mechanism by which the optical pickup is moved along an information recording surface of the disk-type recording medium;

a base member on which the rotational drive mechanism, the optical pickup and the pickup movement mechanism are mounted;

a base movement mechanism with which the base member is attitude changeably supported and the disk-type recording medium is loaded on or removed from the disk loading portion by changing the attitude of the base member; and an attitude adjustment mechanism by which the attitude of the base member can be adjusted relative to the chassis.

2. A disk drive apparatus according to claim 1, wherein
the base movement mechanism includes the base member that is supported such that an inclination angle of the base member can be changed relative to the chassis, a cam pin is provided such that the cam pin is projected to a lateral side of a free end side of the base member, and a slide member is movably supported on the chassis and includes a cam groove to which the cam pin is slidably engaged; wherein the cam pin is moved by moving the slide member, such that the attitude of the base member is changed.

3. A disk drive apparatus according to claim 1, wherein
the attitude adjustment mechanism includes an adjusting screw that is screwed in the slide member supported on the chassis and is fitted at one end of an axis direction with the cam pin fixed to the base member, and the attitude of the base member can be adjusted by changing a screwed position of the adjusting screw.

4. A disk drive apparatus according to claim 3, wherein
an elastic member with which the cam pin is biased is provided for the adjusting screw or for an operation member that is fitted with the adjusting screw.

5. A disk drive apparatus according to claim 4, wherein
the operation member includes a fitting contact portion with one surface of which the cam pin is fitted and with the other surface of which the adjusting screw is fitted, and the cam pin is moved by pressing the fitting contact portion with the adjusting screw.

6. A disk drive apparatus according to claim 4, wherein
the operation member includes the fitting contact portion to be fitted with the adjusting screw, and the fitting contact portion is provided with a pin bearing portion to be removably engaged to the cam pin, and the cam pin is moved by pressing the fitting contact portion with the adjusting screw.

7. A disk drive apparatus according to claim 4, wherein
the operation member is formed of a plate spring.

8. An electronic device comprising:

a disk drive apparatus on which a disk-type recording medium is removably loaded and an information signal is recorded and/or reproduced on the loaded disk-type recording medium; and an apparatus chassis in which the disk drive apparatus is enclosed, wherein the disk drive apparatus includes a chassis having a disk insertion slot provided on a front face through which a disk-type recording medium is inserted and/or ejected;

a disk transfer mechanism by which the disk-type recording medium is transferred between a disk ejection position located outside of the disk insertion slot in the chassis and a disk loading position located inside of the disk insertion slot;

a rotational drive mechanism including a disk loading portion on which the disk-type recording medium is removably loaded and which is rotationally driven, such that the disk-type recording medium is rotated;

an optical pickup configured to record and/or reproduce an information signal on the disk-type recording medium that is loaded and rotated on the disk loading portion;

a pickup movement mechanism by which the optical pickup is moved along an information recording surface of the disk-type recording medium;

a base member on which the rotational drive mechanism, the optical pickup and the pickup movement mechanism are mounted;

a base movement mechanism with which the base member is attitude changeably supported, and the disk-type recording medium is loaded on or removed from the disk loading portion by changing the attitude of the base member; and an attitude adjustment mechanism by which the attitude of the base member can be adjusted relative to the chassis.

* * * * *